US009240019B2

(12) United States Patent
Ricci

(10) Patent No.: US 9,240,019 B2
(45) Date of Patent: *Jan. 19, 2016

(54) LOCATION INFORMATION EXCHANGE BETWEEN VEHICLE AND DEVICE

(71) Applicant: AutoConnect Holdings LLC, Wellesley, MA (US)

(72) Inventor: Christopher P. Ricci, Saratoga, CA (US)

(73) Assignee: AutoConnect Holdings LLC, Wellesley, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/468,055

(22) Filed: Aug. 25, 2014

(65) Prior Publication Data
US 2015/0012152 A1 Jan. 8, 2015

Related U.S. Application Data

(63) Continuation of application No. 13/678,773, filed on Nov. 16, 2012, now Pat. No. 8,818,725.

(60) Provisional application No. 61/560,509, filed on Nov. 16, 2011, provisional application No. 61/637,164,
(Continued)

(51) Int. Cl.
*G01C 21/20* (2006.01)
*G06Q 30/02* (2012.01)
(Continued)

(52) U.S. Cl.
CPC ............ *G06Q 30/0265* (2013.01); *B60K 35/00* (2013.01); *B60K 37/02* (2013.01); *B60R 7/04* (2013.01); *B60R 16/037* (2013.01); *B60W 30/182* (2013.01); *G01C 21/20* (2013.01);
*G06F 3/017* (2013.01); *G06F 3/0484* (2013.01); *G06F 3/0488* (2013.01); *G06F 9/54* (2013.01); *G06F 13/14* (2013.01); *G06F 13/364* (2013.01); *G06F 17/00* (2013.01); *G06F 17/30386* (2013.01);
(Continued)

(58) Field of Classification Search
CPC ..... G06F 9/54; G06F 17/00; G06F 17/30386; G06F 3/0484; G06F 21/10; G06F 13/14; B60K 37/02; B60K 35/00; B60R 7/04; B60R 16/037; G08C 19/00; G06N 5/02; H04L 67/02; G08G 1/143; G08G 1/16; G08G 1/096791; H04W 84/005; H04W 4/001; H04W 4/046; G06Q 40/08; G06Q 30/0265; B60W 30/182; B60W 2040/0872; B60W 2050/0095; B60W 2540/22; B60W 2540/26; B60W 2540/28; G01C 21/20

See application file for complete search history.

(56) References Cited
U.S. PATENT DOCUMENTS 5,296,840 A 3/1994 Gieffers
5,363,306 A 11/1994 Kuwahara et al.
(Continued)

OTHER PUBLICATIONS

Official Action for U.S. Appl. No. 13/679,459, mailed Oct. 28, 2014 17 pages.
(Continued)

*Primary Examiner* — Rodney Butler
(74) *Attorney, Agent, or Firm* — Sheridan Ross P.C.

(57) ABSTRACT

Methods and systems for a complete vehicle ecosystem are provided. Specifically, systems that when taken alone, or together, provide an individual or group of individuals with an intuitive and comfortable vehicular environment. The present disclosure builds on integrating existing technology with new devices, methods, and systems to provide a complete vehicle ecosystem.

20 Claims, 42 Drawing Sheets

Related U.S. Application Data filed on Apr. 23, 2012, provisional application No. 61/646,747, filed on May 14, 2012, provisional application No. 61/653,275, filed on May 30, 2012, provisional application No. 61/653,264, filed on May 30, 2012, provisional application No. 61/653,563, filed on May 31, 2012, provisional application No. 61/663,335, filed on Jun. 22, 2012, provisional application No. 61/672,483, filed on Jul. 17, 2012, provisional application No. 61/714,016, filed on Oct. 15, 2012, provisional application No. 61/715,699, filed on Oct. 18, 2012.

(51) Int. Cl.

| | | |
|---|---|---|
| *G06F 9/54* | (2006.01) | |
| *B60R 7/04* | (2006.01) | |
| *G08C 19/00* | (2006.01) | |
| *G06N 5/02* | (2006.01) | |
| *H04L 29/08* | (2006.01) | |
| *G08G 1/14* | (2006.01) | |
| *H04W 84/00* | (2009.01) | |
| *H04W 4/00* | (2009.01) | |
| *H04W 4/04* | (2009.01) | |
| *G06Q 40/08* | (2012.01) | |
| *G06F 17/00* | (2006.01) | |
| *G06F 17/30* | (2006.01) | |
| *G06F 3/0484* | (2013.01) | |
| *G08G 1/16* | (2006.01) | |
| *G06F 13/364* | (2006.01) | |
| *H04N 21/482* | (2011.01) | |
| *G06F 21/10* | (2013.01) | |
| *G08G 1/0967* | (2006.01) | |
| *G06F 13/14* | (2006.01) | |
| *B60R 16/037* | (2006.01) | |
| *B60W 30/182* | (2012.01) | |
| *B60K 35/00* | (2006.01) | |
| *B60K 37/02* | (2006.01) | |
| *G06F 3/01* | (2006.01) | |
| *G06F 3/0488* | (2013.01) | |
| *G08G 1/017* | (2006.01) | |
| *B60W 40/08* | (2012.01) | |
| *B60W 50/00* | (2006.01) | |

(52) U.S. Cl.
CPC .......... *G06F 21/10* (2013.01); *G06N 5/02* (2013.01); *G06Q 40/08* (2013.01); *G08C 19/00* (2013.01); *G08G 1/017* (2013.01); *G08G 1/096791* (2013.01); *G08G 1/143* (2013.01); *G08G 1/16* (2013.01); *H04L 67/02* (2013.01); *H04N 21/482* (2013.01); *H04W 4/001* (2013.01); *H04W 4/046* (2013.01); *H04W 84/005* (2013.01); *B60W 2040/0872* (2013.01); *B60W 2050/0095* (2013.01); *B60W 2540/22* (2013.01); *B60W 2540/26* (2013.01); *B60W 2540/28* (2013.01)

(56) References Cited

U.S. PATENT DOCUMENTS

| | | | |
|---|---|---|---|
| 5,508,689 | A | 4/1996 | Rado et al. |
| 5,648,769 | A | 7/1997 | Sato et al. |
| 5,710,702 | A | 1/1998 | Hayashi et al. |
| 5,794,164 | A | 8/1998 | Beckert et al. |
| 5,838,251 | A | 11/1998 | Brinkmeyer et al. |
| 5,890,080 | A | 3/1999 | Coverdill et al. |
| 6,302,438 | B1 | 10/2001 | Stopper, Jr. et al. |
| 6,484,082 | B1 | 11/2002 | Millsap et al. |
| 6,502,022 | B1 | 12/2002 | Chastain et al. |
| 6,678,747 | B2 | 1/2004 | Goossen et al. |
| 6,681,176 | B2 | 1/2004 | Funk et al. |
| 6,690,940 | B1 | 2/2004 | Brown et al. |
| 6,724,920 | B1 | 4/2004 | Berenz et al. |
| 6,782,240 | B1 | 8/2004 | Tabe |
| 7,019,641 | B1 | 3/2006 | Lakshmanan et al. |
| 7,295,921 | B2 | 11/2007 | Spencer et al. |
| 7,343,148 | B1 | 3/2008 | O'Neil |
| 7,474,264 | B2 | 1/2009 | Bolduc et al. |
| 7,493,140 | B2 | 2/2009 | Michmerhuizen et al. |
| 7,506,375 | B2 | 3/2009 | Kanda et al. |
| 7,548,815 | B2 | 6/2009 | Watkins et al. |
| 7,549,041 | B2 | 6/2009 | Wang |
| 7,606,660 | B2 | 10/2009 | Diaz et al. |
| 7,643,913 | B2 | 1/2010 | Taki et al. |
| 7,734,315 | B2 | 6/2010 | Rathus et al. |
| 7,738,462 | B2 | 6/2010 | Hwang |
| RE41,449 | E | 7/2010 | Krahnstoever et al. |
| 7,891,004 | B1 | 2/2011 | Gelvin et al. |
| 7,899,610 | B2 | 3/2011 | McClellan |
| 8,346,432 | B2 | 1/2013 | Van Wiemeersch et al. |
| 8,432,260 | B2 | 4/2013 | Talty et al. |
| 8,527,143 | B2 | 9/2013 | Tan |
| 8,532,574 | B2 | 9/2013 | Kirsch |
| 8,583,292 | B2 | 11/2013 | Preston et al. |
| 8,644,165 | B2 | 2/2014 | Saarimaki et al. |
| 8,706,143 | B1 | 4/2014 | Elias |
| 8,725,311 | B1 | 5/2014 | Breed |
| 8,761,673 | B2 | 6/2014 | Sakata |
| 8,774,842 | B2 | 7/2014 | Jones et al. |
| 8,817,761 | B2 | 8/2014 | Gruberman et al. |
| 8,818,725 | B2 | 8/2014 | Ricci |
| 8,838,088 | B1 | 9/2014 | Henn et al. |
| 8,868,899 | B2 | 10/2014 | Galicia et al. |
| 2002/0023010 | A1 | 2/2002 | Rittmaster et al. |
| 2002/0045484 | A1 | 4/2002 | Eck et al. |
| 2002/0105968 | A1 | 8/2002 | Pruzan et al. |
| 2003/0007227 | A1 | 1/2003 | Ogino |
| 2003/0158638 | A1 | 8/2003 | Yakes et al. |
| 2003/0182435 | A1 | 9/2003 | Redlich et al. |
| 2004/0024502 | A1 | 2/2004 | Squires et al. |
| 2004/0255123 | A1 | 12/2004 | Noyama et al. |
| 2005/0031100 | A1 | 2/2005 | Iggulden et al. |
| 2005/0042999 | A1 | 2/2005 | Rappaport |
| 2005/0130744 | A1 | 6/2005 | Eck et al. |
| 2005/0149752 | A1 | 7/2005 | Johnson et al. |
| 2005/0153760 | A1 | 7/2005 | Varley |
| 2006/0042846 | A1 | 3/2006 | Kojori et al. |
| 2006/0047386 | A1 | 3/2006 | Kanevsky et al. |
| 2006/0125631 | A1 | 6/2006 | Sharony |
| 2006/0250272 | A1 | 11/2006 | Puamau |
| 2006/0274829 | A1 | 12/2006 | Siemens et al. |
| 2007/0015485 | A1 | 1/2007 | DeBiasio et al. |
| 2007/0057781 | A1 | 3/2007 | Breed |
| 2007/0103328 | A1 | 5/2007 | Lakshmanan et al. |
| 2007/0120697 | A1 | 5/2007 | Ayoub et al. |
| 2007/0156317 | A1 | 7/2007 | Breed |
| 2008/0051957 | A1 | 2/2008 | Breed et al. |
| 2008/0090522 | A1 | 4/2008 | Oyama |
| 2008/0129475 | A1 | 6/2008 | Breed et al. |
| 2008/0140278 | A1 | 6/2008 | Breed |
| 2008/0148374 | A1 | 6/2008 | Spaur et al. |
| 2008/0174451 | A1 | 7/2008 | Harrington et al. |
| 2008/0212215 | A1 | 9/2008 | Schofield et al. |
| 2008/0234919 | A1 | 9/2008 | Ritter et al. |
| 2008/0253613 | A1 | 10/2008 | Jones et al. |
| 2008/0305780 | A1 | 12/2008 | Williams et al. |
| 2009/0082951 | A1 | 3/2009 | Graessley |
| 2009/0180668 | A1 | 7/2009 | Jones et al. |
| 2009/0224931 | A1 | 9/2009 | Dietz et al. |
| 2009/0275321 | A1 | 11/2009 | Crow |
| 2009/0278750 | A1 | 11/2009 | Man et al. |
| 2009/0278806 | A1 | 11/2009 | Duarte et al. |
| 2009/0279839 | A1 | 11/2009 | Nakamura et al. |
| 2010/0042498 | A1 | 2/2010 | Schalk |
| 2010/0090817 | A1 | 4/2010 | Yamaguchi et al. |
| 2010/0097239 | A1 | 4/2010 | Campbell et al. |
| 2010/0144284 | A1 | 6/2010 | Chutorash et al. |

(56) References Cited

U.S. PATENT DOCUMENTS

| | | |
|---|---|---|
| 2010/0202346 A1 | 8/2010 | Sitzes et al. |
| 2010/0222939 A1 | 9/2010 | Namburu et al. |
| 2010/0235042 A1 | 9/2010 | Ying |
| 2010/0253493 A1 | 10/2010 | Szczerba et al. |
| 2010/0295676 A1 | 11/2010 | Khachaturov et al. |
| 2011/0021213 A1 | 1/2011 | Carr |
| 2011/0021234 A1 | 1/2011 | Tibbitts et al. |
| 2011/0035098 A1 | 2/2011 | Goto et al. |
| 2011/0053506 A1 | 3/2011 | Lemke et al. |
| 2011/0092159 A1 | 4/2011 | Park et al. |
| 2011/0105097 A1 | 5/2011 | Tadayon et al. |
| 2011/0106375 A1 | 5/2011 | Sundaram et al. |
| 2011/0112969 A1 | 5/2011 | Zaid et al. |
| 2011/0117933 A1 | 5/2011 | Andersson |
| 2011/0137520 A1 | 6/2011 | Rector et al. |
| 2011/0195699 A1 | 8/2011 | Tadayon et al. |
| 2011/0267204 A1 | 11/2011 | Chuang et al. |
| 2012/0006610 A1 | 1/2012 | Wallace et al. |
| 2012/0071097 A1 | 3/2012 | Matsushita et al. |
| 2012/0081267 A1 | 4/2012 | Sirpal et al. |
| 2012/0081311 A1 | 4/2012 | Sirpal et al. |
| 2012/0084542 A1 | 4/2012 | Reeves et al. |
| 2012/0084735 A1 | 4/2012 | Sirpal |
| 2012/0084792 A1 | 4/2012 | Benedek et al. |
| 2012/0089299 A1 | 4/2012 | Breed |
| 2012/0109446 A1 | 5/2012 | Yousefi et al. |
| 2012/0110356 A1 | 5/2012 | Yousefi et al. |
| 2012/0115446 A1 | 5/2012 | Guatama et al. |
| 2012/0116609 A1 | 5/2012 | Jung et al. |
| 2012/0116678 A1 | 5/2012 | Witmer |
| 2012/0173900 A1 | 7/2012 | Diab et al. |
| 2012/0173905 A1 | 7/2012 | Diab et al. |
| 2012/0238286 A1 | 9/2012 | Mallavarapu et al. |
| 2012/0242510 A1 | 9/2012 | Choi et al. |
| 2012/0259951 A1 | 10/2012 | Schalk et al. |
| 2012/0274459 A1 | 11/2012 | Jaisimha et al. |
| 2012/0284292 A1 | 11/2012 | Rechsteiner et al. |
| 2012/0289217 A1 | 11/2012 | Reimer et al. |
| 2012/0296567 A1 | 11/2012 | Breed |
| 2012/0313771 A1 | 12/2012 | Wottlifff, III |
| 2013/0035063 A1 | 2/2013 | Fisk et al. |
| 2013/0099940 A1 | 4/2013 | Protopapas |
| 2013/0134730 A1 | 5/2013 | Ricci |
| 2013/0135118 A1 | 5/2013 | Ricci |
| 2013/0138591 A1 | 5/2013 | Ricci |
| 2013/0138714 A1 | 5/2013 | Ricci |
| 2013/0141247 A1 | 6/2013 | Ricci |
| 2013/0141252 A1 | 6/2013 | Ricci |
| 2013/0143495 A1 | 6/2013 | Ricci |
| 2013/0143546 A1 | 6/2013 | Ricci |
| 2013/0143601 A1 | 6/2013 | Ricci |
| 2013/0144459 A1 | 6/2013 | Ricci |
| 2013/0144460 A1 | 6/2013 | Ricci |
| 2013/0144461 A1 | 6/2013 | Ricci |
| 2013/0144462 A1 | 6/2013 | Ricci |
| 2013/0144463 A1 | 6/2013 | Ricci et al. |
| 2013/0144470 A1 | 6/2013 | Ricci |
| 2013/0144474 A1 | 6/2013 | Ricci |
| 2013/0144486 A1 | 6/2013 | Ricci |
| 2013/0144520 A1 | 6/2013 | Ricci |
| 2013/0144657 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0152003 A1 | 6/2013 | Ricci et al. |
| 2013/0154298 A1 | 6/2013 | Ricci |
| 2013/0157640 A1 | 6/2013 | Aycock |
| 2013/0158821 A1 | 6/2013 | Ricci |
| 2013/0166097 A1 | 6/2013 | Ricci |
| 2013/0167159 A1 | 6/2013 | Ricci et al. |
| 2013/0179689 A1 | 7/2013 | Matsumoto et al. |
| 2013/0190978 A1 | 7/2013 | Kato et al. |
| 2013/0198737 A1 | 8/2013 | Ricci |
| 2013/0198802 A1 | 8/2013 | Ricci |
| 2013/0200991 A1 | 8/2013 | Ricci et al. |
| 2013/0203400 A1 | 8/2013 | Ricci |
| 2013/0204466 A1 | 8/2013 | Ricci |
| 2013/0204484 A1 | 8/2013 | Ricci |
| 2013/0204493 A1 | 8/2013 | Ricci et al. |
| 2013/0204943 A1 | 8/2013 | Ricci |
| 2013/0205026 A1 | 8/2013 | Ricci |
| 2013/0205412 A1 | 8/2013 | Ricci |
| 2013/0212659 A1 | 8/2013 | Maher et al. |
| 2013/0218412 A1 | 8/2013 | Ricci |
| 2013/0219039 A1 | 8/2013 | Ricci |
| 2013/0227648 A1 | 8/2013 | Ricci |
| 2013/0231800 A1 | 9/2013 | Ricci |
| 2013/0241720 A1 | 9/2013 | Ricci et al. |
| 2013/0245882 A1 | 9/2013 | Ricci |
| 2013/0250933 A1 | 9/2013 | Yousefi et al. |
| 2013/0282238 A1 | 10/2013 | Ricci et al. |
| 2013/0282946 A1 | 10/2013 | Ricci |
| 2013/0288606 A1 | 10/2013 | Kirsch |
| 2013/0293364 A1 | 11/2013 | Ricci et al. |
| 2013/0293452 A1 | 11/2013 | Ricci et al. |
| 2013/0295901 A1 | 11/2013 | Abramson et al. |
| 2013/0309977 A1 | 11/2013 | Heines et al. |
| 2014/0032014 A1 | 1/2014 | DeBiasio et al. |
| 2014/0066014 A1 | 3/2014 | Nicholson et al. |
| 2014/0088798 A1 | 3/2014 | Himmelstein |
| 2014/0120829 A1 | 5/2014 | Bhamidipati et al. |
| 2014/0125802 A1 | 5/2014 | Beckert et al. |
| 2014/0143839 A1 | 5/2014 | Ricci |

OTHER PUBLICATIONS

Notice of Allowance for U.S. Appl. No. 13/679,857, mailed Dec. 3, 2014 5 pages.

Notice of Allowance for U.S. Appl. No. 13/679,878, mailed Feb. 2, 2015 5 pages.

Official Action for U.S. Appl. No. 13/679,875, mailed Dec. 26, 2014 14 pages.

Official Action for U.S. Appl. No. 13/679,676, mailed Feb 25, 2015 14 pages.

Notice of Allowance for U.S. Appl. No. 13/679,441, mailed Oct. 29, 2014 5 pages.

Official Action for U.S. Appl. No. 13/679,864, mailed Nov. 3, 2014 9 pages.

Official Action for U.S. Appl. No. 13/679,476, mailed Jan. 16, 2015 23 pages.

Official Action for U.S. Appl. No. 13/828,513, mailed Dec. 24, 2014 7 pages.

Notice of Allowance for U.S. Appl. No. 13/828,651, mailed Feb. 2, 2015 10 pages.

Official Action for U.S. Appl. No. 13/828,758, mailed Feb. 12, 2015 10 pages.

Official Action for U.S. Appl. No. 13/828,860, mailed Feb. 27, 2015 16 pages.

Official Action for U.S. Appl. No. 13/828,960, mailed Jan. 5, 2015 15 pages.

Notice of Allowance for U.S. Appl. No. 13/829,505, mailed Nov. 26, 2014 8 pages.

Notice of Allowance for U.S. Appl. No. 13/829,718, mailed Nov. 21, 2014 5 pages.

Notice of Allowance for U.S. Appl. No. 13/830,003, mailed Nov. 21, 2014 7 pages.

Official Action for U.S. Appl. No. 13/830,133, mailed Oct. 29, 2014 31 pages.

Notice of Allowance for U.S. Appl. No. 13/830,133, mailed Mar. 3, 2015 5 pages.

Notice of Allowance for U.S. Appl. No. 13/679,887, mailed Nov. 13, 2014 5 pages.

U.S. Appl. No. 14/485,467, filed Sep. 12, 2014, Ricci.

(56) References Cited

OTHER PUBLICATIONS

"A8: Technology as standard," Screen-shots from Audi.co.uk, 2014 [retrieved on Apr. 16, 2014], 1 page. Retrieved from: www.audi.co.uk/new-cars/a8/a8/technology-as-standard/mmi-touch.html.

"Audi A8 MMI Touch," Audi of America, Jan. 7, 2011, [retrieved on Apr. 16, 2014], 2 pages. Retrieved from: www.youtube.com/watch?v=O2nZ-WHo9IA.

"Cadillac: 2013 XTS Full-Size Luxury Sedan," Cadillac.com, 4 pages, Jun. 2012 internet archive, found at: (web.archive.org/web/20120606185204/http://www.cadillac.com/xts-luxury-sedan.html).

"Time-triggered CAN," CIA, © 2001-2013, 4 pages, found at: (www.can-cia.org/index.php?id+166).

Davis et al. "Controller Area Network (CAN) schedulability analysis: Refuted, revisited and revised," Real-Time Systems, Apr. 2007, vol. 35, No. 3, pp. 239-272.

Di Natale "Controller Area Network," Dec. 2009, 54 pages.

Diaz, "Audi New MMI Touch Input System Makes Perfect Sense," Gizmodo.com, Dec. 1, 2009 [retrieved on Apr. 16, 2014], 12 pages. Retrieved from: http://gizmodo.com/5416342/audi-new-mmi-touch-input-system-makes-perfect-sense.

Fonseca et al. "Scheduling for a TTCAN network with a stochastic optimization algorithm," Proceedings 8th Internatioanl CAN Conference, Jan. 2002, 7 pages.

Hartwich et al. "CAN Network with Time Triggered Communication," Robert Bosch GmbH Proceedings 7th International CAN Conference, Jul. 2000, 7 pages.

Idstein et al. "Using the Controller Area Network for Communication Between Prostesis Sensors and Control Systems," Proceedings of the 2011 MyoElectric Controls/Powered Prostetics Symposium Fredericton, New Brunswick, Canada, Aug. 14-19, 2011, 4 pages.

Lee "Cadillac revamps the instrument panel with CUE," CNET Reviews, Oct. 11, 2011, 5 pages, found at: (reviews.cnet.com/8301-12261_7-20118807-10356022/cadillac-revamps-the-instrument-panel-with-cue/).

Marturano "General Motors Takes a CUE from Customers," InContext, Nov. 8, 2011, 3 pages, found at: (incontextdesign.com/blog/general-motors-takes-a-cue-from-customers/).

Purcher "Apple Invents In-Vehicle Holistic ID for "iOS in the Car"," Patently Apple, Dec. 2013, 8 pages [retrieved on Dec. 12, 2013 from: www.patentlyapple.com/patently-apple/2013/12/apple-invents-in-vehicle-holistic-id-for-ios-in-the-car.html].

International Search Report and Written Opinion for International (PCT) Patent Application No. PCT/US12/65510, mailed May 6, 2013 17 pages.

International Preliminary Report on Patentability for International (PCT) Patent Application No. PCT/US2012/065510, mailed May 30, 2014 14 pages.

International Search Report and Written Opinion for International (PCT) Patent Application No. PCT/US12/65613, mailed Feb. 15, 2013 9 pages.

International Preliminary Report on Patentability for International (PCT) Patent Application No. PCT/US2012/065613, mailed May 30, 2014 8 pages.

International Search Report and Written Opinion for International (PCT) Patent Application No. PCT/US2014/019983, mailed Aug. 18, 2014 10 pages.

International Search Report and Written Opinion for International (PCT) Patent Application No. PCT/US14/19216, mailed Jul. 25, 2014 8 pages.

International Search Report and Written Opinion for International (PCT) Patent Application No. PCT/US14/19209, mailed Apr. 25, 2014.

International Search Report and Written Opinion for International (PCT) Patent Application No. PCT/US14/19201, mailed Jul. 29, 2014 11 pages.

Official Action for U.S. Appl. No. 13/679,857, mailed Jun. 27, 2014 5 pages.

Official Action for U.S. Appl. No. 13/679,878, mailed Sep. 26, 2014 7 pages.

Official Action for U.S. Appl. No. 13/679,875, mailed Apr. 7, 2014 7 pages Restriction Requirement.

Official Action for U.S. Appl. No. 13/679,875, mailed Jul. 17, 2014 13 pages.

Official Action for U.S. Appl. No. 13/679,441, mailed Sep. 5, 2013 6 pages.

Official Action for U.S. Appl. No. 13/679,441, mailed Jan. 16, 2014 6 pages.

Official Action for U.S. Appl. No. 13/679,441, mailed May 9, 2014 6 pages.

Notice of Allowance for U.S. Appl. No. 13/679,441, mailed Jul. 22, 2014 5 pages.

Official Action for U.S. Appl. No. 13/679,864, mailed Aug. 21, 2014 5 pages Restriction Requirement.

Official Action for U.S. Appl. No. 13/679,476, mailed Oct. 11, 2013 13 pages.

Official Action for U.S. Appl. No. 13/679,476, mailed May 20, 2014 19 pages.

Official Action for U.S. Appl. No. 13/828,513, mailed May 6, 2014 7 pages.

Official Action for U.S. Appl. No. 13/828,513, mailed Sep. 4, 2014 5 pages.

Official Action for U.S. Appl. No. 13/828,651, mailed Jul. 29, 2014 17 pages.

Notice of Allowance for U.S. Appl. No. 13/829,157, mailed Jul. 25, 2014 14 pages.

Official Action for U.S. Appl. No. 13/829,505, mailed Jul. 23, 2014 7 pages.

Official Action for U.S. Appl. No. 13/829,718, mailed Apr. 10, 2014 7 pages.

Official Action for U.S. Appl. No. 13/829,718, mailed Jul. 25, 2014 8 pages.

Official Action for U.S. Appl. No. 13/830,003, mailed Apr. 15, 2014 9 pages.

Official Action for U.S. Appl. No. 13/830,003, mailed Jul. 25, 2014 9 pages.

Official Action for U.S. Appl. No. 13/830,133, mailed Jul. 10, 2014 9 pages.

Official Action for U.S. Appl. No. 6583-315, mailed Jul. 9, 2013 10 pages.

Official Action for U.S. Appl. No. 13/678,773, mailed Dec. 30, 2013 9 pages.

Notice of Allowance for U.S. Appl. No. 13/678,773, mailed Apr. 2, 2014 5 pages.

Official Action for U.S. Appl. No. 13/679,887, mailed Jun. 30, 2014 6 pages.

- Simplify and coordinate all data streams
- Enable efficient technology upgrading
- Enable ease of new technology introduction
- Provide industry accepted protocol
- Improve network security
- Limitless potential with cloud based services Data Stream Management

LOCATION INFORMATION EXCHANGE BETWEEN VEHICLE AND DEVICE

CROSS REFERENCE TO RELATED APPLICATIONS

The present application is a continuation application of U.S. patent application Ser. No. 13/678,773, filed on Nov. 16, 2012, now U.S. Pat. No. 8,818,725, which claims the benefits of and priority, under 35 U.S.C. §119(e), to U.S. Provisional Application Ser. Nos. 61/560,509, filed on Nov. 16, 2011, entitled "Complete Vehicle Ecosystem"; 61/637,164, filed on Apr. 23, 2012, entitled "Complete Vehicle Ecosystem"; 61/646,747, filed on May 14, 2012, entitled "Branding of Electrically Propelled Vehicles Via the Generation of Specific Operating Sounds"; 61/653,275, filed on May 30, 2012, entitled "Vehicle Application Store for Console"; 61/653,264, filed on May 30, 2012, entitled "Control of Device Features Based on Vehicle State"; 61/653,563, filed on May 31, 2012, entitled "Complete Vehicle Ecosystem"; 61/663,335, filed on Jun. 22, 2012, entitled "Complete Vehicle Ecosystem"; 61/672,483, filed on Jul. 17, 2012, entitled "Vehicle Climate Control"; 61/714,016, filed on Oct. 15, 2012, entitled "Vehicle Middleware"; and 61/715,699, filed Oct. 18, 2012, entitled "Vehicle Middleware." The entire disclosures of the applications listed above are hereby incorporated by reference, in their entirety, for all that they teach and for all purposes.

This application is also related to U.S. patent application Ser. No. 13/420,236, filed on Mar. 14, 2012, entitled, "Configurable Vehicle Console"; Ser. No. 13/420,240, filed on Mar. 14, 2012, entitled "Removable, Configurable Vehicle Console"; Ser. No. 13/462,593, filed on May 2, 2012, entitled "Configurable Dash Display"; Ser. No. 13/462,596, filed on May 2, 2012, entitled "Configurable Heads-Up Dash Display"; Ser. No. 13/679,459, filed on Nov. 16, 2012, entitled "Vehicle Comprising Multi-Operating System"; Ser. No. 13/679,234, filed on Nov. 16, 2012, entitled "Gesture Recognition for On-Board Display"; Ser. No. 13/679,412, filed on Nov. 16, 2012, entitled "Vehicle Application Store for Console"; Ser. No. 13/679,857, filed on Nov. 16, 2012, entitled "Sharing Applications/Media Between Car and Phone (Hydroid)"; Ser. No. 13/679,878, filed on Nov. 16, 2012, entitled "In-Cloud Connection for Car Multimedia"; Ser. No. 13/679,875, filed on Nov. 16, 2012, entitled "Music Streaming"; Ser. No. 13/679,676, filed on Nov. 16, 2012, entitled "Control of Device Features Based on Vehicle State"; Ser. No. 13/678,673, filed on Nov. 16, 2012, entitled "Insurance Tracking"; Ser. No. 13/678,691, filed on Nov. 16, 2012, entitled "Law Breaking/Behavior Sensor"; Ser. No. 13/678,699, filed on Nov. 16, 2012, entitled "Etiquette Suggestion"; Ser. No. 13/678,710, filed on Nov. 16, 2012, entitled "Parking Space Finder Based on Parking Meter Data"; Ser. No. 13/678,722, filed on Nov. 16, 2012, entitled "Parking Meter Expired Alert"; Ser. No. 13/678,726, filed on Nov. 16, 2012, entitled "Object Sensing (Pedestrian Avoidance/Accident Avoidance)"; Ser. No. 13/678,735, filed on Nov. 16, 2012, entitled "Proximity Warning Relative to Other Cars"; Ser. No. 13/678,745, filed on Nov. 16, 2012, entitled "Street Side Sensors"; Ser. No. 13/678,753, filed on Nov. 16, 2012, entitled "Car Location"; Ser. No. 13/679,441, filed on Nov. 16, 2012, entitled "Universal Bus in the Car"; Ser. No. 13/679,864, filed on Nov. 16, 2012, entitled "Mobile Hot Spot/Router/Application Share Site or Network"; Ser. No. 13/679,815, filed on Nov. 16, 2012, entitled "Universal Console Chassis for the Car"; Ser. No. 13/679,476, filed on Nov. 16, 2012, entitled "Vehicle Middleware"; Ser. No. 13/679,306, filed on Nov. 16, 2012, entitled "Method and System for Vehicle Data Collection Regarding Traffic"; Ser. No. 13/679,369, filed on Nov. 16, 2012, entitled "Method and System for Vehicle Data Collection"; Ser. No. 13/679,680, filed on Nov. 16, 2012, entitled "Communications Based on Vehicle Diagnostics and Indications"; Ser. No. 13/679,443, filed on Nov. 16, 2012, entitled "Method and System for Maintaining and Reporting Vehicle Occupant Information"; Ser. No. 13/678,762, filed on Nov. 16, 2012, entitled "Behavioral Tracking and Vehicle Applications"; Ser. No. 13/840,240, filed on Mar. 15, 2013, entitled "Controller Area Network Bus"; Ser. No. 13/679,887, filed on Nov. 16, 2012, entitled "In Car Communication Between Devices"; Ser. No. 13/679,842, filed on Nov. 16, 2012, entitled "Configurable Hardware Unit for Car Systems"; Ser. No. 13/679,204, filed on Nov. 16, 2012, entitled "Feature Recognition for Configuring a Vehicle Console and Associated Devices"; Ser. No. 13/679,350, filed on Nov. 16, 2012, entitled "Configurable Vehicle Console"; Ser. No. 13/679,358, filed on Nov. 16, 2012, entitled "Configurable Dash Display"; Ser. No. 13/679,363, filed on Nov. 16, 2012, entitled "Configurable Heads-Up Dash Display"; and Ser. No. 13/679,368, filed on Nov. 16, 2012, entitled "Removable, Configurable Vehicle Console". The entire disclosures of the applications listed above are hereby incorporated by reference, in their entirety, for all that they teach and for all purposes.

BACKGROUND

Whether using private, commercial, or public transport, the movement of people and/or cargo has become a major industry. In today's interconnected world daily travel is essential to engaging in commerce. Commuting to and from work can account for a large portion of a traveler's day. As a result, vehicle manufacturers have begun to focus on making this commute, and other journeys, more enjoyable.

Currently, vehicle manufacturers attempt to entice travelers to use a specific conveyance based on any number of features. Most of these features focus on vehicle safety, or efficiency. From the addition of safety-restraints, air-bags, and warning systems to more efficient engines, motors, and designs, the vehicle industry has worked to appease the supposed needs of the traveler. Recently, however, vehicle manufactures have shifted their focus to user and passenger comfort as a primary concern. Making an individual more comfortable while traveling instills confidence and pleasure in using a given vehicle, increasing an individual's preference for a given manufacturer and/or vehicle type.

One way to instill comfort in a vehicle is to create an environment within the vehicle similar to that of an individual's home or place of comfort. Integrating features in a vehicle that are associated with comfort found in an individual's home can ease a traveler's transition from home to vehicle. Several manufacturers have added comfort features in vehicles such as the following: leather seats, adaptive and/or personal climate control systems, music and media players, ergonomic controls, and in some cases Internet connectivity. However, because these manufacturers have added features to a conveyance, they have built comfort around a vehicle and failed to build a vehicle around comfort.

SUMMARY

There is a need for a vehicle ecosystem that can integrate both physical and mental comforts while seamlessly operating with current electronic devices to result in a totally intuitive and immersive user experience. These and other needs are addressed by the various aspects, embodiments, and/or configurations of the present disclosure. Also, while the disclosure is presented in terms of exemplary embodiments, it should be appreciated that individual aspects of the disclosure can be separately claimed.

The present disclosure can provide a number of advantages depending on the particular aspect, embodiment, and/or configuration. Currently, the vehicle industry is dominated by conveyances offering a separate comfort experience from a home, work, or other aspect of a traveler's life. Unfortunately, current vehicles include a series of separate devices that work together while an individual or individuals are associated with the vehicle. Technology areas and devices such as user interfaces, applications, tracking capabilities, hardware, and/or location-based communications, could be combined together, or used separately, to form a complete vehicle ecosystem. This ecosystem can provide a connected and intuitive user experience for any traveler.

At least one embodiment of the present disclosure describes using a series of devices associated with a vehicle along with other devices to form a complete and familiar user experience. In particular, the devices, applications, interfaces, hardware, and software may combine to form a user-friendly environment while traveling or otherwise moving from one location to another and/or when a vehicle is at rest. Moreover, aspects of the present disclosure may provide communication between the vehicle and a user at any given time. Specifically, communication between a vehicle and another device may also relay information to an individual and/or group of individuals. This communication between a vehicle and at least on other device may include, but is not limited to, communication between a vehicle and: 1) at least one mobile device, 2) at least one other vehicle, 3) another system/group of devices, 4) a non-mobile device, and 5) combinations thereof. These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "desktop" refers to a metaphor used to portray systems. A desktop is generally considered a "surface" that typically includes pictures, called icons, widgets, folders, etc., that can activate and show representations of applications, windows, cabinets, files, folders, documents, and other graphical items. The icons are generally selectable to initiate a task through user interface interaction to allow a user to execute applications or conduct other operations.

The term "display" refers to a portion of a screen used to display the output of a computer to a user.

The term "displayed image" refers to an image produced on the display. A typical displayed image is a window or desktop. The displayed image may occupy all or a portion of the display.

The term "display orientation" refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical. The multi-screen display can have one composite display that encompasses all the screens. The composite display can have different display characteristics based on the various orientations of the device.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "module" as used herein refers to any known or later developed hardware, software, firmware, artificial intelligence, fuzzy logic, or combination of hardware and software that is capable of performing the functionality associated with that element.

The term "gesture capture" refers to a sense or otherwise a detection of an instance and/or type of user gesture. The gesture capture can occur in one or more areas of the screen, A gesture region can be on the display, where it may be referred to as a touch sensitive display or off the display where it may be referred to as a gesture capture area.

A "multi-screen application" refers to an application that is capable of producing one or more windows that may simultaneously occupy multiple screens. A multi-screen application commonly can operate in single-screen mode in which one or more windows of the application are displayed only on one screen or in multi-screen mode in which one or more windows are displayed simultaneously on multiple screens.

A "single-screen application" refers to an application that is capable of producing one or more windows that may occupy only a single screen at a time.

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "window" refers to a, typically rectangular, displayed image on at least part of a display that contains or provides content different from the rest of the screen. The window may obscure a portion of the desktop.

The terms "determine", "calculate" and "compute," and variations thereof, as used herein, are used interchangeably and include any type of methodology, process, mathematical operation or technique.

It shall be understood that the term "means" as used herein shall be given its broadest possible interpretation in accordance with 35 U.S.C. §112, Paragraph 6. Accordingly, a claim incorporating the term "means" shall cover all structures, materials, or acts set forth herein, and all of the equivalents thereof. Further, the structures, materials or acts and the equivalents thereof shall include all those described in any portion of this document. Any one or more of the embodiments herein can therefore be claimed using means-type language.

The term "vehicle" as used herein includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a complete vehicle ecosystem. The ecosystem can comprise single devices or a compilation of devices. This device, or these devices, may be capable of communicating with other device(s) and/or to an individual or group of individuals. Further, this device, or these devices, can receive user input in unique ways. The overall design and functionality of each device provides for an enhanced user experience making the device more useful and more efficient. As described herein, the device(s) may be electrical, mechanical, electro-mechanical, software-based, and/or combinations thereof.

Figure 1A:
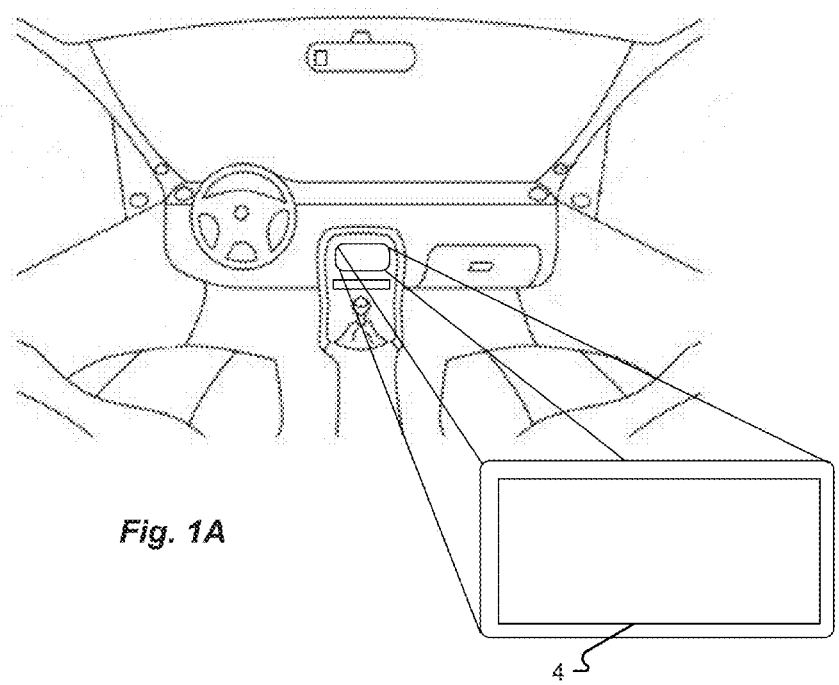
FIG. 1A depicts a configurable console in accordance with one embodiment of the present disclosure.

User Interface:

FIG. 1A depicts a configurable vehicle console 4 in accordance with embodiments of the present disclosure. Vehicle consoles are known to include physical and/or electrical controls for the manipulation of certain vehicle features or functions. For example, vehicles may include climate control, audio control, and other selectable preferences available from a main console. The adjustment of these controls may be achieved through physical and/or touch-screen manipulation of dials, knobs, switches, keys, buttons, and the like. Custom configurability of the controls is limited on current touch-screen consoles and virtually impossible on physical consoles. In both touch-screen and physical consoles, the console remains permanently hard-wired to the vehicle.

In one embodiment of the present disclosure a removable console (4, 4000, 4028) is described. Specifically, the present disclosure is directed to a console that can be simply and repeatably detached and reattached (in one or more vehicles). In some cases, a console of a vehicle may span across, or be separated into, one or more individual screens. The present disclosure anticipates detaching at least one of these console screens. This detachable console screen may have its own processor, memory, and power source. Furthermore, the detachable console screen may be operated as a tablet or portable computing platform. Alternatively, the device may be tethered to the vehicle for use inside a predefined area.

In some embodiments, the detachable console may interface with the vehicle, and/or other consoles, via an attachment point. The attachment point may include an electrical interface and a locking feature. This locking feature may allow removal and/or prevent removal of the detachable console based on specific rules. Furthermore, the locking feature may be configured to provide a rest portion where the detachable console may reside during a connected operation with the vehicle.

In one aspect of the present disclosure the detachable console may provide its location to the vehicle and/or other associated device. For instance, if the detachable console is removed from an area adjacent to the vehicle, an alert may indicate its removal from the predefined area. This alert may be sent to a mobile device, mobile communications device, smartphone, etc, (e.g., a text message). Additionally, the alert may be an audible and/or visual alert to those adjacent to the vehicle. Moreover, the detachable console may provide a signal that can be analyzed to determine location. This signal may be continuously and/or selectively sent according to specific rules.

Figure 1B:
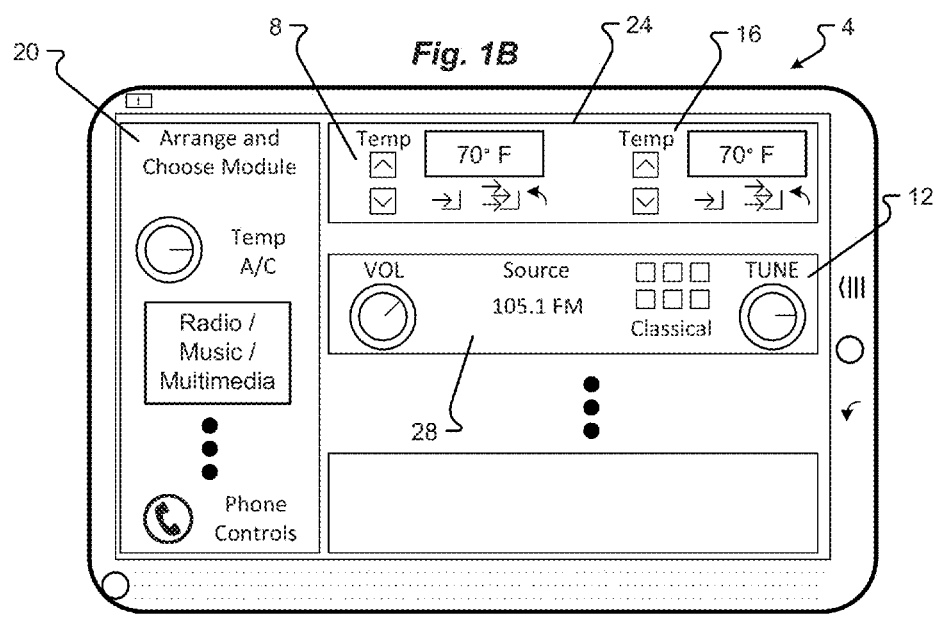
FIG. 1B depicts a configurable console in accordance with another embodiment of the present disclosure.

Referring now to FIG. 1B, a configurable vehicle console 4 is illustrated in accordance with embodiments of the present disclosure. Specifically, the configurable console is shown to incorporate various features and controls (8, 12, 16). These controls and/or features may be selectively and adjustably moved, sized, and/or otherwise adjusted on the console to suit a user's desires. It is one aspect of the present disclosure to allow for the integration of custom designed templates of standard console layouts that users may manipulate and/or modify. These modifications may be saved and stored.

Further, users may select certain controls and/or features from area 20 to display in any given position on the console 4. For example, if a user wishes to have constant access to the climate-control settings of a vehicle, the user may place a "climate-control" module 24 on the configurable console. The position and/or features of this module may be adjusted according to rules and its position may be arranged as desired by the user. It is anticipated that recommended positions for the module, or modules, could be provided by the vehicle console system. If a user wishes to add a "music control" module 28 to the console the user can similarly select position, size, and/or other features associated with the module to best suit the user's needs. A user may access a respective or selected console display configuration from among a plurality of different console display configurations by inputting a code or identifier. The result is that different users of a common vehicle or common make, year, and model can have differently configured console displays.

In some embodiments, these modules may be programmed to disappear, dim, or exhibit other functions in response to some type of stimulus. For example, the user may want one or more control modules to dim upon driving. Alternatively, the user may want one or more modules to disappear according to a timer, based on speed, and/or other stimulus. It is anticipated that the stimulus may include user input, timers, sensors, programmed conditions, and the like.

For example, in the event of an accident, access to a vehicle's music, climate control and/or other non-essential modules is of little benefit. In an emergency scenario, the console may use one or more sensors, possibly including vehicle sensor (e.g., air bag sensor, gyroscope, or accelerometer), to detect the accident and automatically provide emergency features to a user via the console 4. These emergency features could also be invoked manually at the user's request and/or activated by another entity (such as an insurance company). These features may replace the standard modules arranged on the console (e.g., the music and climate modules are minimized or removed, replaced by one or more emergency modules). A large "hazard" light module may be created. Additionally or alternatively, an emergency contact module may be provided to allow the user easy access to an emergency communication channel. Contacting the emergency channel could be left to the discretion of the user. As can be appreciated by one skilled in the art, these emergency modules may automatically contact an emergency channel and/or use timers and other sensors to determine whether to initiate contact with the emergency channel.

In accordance with the present disclosure, it is anticipated that the vehicle may use sensors in an individual's phone or other device to detect a specific user's heartbeat and/or monitor a user's other biological and/or vital signs. These vital signs could be relayed to an emergency contact to aid in possible treatment and/or evaluate a necessary emergency response. Using a phone's, or other device's, gyroscope and/or accelerometer to detect a user's heartbeat could be achieved via storing conditions at a time prior to an accident and comparing the stored conditions to those obtained during the emergency. In the event that a user has associated his or her phone and/or device with the vehicle console, this process of monitoring, sending, and using the vital sign information could be achieved automatically by the console and/or vehicle.

Figure 2:
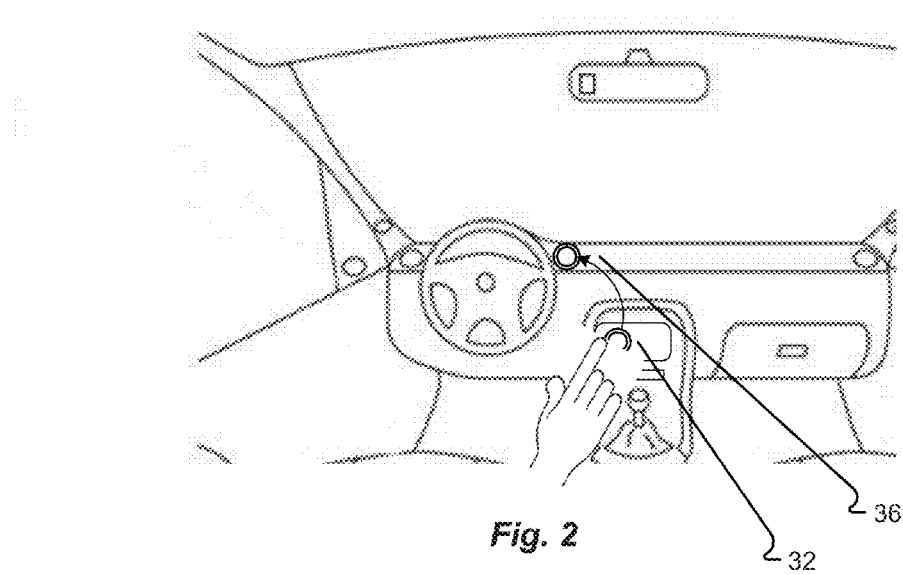
FIG. 2 illustrates a configurable dash display in accordance with embodiments of the present disclosure.

FIG. 2 illustrates a configurable dash display in accordance with embodiments of the present disclosure. Currently, the layouts of most vehicle dashboard displays are static in nature. Specifically, users have limited access to modifying the appearance of their vehicle's instrument panel or dashboard. Typically, these users have access to only adjust the light intensity and in some instances background/foreground colors of a dashboard or instrument panel display. In other words, users cannot fully configure a dashboard or its display.

It is one embodiment of the present disclosure to provide a totally configurable dashboard display. In some embodiments, instruments and information such as readouts, indicators, gauges, and the like 32 can be chosen to appear on the dashboard 36. These instruments may be digital, analog, simulated analog, simulated digital, audible, and/or other output capable of being displayed to the dashboard. It is further anticipated that the scale of these instruments can be customized to meet a user's preferences. For example, a simulated analog speedometer may be chosen because of its design aesthetic and adjusted to read miles-per-hour or kilometers-per-hour in a given range. If the user wishes to have a more accurately displayed simulated-analog output the user may wish to set the maximum value displayed on the speedometer to a lower number (e.g., 75 mph).

It is anticipated that some embodiments of the configurable dashboard may employ the emergency features described above in the configurable console. In some embodiments the configurable dashboard may share features with the configurable console and vice versa. Additionally, these units may be one or more displays that communicate with each other to form a part of the complete vehicle ecosystem When at least one instrument is chosen for the configurable dashboard, it may be moved into a user-desired position on or off the dash panel. Alternatively, the dashboard may provide an automatic arrangement feature to automatically position at least one chose instrument in a predefined or recommended position on the dash panel 36.

In accordance with the present disclosure, specific gauges may be hidden, deleted, or programmed to hide/disappear after start-up or some other predetermined input(s); however, the system may prevent certain gauges from being hidden/deleted. Preventing the hiding of gauges may depend on country, federal, state, local, or other laws. For example, the vehicle may determine that it is within a specific jurisdiction and therefore may require certain gauges be shown at all times. This jurisdiction determination may be made by the vehicle ecosystem using one or more location-based features, such as GPS, WiFi access points, cell tower signals, and the like. Further, a vehicle's location may be determined by another device associated with the vehicle, one that is not necessarily part of the vehicle. In an embodiment, the location of a vehicle may be determined from the location-based features available on a user's mobile phone, or other location-aware device.

In the event that a user has customized a dashboard, and crosses a defined legal boundary (like a state or country border) the current location of the vehicle will define the laws to which the vehicle and associated devices and capabilities must adhere. The original, and other, configuration preferences of a user may be stored in memory. Once the user returns to a geographical location that allows the preset configuration preferences, the configurable dashboard can access the stored memory and may return the dashboard to the preset configuration. It is anticipated that specific geographical location laws could be preprogrammed into a device with which the vehicle communicates, whether the device is on-board or remotely located from the vehicle.

As can be appreciated, traveling across different legal boundaries and/or geographical locations, where certain instruments may be required and consequently appear and disappear from a dashboard may cause confusion to a user. It is an embodiment of the present disclosure to provide an indication to the user that a specific instrument is required in the given location and/or area. In some embodiments, the user may receive a notification upon crossing a legal boundary. In yet another embodiment, where an instrument is required and added to the dashboard, the instrument itself may contain information that it is a required instrument in the territory in which the vehicle is located. For example, if territory "X" requires an odometer to be a part of the dashboard display, the odometer may appear on the dashboard with a highlighted or otherwise emphasized "X" marker to identify the requirement and the jurisdiction. Capabilities of the console may be enabled or disabled based on vehicle location. For example, communication modes, such as texting, tweeting, email, calling and the like, may be enabled or disabled based on vehicle location. Vehicle location may be mapped against applicable laws of a governmental entity, such as a city, municipality, county, province, state, country, and the like. Alternatively, capabilities of the console may be enabled or disabled based on contract requirements, employer rules or policies, insurance requirements, etc.

In some embodiments, the configurable dashboard, and/or console, preferences may be stored by the user. These preferences may be stored locally inside the vehicle. Alternatively, the preferences may be stored remotely from the vehicle. It is anticipated that at least one embodiment provides for the storing of preferences both remotely, such as in the cloud or other storage device(s), and locally. Additionally, the preferences may be linked to a user's key fob, which indicates a specific user and presets the layout. In some instances, preferences may be stored on a memory on the key fob and/or key.

Figure 3:
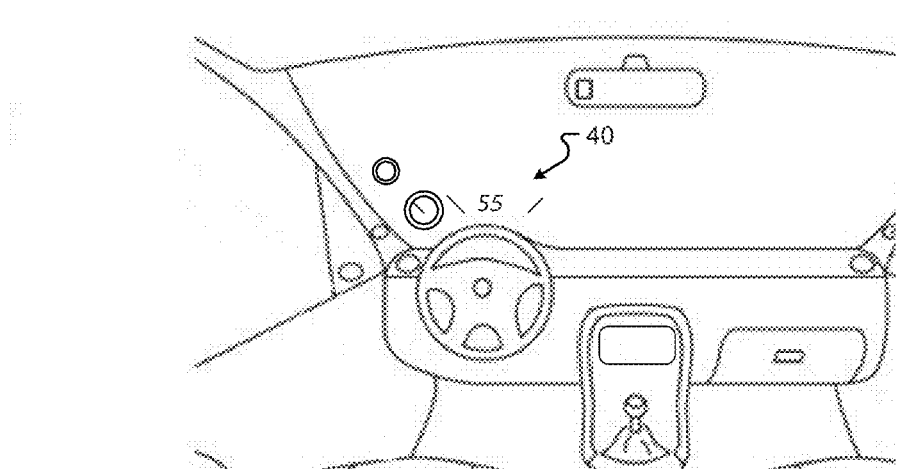
FIG. 3 depicts a configurable heads-up display in accordance with embodiments of the present disclosure.

Referring now to FIG. 3, an embodiment of a configurable heads-up display 40 is depicted. It is at least one aspect of the present disclosure to allow at least one user to configure a heads-up display 40 with instruments and other information to provide at least one user with an optimal view and function. In some embodiments, the configurable heads-up display may exhibit substantially similar behavioral features as the configurable dashboard and/or console described above. In addition, the configurable heads-up display may include features from the dashboard, the console, and/or other devices to display in a heads-up manner. In one embodiment, the heads-up display may include image-directing features to provide for the display of information on a surface in at least one individual's view. In the event that a vehicle operator wishes to display information pertinent to the act of travelling, the operator may customize the appearance of the displayed information by moving, adding, deleting, loading, and/or programming custom view layouts.

Figure 4:
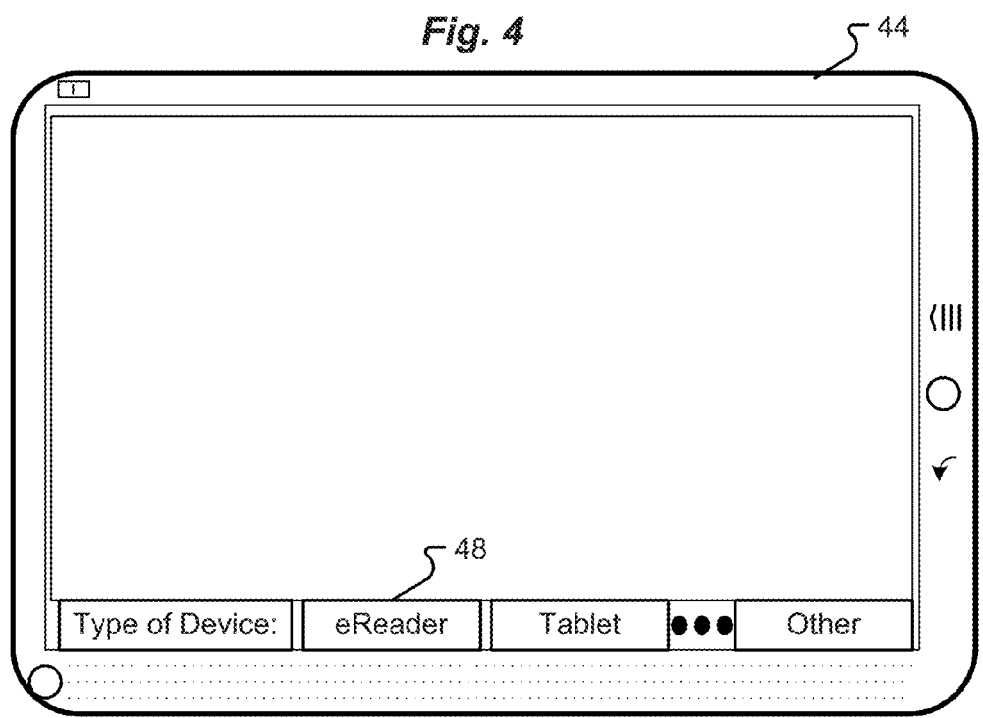
FIG. 4 depicts a user-configurable device in accordance with embodiments of the present disclosure.

FIG. 4 depicts an embodiment of a user-configurable device 44. In accordance with embodiments of the present disclosure, a device is described that is capable of mimicking the behavior of other devices based on a received stimulus. Specifically, the device may be the detachable console 4 described above and/or it may be another user device.

In some embodiments, a user can provide the stimulus to initiate the mimicking process. This stimulus may also be provided electronically, by program, and/or output of another process or device. For example, a stimulus may direct the device to act as an eReader, (through selection of the eReader button 48) and the device will reconfigure its display and functionality to behave like an eReader. In addition, the device may be switched from an eReader configuration to a Tablet, a vehicle console, a laptop, an iPad®, cellular phone, smart phone, or other device mode. This multi-mode capability can use different operating systems for different device modes. The different operating systems can be effected by techniques, such as virtual machines and/or partitioning. Another technique is disclosed in U.S. Provisional Application Ser. Nos. 61/389,000, filed Oct. 1, 2010, entitled "DUAL DISPLAY WINDOWING SYSTEM"; 61/389,117, filed Oct. 1, 2010, entitled "MULTI-OPERATING SYSTEM PORTABLE DOCKETING DEVICE"; 61/389,087, filed Oct. 1, 2010, entitled "TABLET COMPUTING USER INTERFACE"; 61/507,199, filed Jul. 13, 2011, entitled "DOCKABLE MOBILE SOFTWARE ARCHITECTURE;" 61/507,203, filed Jul. 13, 2011, entitled "MULTI-OPERATING SYSTEM;" and 61/507,206, filed Jul. 13, 2011, entitled "AUTO-CONFIGURATION OF A DOCKED SYSTEM IN A MULTI-OS ENVIRONMENT," which are all incorporated fully herein by this reference in their entirety for all that they teach and for all purposes. Console mode may be selectively enabled or disabled based on vehicle operating mode (e.g., parked, or in gear), GPS and/or location-based positioning (as noted above), and/or contract and/or rule or policy requirements. Providing this level of functionality allows a single device to have multiple personalities. These multiple personalities can be configured to mimic any number of specific devices.

Figure 5:
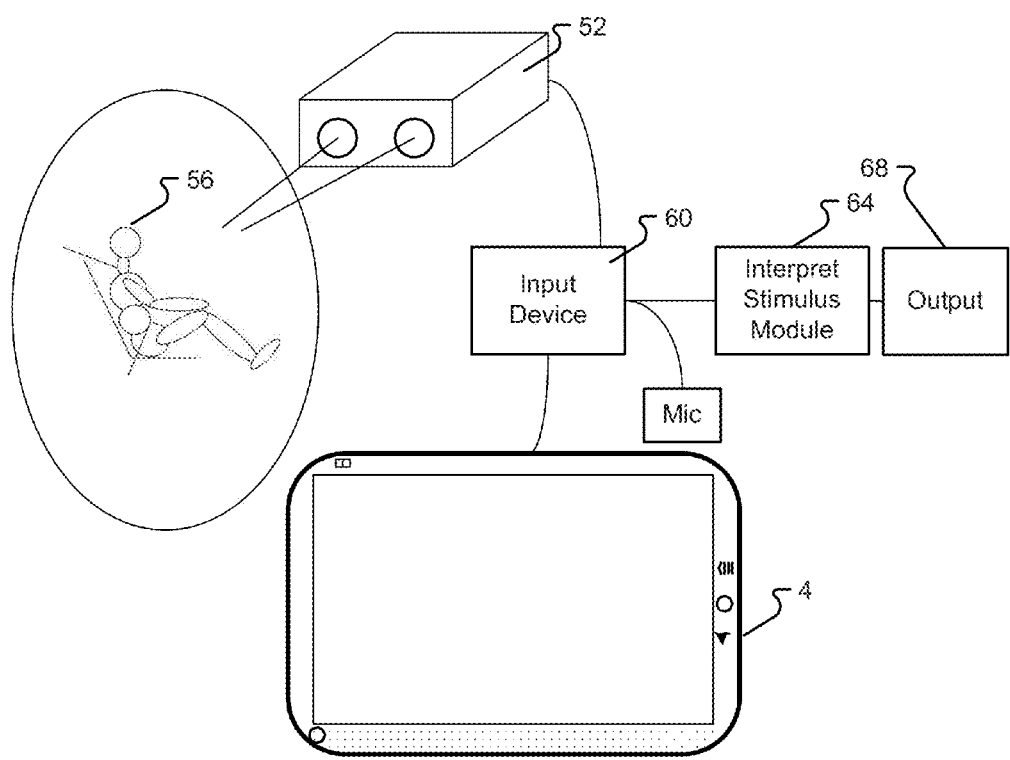
FIG. 5 depicts a gesture recognition aspect of interfacing with the vehicle ecosystem in accordance with the present disclosure.

FIG. 5 depicts a gesture recognition aspect of interfacing with the vehicle ecosystem in accordance with the present disclosure. It is anticipated that the gesture recognition system may include off-screen or off-display gestures (as described in U.S. Provisional Application Ser. Nos. 61/389,000, filed Oct. 1, 2010, entitled "DUAL DISPLAY WINDOWING SYSTEM"; 61/389,117, filed Oct. 1, 2010, entitled "MULTI-OPERATING SYSTEM PORTABLE DOCKETING DEVICE"; 61/389,087, filed Oct. 1, 2010, entitled "TABLET COMPUTING USER INTERFACE," at a console, dashboard, or other interface. Moreover, the off-screen or off-display gestures may refer to the interpretation of hand, facial, body movements and/or combinations thereof by sensors, cameras 52, and the like.

In some embodiments, the vehicle ecosystem may include multiple cameras, sensors, and/or other detection devices to register and interpret at least one individual's 56 movement. A particular body movement, and/or combinations of movements (e.g., hand gestures, and body), may correspond to features that control aspects associated with the vehicle. In accordance with the present disclosure, specific movements may be monitored by the gesture recognition device to provide assistance to a vehicle operator. For example, if at least one individual's facial expression is surprised or alarmed, the gesture recognition device may direct the vehicle to sample data, via sensors and other associated equipment, at a higher rate. If sampling data at "Y" times per second during normal operation, the interpretation of an individual's altered facial expression may direct the system to sample at a rate of "nY" times per second or greater, where "n" is a non-zero scalar value or mathematical function.

In some embodiments, the gesture recognition system may monitor an operator's eyes and/or head movements to detect drowsy behavior and respond accordingly. In particular, the gesture recognition system could determine if an operator's eyes are closed and initiate an alarm. This alarm may be audible, visual, and/or tactile and can optionally use a device such as the user's phone or smartphone. The gesture recognition system may start a timer after initiating the alarm to determine, among other things, whether to take emergency action. Additionally, the gesture recognition system may direct the vehicle to safely slow speed, and in some cases stop the vehicle. Other safety measures may be included in this application to provide for a safe emergency situation (e.g., hazard lights may be activated prior to, during, or after slowing and stopping the vehicle). At least one embodiment anticipates that the gesture recognition system may detect repeat events of drowsy and/or erratic behavior of an operator as a more serious condition. Detection of these repeat events may direct the vehicle to safely stop and/or place a call to emergency services.

It is an aspect of the present disclosure that the camera and/or sensors may detect head movement to determine a physiological state of one or more individuals in a vehicle. For instance, if the gesture recognition system detects that an individual's head has moved from a specific position, or general location, it may indicate that the individual is not in a conscious, or aware, state. Additionally or alternatively, the individual's head may repeatedly move in a manner that suggests the operator is in a poor state of health. In response, the gesture recognition system may direct the vehicle to respond accordingly.

In some embodiments, the gesture recognition system may include one or more cameras, sensors (e.g., audible, visual, infrared, temperature, vehicle, human wearable, near-human, and the like), and/or other devices ("Detection Devices"), may be configured to register or detect at least one physiological state of one or more operators and/or individuals associated with a vehicle. Upon detecting at least one physiological state, the gesture recognition system may respond at least partially based on the at least one physiological state of the one or more operators and/or individuals. For example, the one or more Detection Devices may register certain input as corresponding to an emergency and/or health condition of the operator(s) and/or individual(s) of a vehicle.

In some embodiments, the gesture recognition system may monitor and record one or more inputs received from the one or more operators and/or individuals. This recorded information may be used to establish a baseline physiological state associated with the one or more operators and/or individuals. In some instances, the one or more operators' and/or individuals', temperature, heart-rate, breathing rate, anxiety level, state of awareness, consciousness, etc., may be measured with one or more of the various Detection Devices. These devices may include any and all mechanisms designed to take measurements. For instance, a pulse and/or temperature measuring device may be included in the steering wheel of a vehicle. Additionally or alternatively, the vehicle may include infrared cameras and/or sensors to detect at least one temperature of the one or more operators and/or individuals. As can be appreciated, the vehicle seat and/or seats may include sensors to determine movement, weight, and/or shifts of weight on or about the seat. Additionally or alternatively, the seat may include sensor to detect the presence of fluid (e.g., bodily fluids, drinks, oil, acid, and any other fluid) on or about the seat. The seat sensor may even detect one or more of the temperature, viscosity, electrical and mechanical properties of the fluid and may be configured to differentiate between bodily fluids and other fluids present on or about the seat.

It is anticipated that the gesture recognition system may include at least one audible monitor and/or speech recognition mechanism (in input device 60 with the Microphone) to receive and/or interpret audible signals from the one or more operators and/or individuals. For example, an operator and/or individual may be breathing heavier than a level established as a baseline associated with that individual, detected by audio microphone (or other device) which may cause a response by the gesture recognition system. Additionally or alternatively, an operator and/or individual may express some oral statement that indicates a physiological state. For example, the operator and/or individual may state "I am in pain, and I think I am having a heart attack." It is anticipated that a user may establish one or more "code words" to initiate various levels of emergency response. In these instances, the gesture recognition system may compare the statement in the interpret module 64 with one or more statements in memory to determine how to respond. For example, at a first level, a user may make statements like "I am tired" or "I am feeling pain" and in turn, the gesture recognition system may interpret the information and provide one or more of a location of the nearest accommodations or rest stop, or the like via output 68. At a second level, the gesture recognition system may direct the vehicle and its controls system to monitor traffic conditions and safely slow and even stop the vehicle. At a third level, the gesture recognition system may direct the vehicle to activate one or more emergency signals, lights, internal alarms, radio output, phone calls, and/or take immediate emergency action. It is anticipated that many levels and/or responses may be configured. In some embodiments, the gesture recognition system may be configured to respond based at least partially on the detected conditions and/or physiological state of the one or more operators and/or individuals. In addition to speech content, some embodiments anticipate using a pitch, tone, and/or volume associated with oral expressions to determine a level of response. For instance, a scream at high-volume may indicate severe pain of one or more operator and/or individual and may even indicate an emergency situation.

In some embodiments, the gesture recognition system may initiate one or more calls/notifications to at least one third party, police, fire, and/or medical personnel. This call may be used to provide assistance to the one or more operators and/or individuals. It is anticipated that the gesture recognition system may cause GPS, WiFi, and/or Cellular location information to be transmitted to the at least one third party. Additionally or alternatively, the gesture recognition system may cause the physiological state, and even recorded physiological data, to be transmitted to the at least one third party. In some embodiments, the gesture recognition system may cause vehicle information to be transmitted to the at least one third party.

As previously disclosed, some embodiments anticipate that the gesture recognition system may monitor input received at a steering wheel, or other-human machine interface, to detect a physiological state. For example the gesture recognition system may monitor a steering wheel for movement information. It may be determined by the gesture recognition system that jerky, sudden, and/or exaggerated movements are indicative of physiological state. This physiological state, or assumption of state, can be determined by the gesture recognition system comparing the monitored movements with baseline data and/or programmed typical movements. Additionally or alternatively, the pressure of grip on the steering wheel may be monitored and determined by the gesture recognition system. In some instances high-pressure may indicate heart failure. In other cases, the detection of no pressure or "no hands" on the wheel may indicate blackout, seizure, falling asleep, and the like.

In some embodiments, the gesture recognition system may be configured to use one or more of the detection methods disclosed herein to determine a physiological state. For example a seizure may be detected by detecting weight shifts in the seat, no hands on the wheel, and/or slurred speech or oral statement made by one or more operator and/or individual. Among other things, the physiological state may correspond to one or more health level, condition, illness, and emergency.

It is anticipated that the gesture recognition system may make use of one or more of the aforementioned detection scenarios and/or Detection Devices to personalize vehicle and/or comfort settings for one or more individual of a vehicle. For instance, the temperature sensors and/or infrared sensors may detect that one or more individuals are running cool (e.g., below preset temperatures and/or baseline data collected for the one or more individuals). In response, the gesture recognition system may alter the temperature of the vehicle climate control system for one or more zones of the vehicle. In this case, altering the temperature may be activating an heater for the one or more zones. Additionally or alternatively the temperature sensors and/or infrared sensors may detect that one or more individuals are running hot (e.g., above preset temperatures and/or baseline data collected for the one or more individuals). In response, the gesture recognition system may alter the temperature of the vehicle climate control system for one or more zones of the vehicle. In this case, altering the temperature may be activating an air conditioner for the one or more zones. In some embodiments, the gesture recognition system may make adjustments to comfort setting based on other variables, including but not limited to ambient temperature, outside temperature, forecast temperatures, individual preferences, baseline data, and the like. In one embodiment, the gesture recognition system may recognize at least one individual and modify vehicle and/or comfort settings associated with that individual. In some embodiments, one or more individuals may be recognized based on at least one of the one or more individuals' weight, temperature, heat signature, height, facial structure, voice, and combinations thereof. In some embodiments, one or more individuals may be recognized by device and proximity of a device inside, near, adjacent to, or apart from a zone. It is anticipated that a vehicle may comprise one or more zones. In one embodiment, the one or more zones may be inside, adjacent to, or outside a vehicle.

Figure 6:
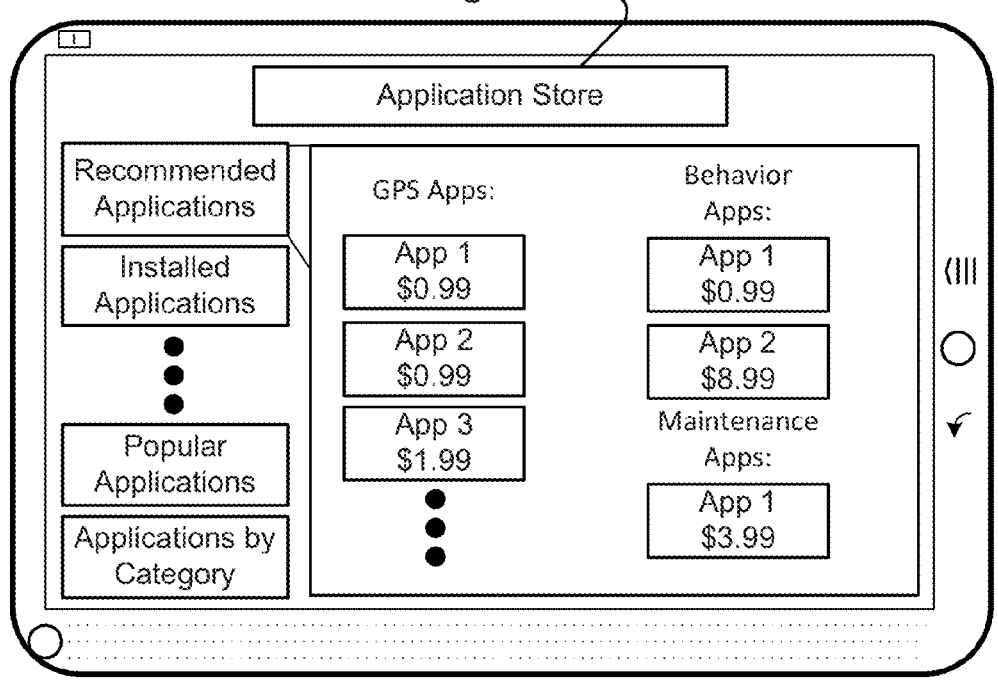
FIG. 6 depicts an application store and interface with a vehicle in accordance with the present disclosure.

Applications:

Referring now to FIG. 6 an embodiment of the present disclosure shows an application store 2 and interface for a vehicle. Similar to application stores and interfaces for smart mobile phones and devices, the present disclosure is directed to an application store (a.k.a., app store) where various vehicular and other applications can be purchased and installed.

Specifically, the present disclosure is directed to an app store for automotive, and other, applications. In some embodiments a user may visit an app store and download custom designed applications directed to GPS/Location services, Computing (trip computers, car information and status reporting, maintenance, tire pressure and performance monitoring etc.), Graphical User Interface Displays (Customized Control Layouts—designed by industry leaders, Handicapped and Accessibility Interfaces—Larger controls/fonts/voice support), and other applications from a console and/or other device associated with the vehicle.

It is anticipated that the present disclosure may use a communications channel or multiple channels available to the vehicle to make an application store purchase and download. Moreover, this purchase and download could be effected through the use of at least one individual's phone associated with the vehicle.

Figure 7:
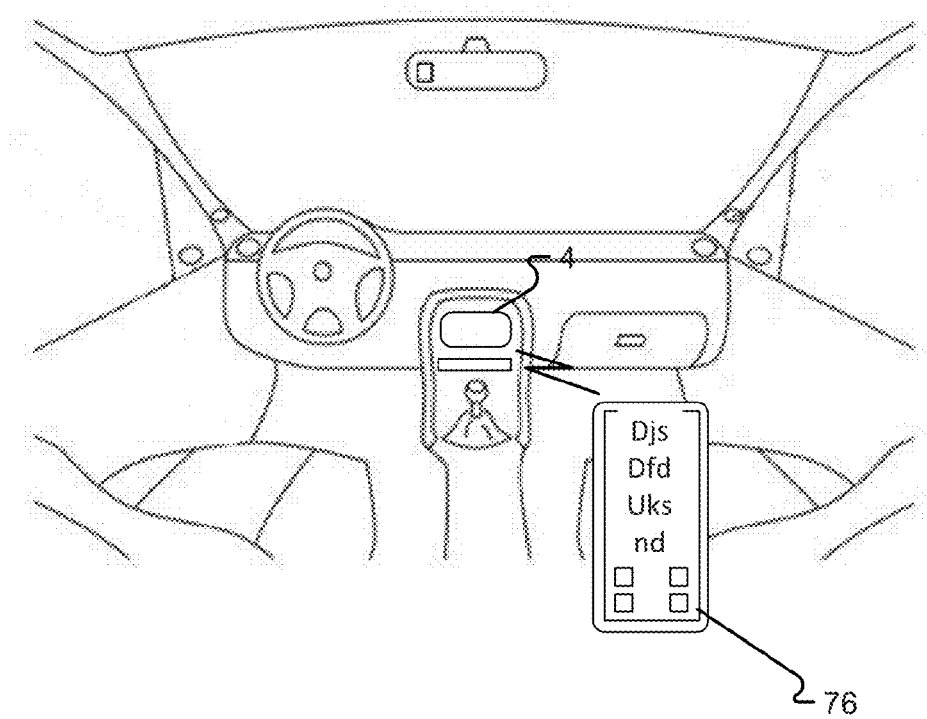
FIG. 7 shows a device sharing an application and/or media with a vehicle console in accordance with an embodiment of the present disclosure.

FIG. 7 shows a device 76 sharing an application and/or media with a vehicle console 4 in accordance with an embodiment of the present disclosure. In some embodiments, a protocol for communicating to numerous devices and sharing data is disclosed. Specifically a phone and/or other device may share multiple applications, data, media, and the like, that is exchanged through a recognized communication protocol. As can be appreciated by one skilled in the art, the seamless interaction between a vehicle console and a smart phone and/or other device provides greater integration with an individual.

Figure 8:
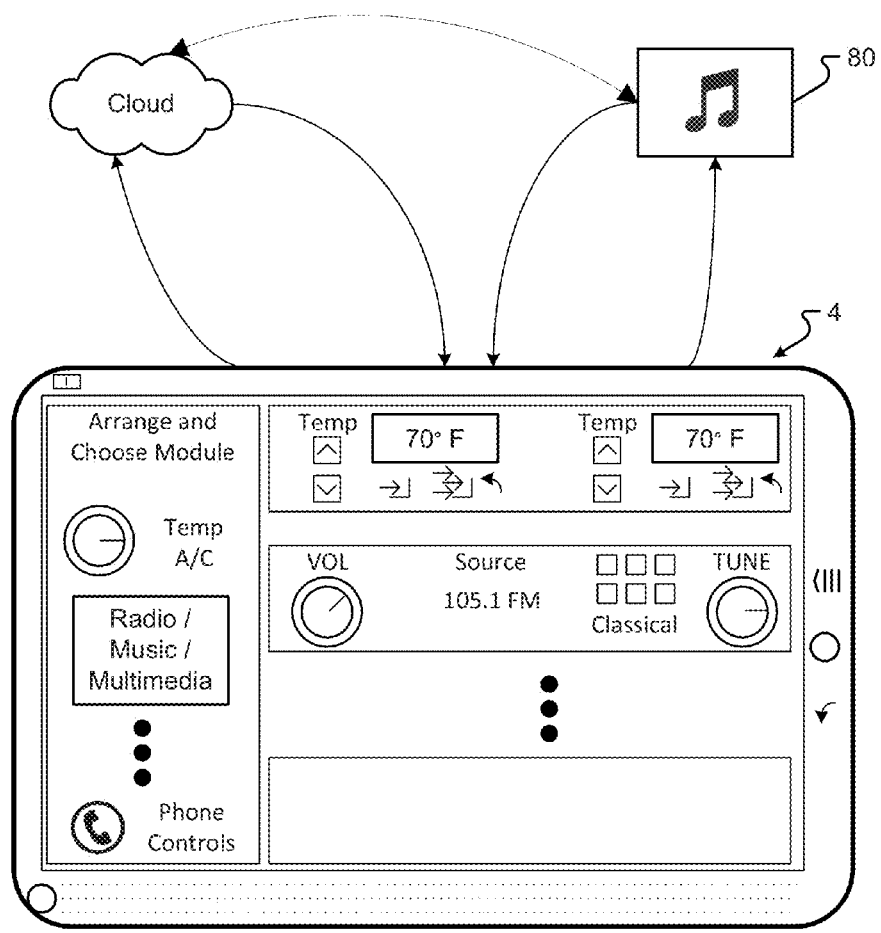
FIG. 8 shows an in-cloud and push connection for vehicle multimedia in accordance with at least one embodiment of the present disclosure.

Referring now to FIG. 8, an in-cloud and pull and/or push connection for vehicle multimedia is shown in accordance with at least one embodiment of the present disclosure. Described is a system directed to pushing information from a smart phone and/or other device 80 to a vehicle console 4 via a cloud-based (personal or service) connection. In particular, the association between the smart phone and the vehicle enables information from the cloud to be pulled or pushed through the device to the vehicle console. It is anticipated that media may also be pushed from a device to the vehicle console regardless of cloud connection.

Typically, when music is purchased from iTunes®, and/or other service, a device must be authorized or otherwise associated with a specific account in order to play content. This association was originally designed to limit fraudulent activity, but it consequently results in a limited number of devices that an individual may use to access content. An embodiment of the present disclosure is directed to using an already authorized device to push music and other content to a vehicle console or pull music and other content from the server to the console. This "push" type of communication and associated access of content conforms to the original intent of "device authorization," while also providing convenience to an authorized user to play content without requiring additional and cumbersome "activate-deactivate" steps. In some embodiments, any number of devices may be associated with a vehicle and may push data to the vehicle console.

Figure 9:
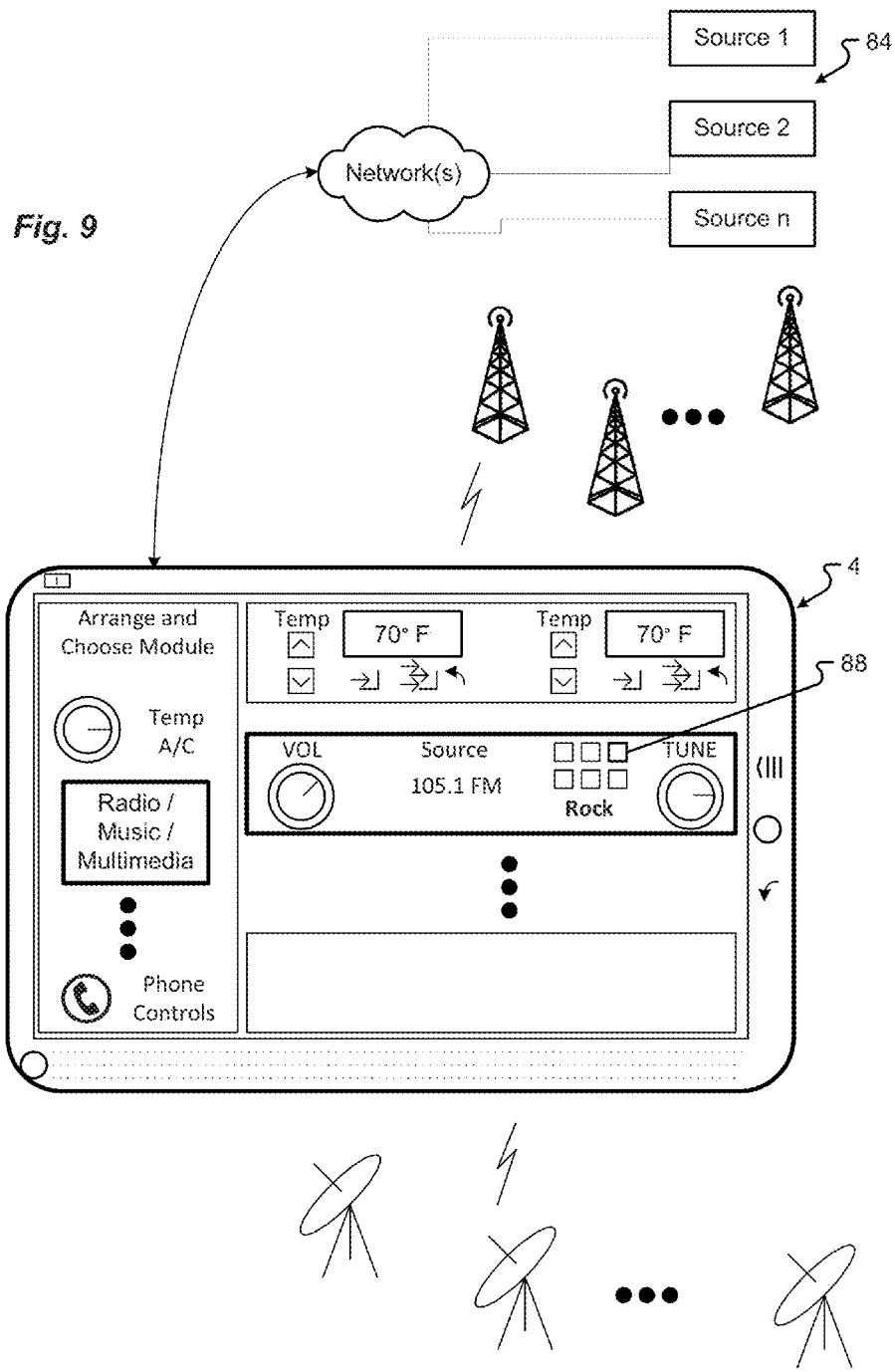
FIG. 9 depicts a music streaming application in accordance with embodiments of the present disclosure.

FIG. 9 depicts a music streaming application in accordance with embodiments of the present disclosure. Currently, a particular radio may have access to XM, AM, FM, and in some cases "Streaming Audio" capabilities through separate sources. However, it is necessary to change the input on a console 4 to receive the information and music from a specific source.

It is an aspect of the present disclosure to provide a console capable of compiling and playing music and information in a general and/or specific category. It is anticipated that the console may adaptively select the source 84 providing the content according to specific rules, such as music type. For example, the console may select the strongest signal, or highest quality of channel from one or more transmission sources. Furthermore the data is collected regardless of the source and represented by icons 88 (independent of source) on the console. These icons may be selected by the user to access content. In one configuration, the icon corresponds to a type of music (here "Rock"). The music can be band and/or communication mode independent. For example, a "classical music"

icon indexes and/or links to all classical music channels, whether AM, FM, streaming, XM, etc.

In some cases, a user may be listening to one station/source while information is being received and cached from another station/source. In the event that the first signal is lost, the cached signal may play. Additionally, the system may adaptively "signal surf," for a given category, to determine the best channel to receive the highest or best quality signal (e.g., S/N ratio, stream or radio wave). Moreover, the system may be able to determine that a reception limit is being neared (by pilot signal back or GPS location) and may push delayed broadcast information or other content to a vehicle computer to be cached and listened to after coverage is lost.

Tracking:

In general, the present disclosure is also directed to using devices, software, and/or systems for tracking at least one vehicle's behavior and analyzing this tracking information to provide data related to a vehicle's user and/or the vehicle itself. These data may be accessed by a user, individual, law enforcement agency, insurance company, and/or the vehicle to provide information dependent upon predefined rules.

Figure 10:
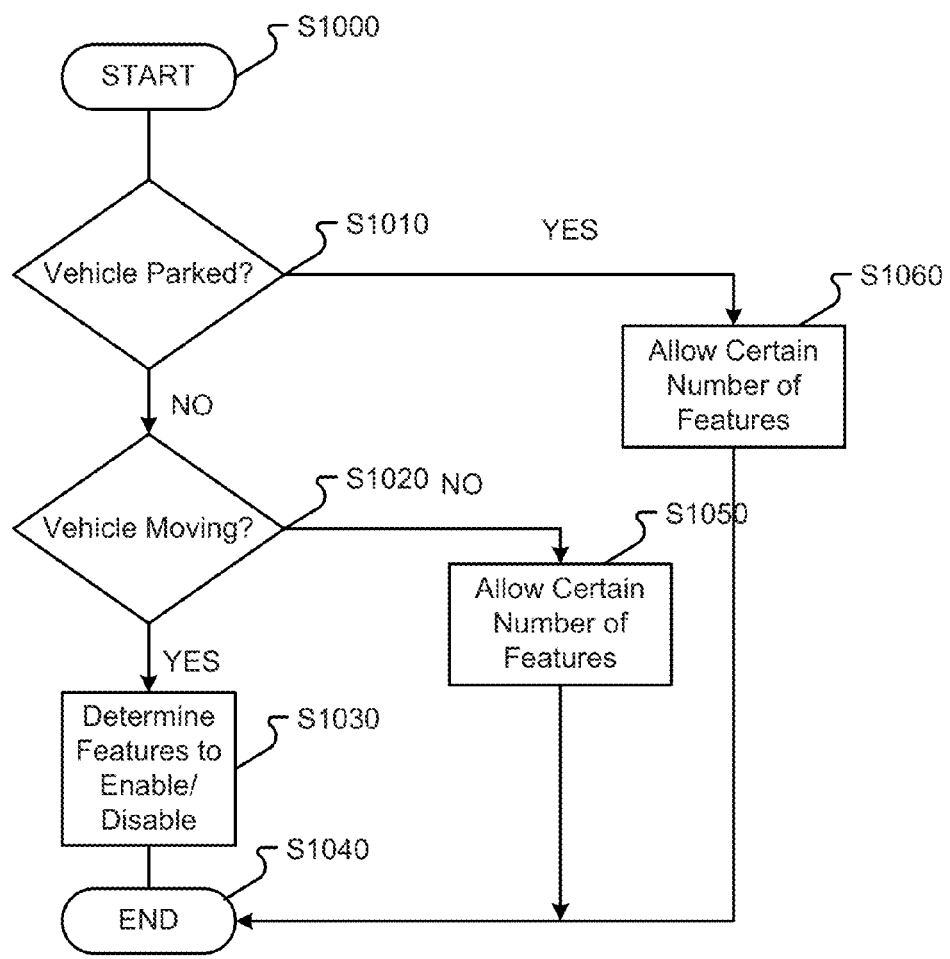
FIG. 10 illustrates a vehicle system where the activation of mobile phone and other connected device features is dependent on specific laws in accordance with embodiments of the present disclosure.

FIG. 10 illustrates the operation of a vehicle system where the activation of a mobile phone and other connected device features is dependent on specific laws in accordance with embodiments of the present disclosure.

Currently, drivers and other vehicle operators can use their vehicles while texting, talking, surfing the Internet, streaming video, and generally using their mobile phones in contradiction of local, state, federal, and other laws. In addition, use of certain features may also be limited by specific employment contracts.

One aspect of the disclosure is further directed to an intelligent system that recognizes when a vehicle operator is in motion and deactivates specific features on the mobile device accordingly. Additionally, it is anticipated that the vehicle may reactivate these deactivated features once the vehicle is in a state of rest and/or parked. For instance, the system may use the GPS/location information features alone or in conjunction with vehicle information (speed, parking sensors, transmission setting, etc.) to determine if a vehicle is in motion and may disallow or deactivate use of texting, video streaming, and other applications. Once the vehicle is determined to be in "Park" or otherwise in motion, the applications may be allowed and reactivated.

These features may be controlled in accordance with local, state, federal, and other laws as well as administrative agency laws and/or employment contracts. Laws can be interpreted by the geographical location of the vehicle. Geographical location may be determined by the device's location-based features, the vehicle's location-based features, a location signal, and/or combinations thereof. The location-based features may include a GPS, WiFi access point, cell tower, and the like.

Control begins in step S1000 and continues to step S1010. In step S1010, a determination is made whether the vehicle is parked. If the vehicle is parked, control continues to step S1060 where a certain number of features can be activated and used. If the vehicle is not parked, control continues to step S1020 where a determination is made whether the vehicle is moving. If the vehicle is moving, control continues to step S1050 where a certain number of features are allowed with control continuing to step S1040 where the control sequence ends.

If the vehicle is not moving, control continues to step S1030 where features are disabled/enabled based on one or more rules as discussed. Control then continues to step S1040 where the control sequence ends.

Figure 11:
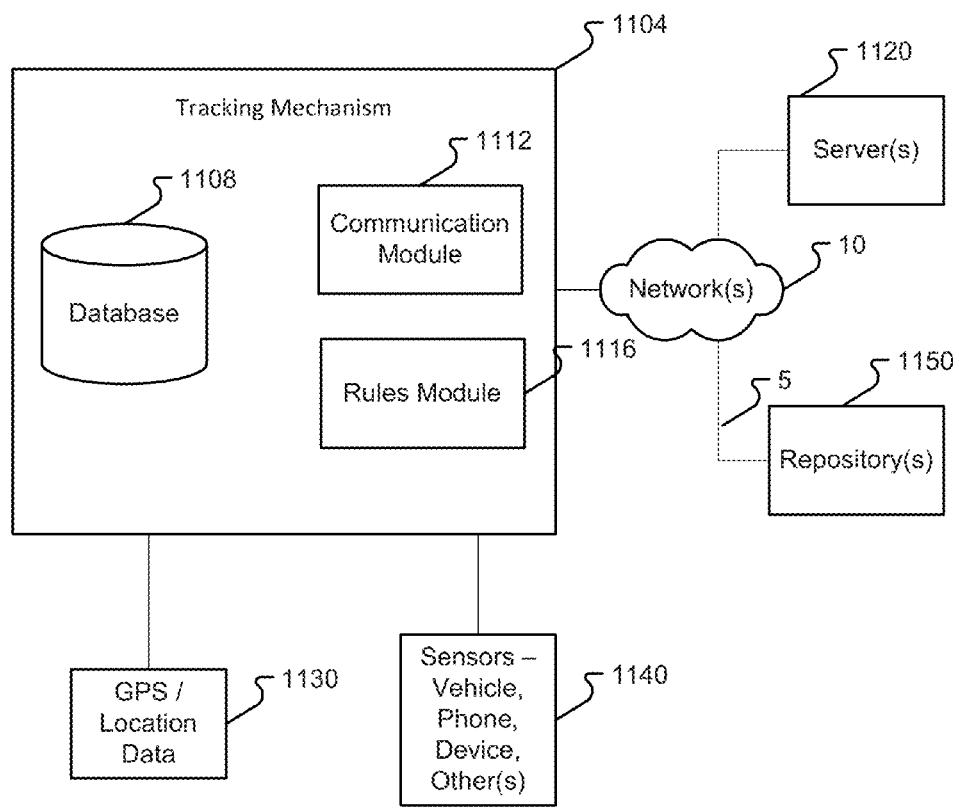
FIG. 11 illustrates an insurance tracking system in accordance with embodiments of the present disclosure.

Referring now to FIG. 11 an insurance tracking system 1104 is shown in accordance with at least one embodiment of the present disclosure. Currently, responsible drivers pay inflated insurance premiums because the insurance industry cannot guaranty a particular driver's adherence to the law or general driving behavior. To address this concern, current insurance companies may allow a driver to install a device in a vehicle to randomly monitor behavior. This device can only monitor certain functions and requires the installation of a device separate from the vehicle's ecosystem.

The present disclosure is further directed to using various data compiled by the system and stored in database 1108 to analyze factors contributing to an individual's driving behavior and/or habits. In the event that an individual wishes to receive better insurance rates for responsible driving, a lower quantity of driving, or other good driving indicators, the driver may agree to provide insurance tracking information. The insurance tracking system may consider GPS 1130 and other location-based information (to compare actual speed with speed limit data or other rules in rules module 1116), g-force sensors (to detect rapid acceleration, hard turns, etc.), perimeter sensors (to detect close-calls, inattention while changing lanes, etc) 1140, in order to determine conformance with the good-driving terms established by an insurance company. Because the device may be integrated, and/or associated, with the vehicle's ecosystem, total behavioral data may be recorded and sent in real-time to a receiving module/communications module 1112 and optionally forwarded to one or more of the server 120 and repository 1150. Moreover, the system may detect the user and provide accurate information for each user of a vehicle.

Figure 12:
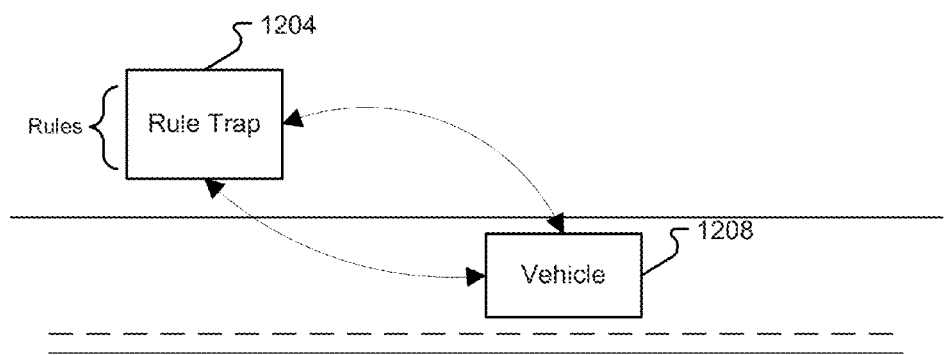
FIG. 12 shows a law enforcement monitoring system in accordance with embodiments of the present disclosure.

FIG. 12 shows a law enforcement monitoring system in accordance with embodiments of the present disclosure. Currently, those who break traffic laws are detected by combinations of video surveillance, radar/laser detection, and/or police officers actively monitoring traffic offenses.

Additional aspects of the present disclosure are directed to a system where a police officer and/or rule trap sensor 1204 can "ping" or interrogate an automobile 1208 automatically for information that can be collected and stored in an appropriate storage device relating to its speed and driving conditions. By comparing this received data from the automobile to known data relating to stop signs, speed limits, and the like, a decision can be made on whether the law has been broken. For example, the sensor itself may not necessarily determine the speed of a vehicle. The sensor (Rule Trap) asks the vehicle to respond to the sensor with the vehicle's speed and possibly other information. Therefore, the speed detection is achieved through responding to a sensor's question and the vehicle's answer. It is anticipated that a specific sensor may use alternate detection methods to verify the accuracy of a received signal. For instance, if a vehicle is asked to respond with a current speed value, and does so, the sensor may send a radar signal to verify the response. If the response does not match the verification signal, a note is made of the anomaly and the data is recorded. This data may be used by law enforcement to later identify vehicles that are malfunctioning and/or have been compromised.

This data returned to the rule trap 1204 can be accompanied by one or more of time stamp information, location information, picture information, driver information and in general any information that is recordable by the vehicle 1208. The information collected by the rule trap can be used for any purpose such as law enforcement, insurance monitoring, a good driver rewards system, etc.

As can be appreciated, the applications disclosed herein may be affected by the geographical location and/or movement of a vehicle. In some embodiments, a vehicle may cross a jurisdictional line where different laws exist that concern behavior in or about vehicles. These laws may be stored in a database on-board and/or remotely accessible by the vehicle. A vehicle may use its location-based features to determine the appropriate applicable laws and enable or disable certain features to a user. For example, in the event that an individual crosses a state line where the local laws prohibit texting while driving, the vehicle may disable texting for the vehicle operator. This blocking would not prevent others in a vehicle from texting, and if allowed may provide for the operator to continue to send voice-activated texts, etc. Movement and location of the vehicle may be determined using location-based features as described herein. Moreover, to prevent false blocking of features, a specific user device position may be determined by sensors on the device, sensors in the vehicle, and/or combinations thereof. Although described with reference to blocking the texting ability of a specific user, it can be appreciated that the ability to surf the Internet, view photos, access streaming content, and other predetermined distractions may also be disabled.

Figure 13:
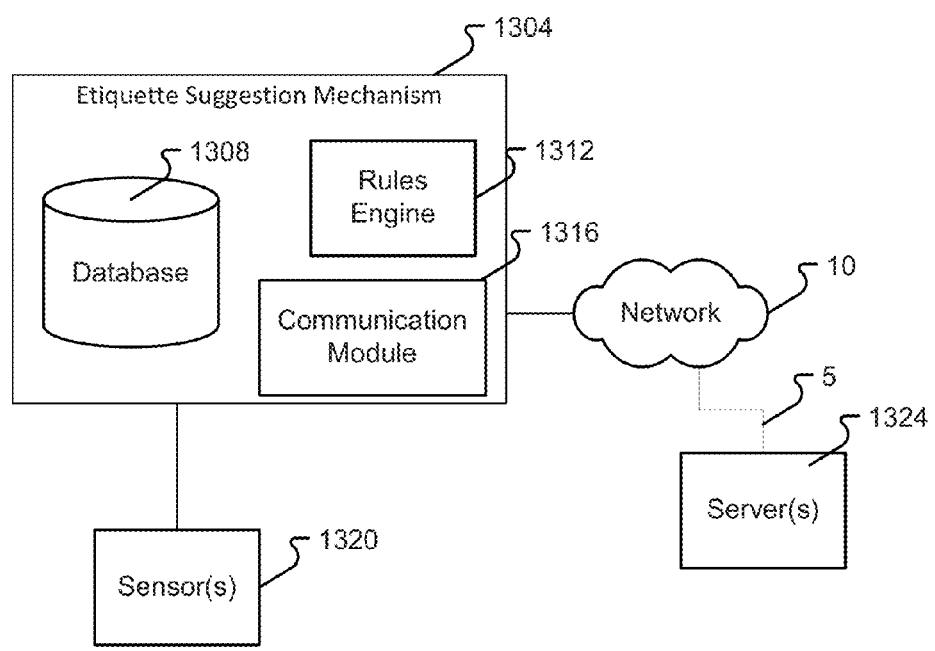
FIG. 13 depicts an etiquette suggestion application in accordance with embodiments of the present disclosure.

FIG. 13 depicts an etiquette suggestion application 1304 in accordance with embodiments of the present disclosure. It is an aspect of the present disclosure to provide a system that is capable of analyzing by rules engine 1312 all available information from one or more sensors 1320 related to driving and vehicular operation etiquette and makes suggestions based on the outcome of the data analysis. As will be appreciated, the analysis can be offloaded with the assistance of the communication module 1316 and network 10 to one or more servers 1324, with the recommendation(s) being returnable to the vehicle for one or more of verbal or graphical presentation to the driver.

In some embodiments, if the vehicle is blocking faster traffic in the fast lane, the system 1304 may suggest to carefully change lanes. Additionally, if the user is known to not use turn signals, the system may remind a user during, after, and/or before a turn to use the signal. The system may also detect fast approaching vehicles and suggest changing lanes, increasing speed, etc. Data relating to driving behavior may be recorded at times and stored in database 1308 and/or in server 1324 for use with this etiquette suggestion system.

Location-Based Communications:

Additional aspects of the present disclosure are directed to vehicles that may make use of a plurality of sensors to achieve various functions. These sensors may make use of GPS, WiFi access points, cell towers, gyroscopes, accelerometers, RF, radar, light, temperature, pressure, sonic, ultrasonic, and the like, to determine a number of conditions. It is anticipated that these sensors may exist as part of the vehicle, be attached to the vehicle, and/or be associated with a device separate from or separatable from the vehicle. In some instances the sensors included with mobile devices that are associated with a vehicle may be used to provide information to the vehicle ecosystem.

Figure 14:
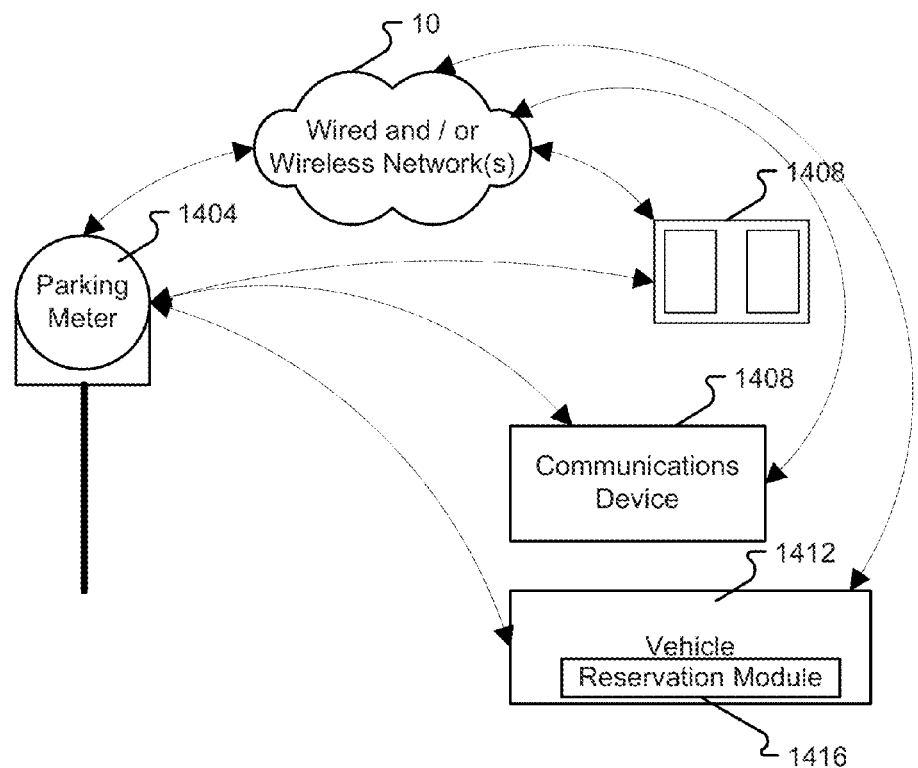
FIG. 14 depicts a parking space finder in accordance with embodiments of the present disclosure.

FIG. 14 depicts a parking space finder in accordance with embodiments of the present disclosure. In some embodiments, parking meters 1404 may use a series of sensors (not shown) to determine whether a spot associated with a meter is vacant or occupied and optionally if the spot has been paid for. This data can be retrieved by certain phones 1408 and/or other devices and may be interpreted by a user to find open spots. Additionally, this data may be interpreted by at least one system associated with a vehicle. It is anticipated that one embodiment of the present invention is directed to reserving parking spaces in conjunction with the reservation module 1416 through the service.

In some embodiments, parking lots and/or spaces may use a plurality of sensors to provide occupancy information. These sensors may include pavement sensors, solar, weight, magnetic, video, and other sensing elements to sense a vehicle's presence and/or lack thereof.

Figure 15:
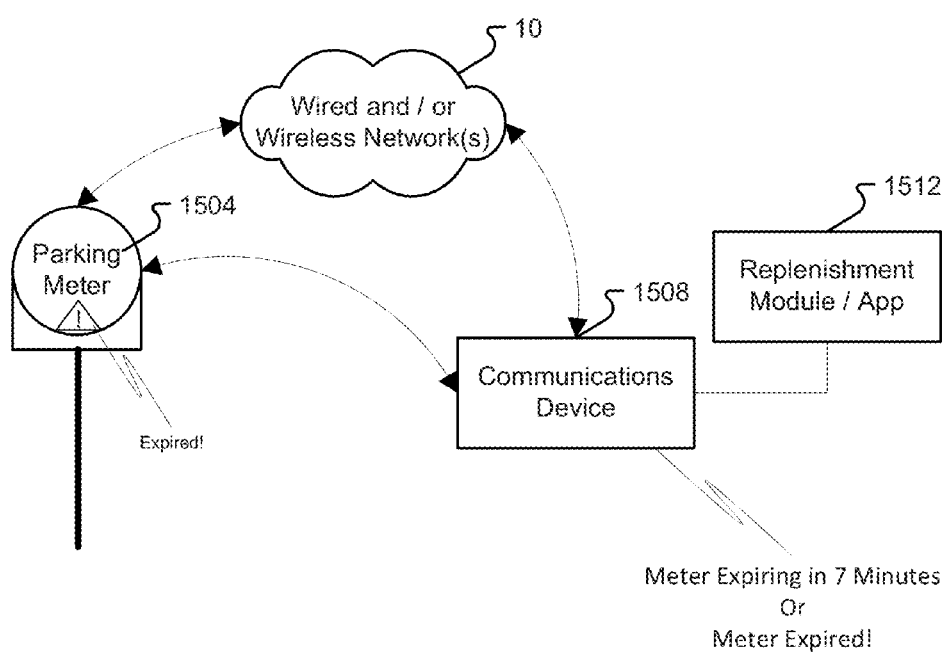
FIG. 15 depicts a parking meter status application and associated devices in accordance with embodiments of the present disclosure.

Referring to FIG. 15, a parking meter status application and associated devices are provided in accordance with embodiments of the present disclosure. In some embodiments, a parking meter 1504 may provide status information to a device 1508 when a device 1508 is "introduced," such as by a "handshake," to the meter 1504. Introduction of a device 1508 can be established via NFC (Near-Field Communications), the Internet, text message, credit account association, Bluetooth®, and/or other communication protocol. The user of a device may elect to receive alerts based on certain conditions. In some embodiments, these alerts may be automatically provided to the introduced device. The device 1508 and/or meter 1504 may be programmed to terminate communication upon some stimulus and/or a predefined condition.

It is a further aspect of the present disclosure to associate a user with a specific parking meter and elect to receive alerts, pay the meter via cell phone and/or credit transaction, and monitor the status of the meter. A typical alert may be sent to a smart phone and/or other device to read as follows "Your meter will expire in X minutes." It is also anticipated that tickets may be automatically written and sent to the home address of the user who "introduced" the phone to the meter. Furthermore, once a device has been introduced to a meter, the meter may respond to the phone with various information relating to the meter, parking time allowed, costs, ticket cost for nonpayment, replenishment via replenishment application 1512, and the like. The current meter display itself may be provided to the user's communication device. The parking meter itself may post its current status on the Internet or broadcast it to nearby vehicles to inform them that it is expired and potentially corresponds to an available parking space.

Figure 16:
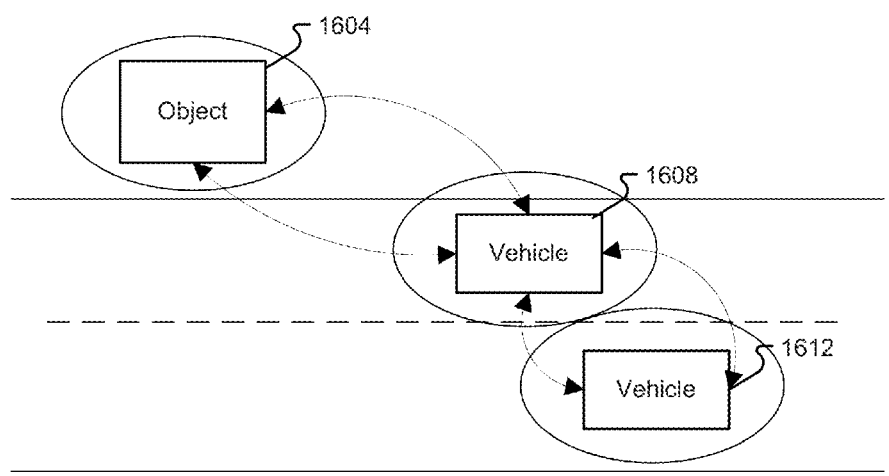
FIG. 16 depicts an object sensing system in accordance with embodiments of the present disclosure.

FIG. 16 depicts an object sensing system in accordance with embodiments of the present disclosure. The present disclosure describes a communication between a vehicle 1608 and a pedestrian 1604, cyclist, and/or other vehicle 1612 user to determine presence. This communication may be based on information beyond vehicle proximity sensing. For example, a phone may use its location-based information and/or associated sensors to determine position and at least one travel vector. The phone may send a ping message asking if there is anyone adjacent to the vehicle. In response, nearby phones, devices, and/or vehicles may respond with a presence indication. It is anticipated that the vehicle could also send this ping message. In some embodiments, the presence indication may include, but is not limited to, information such as a device's location, travel vector, distance to response device, and device type.

Figure 17:
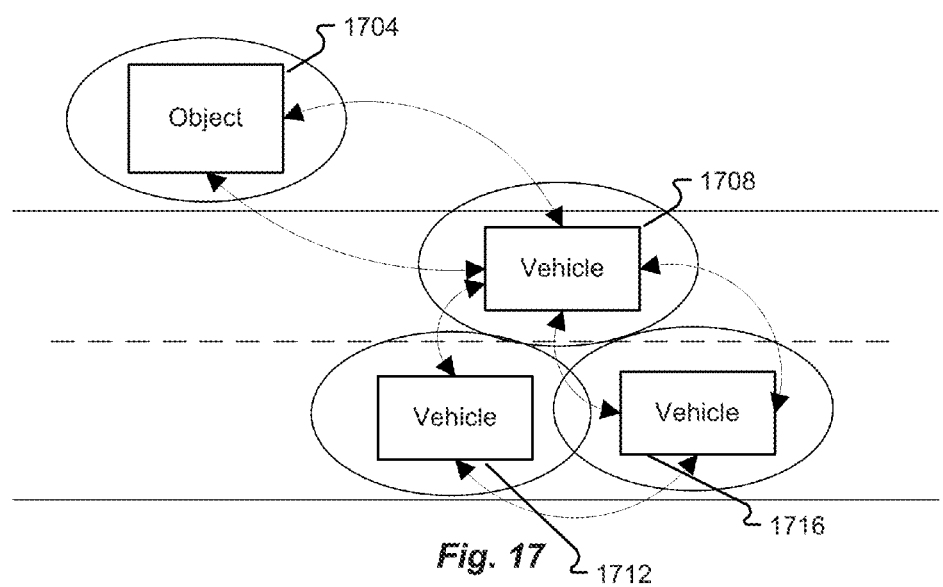
FIG. 17 depicts a proximity warning system to determine and alert the presence of adjacent vehicles in accordance with embodiments of the present disclosure.

FIG. 17 depicts a proximity warning system to determine and alert the presence of adjacent vehicles in accordance with embodiments of the present disclosure. In particular, the present disclosure allows a vehicle 1708 to communicate with vehicles (1712, 1716) in a determined proximity of the vehicle. Specifically, a vehicle 1708 may provide information to adjacent vehicles (1712, 1716)(or objects 1704) and can "daisy-chain" back to a given user to transmit general traffic information back up the chain. In one embodiment, each vehicle is a node in a network of vehicles. This network of vehicles may be self-configurable and self-healing. In other words, there is no central point of intelligence required because the nodes are distributed among different vehicles. It is anticipated that each vehicle only needs to know the information from surrounding and/or adjacent vehicles.

As can be appreciated, data relating to the presence of a vehicle may be obtained from a number of different systems in a number of different ways. For example, the system may use timed radio waves, poll various GPS units and information and perform calculations of speed, location, direction, collision/safe stop, airbag status, etc., to relay valuable information throughout the daisy-chain. As a further example, if at least one vehicle is traveling in the wrong direction, against the usual flow of traffic, other vehicles may be alerted by receiving information from the at least one vehicle travelling in the wrong direction. In addition, information gleaned from the response and actions of other vehicles may be relayed to each vehicle. Therefore, if other vehicles are slowing, pulling-over, and even stopping, adjacent vehicles are alerted of these actions.

Figure 18:
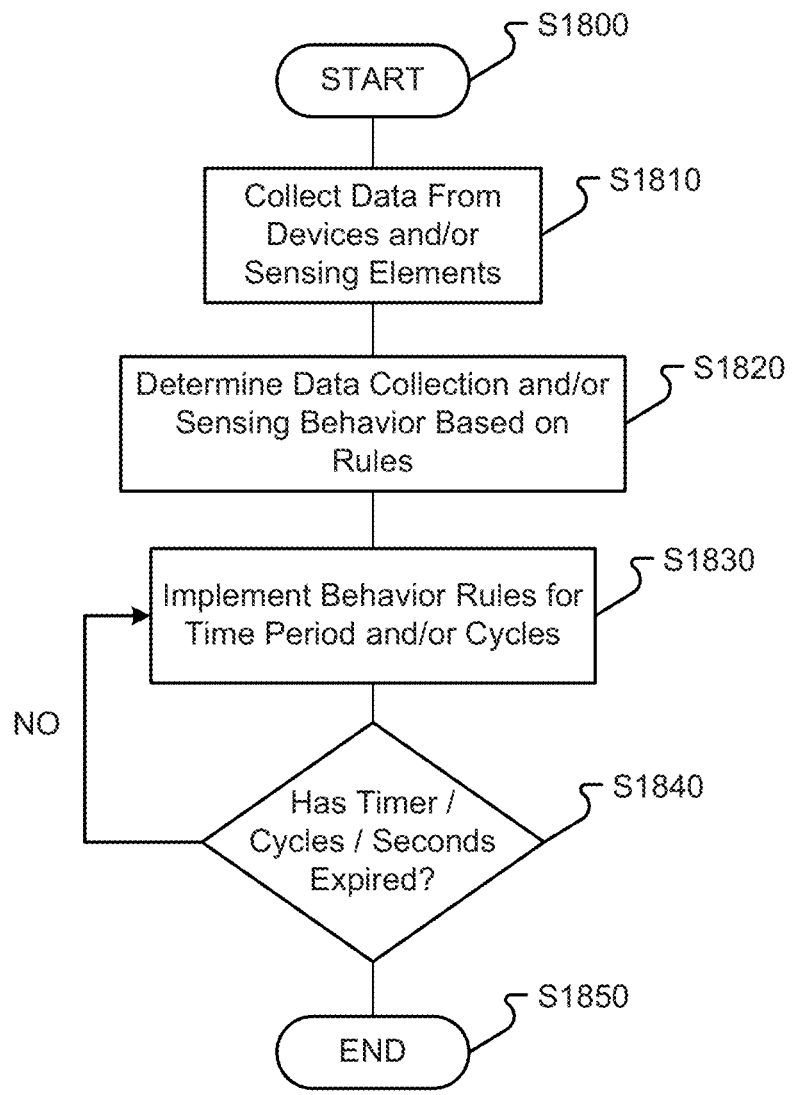
FIG. 18 illustrates a sensing method where elements and usage may be controlled based on environmental factors in accordance with embodiments of the present disclosure.

FIG. 18 illustrates a sensing method where elements and usage may be controlled based on environmental factors in accordance with embodiments of the present disclosure. Specifically, an aspect of the present disclosure is directed to the control of vehicle sensors to conserve energy usage and data transfer based on multiple factors. In one embodiment, it is anticipated that certain sensors do not need to continually operate at times of the day and/or days where traffic is minimal. For example, the system may observe that traffic is extremely light in a given area, and/or because the car is in motion at a time of the day (e.g., 2:00 am) certain sensors may be controlled to sense, or sample, less frequently. It is further anticipated that certain sensors may be deactivated completely depending on the conditions. Factors contributing to this intelligent energy-saving feature may be based on sensed vehicle access, time of day, traffic info from, for example, a GPS service, reported conditions from other users, and the like.

In accordance with embodiments of the present disclosure, data obtained from the use of these sensors may be applied to map updates. Specifically, sensors may be directed to relay specific information during nonpeak times. This information may include map comparisons relating to road position, lane number, and size. It is anticipated that all of this data may be compiled with a combination of vehicle sensors. Additionally, sensors on lane dividers, signs, and other markings may communicate with a vehicle to provide more information relating to map, and other, data.

Control in this exemplary embodiment begins in step S1800 and continues to step S1810. In Step S1810, data is collected from one or more devices and/or sensing elements. Next, in step S1820, one or more of data collection and sensing behavior can be determined based on one or more rules. Then, in step S1830, behavior rules are implements for a time period and/or a number of cycles. Control then continues to step S1840. In step S1840, a determination is made whether the timer/cycles/seconds have expired. If they have not, control jumps back to step S1830 otherwise control continues to step S1850 where the control sequence ends.

Figure 19:
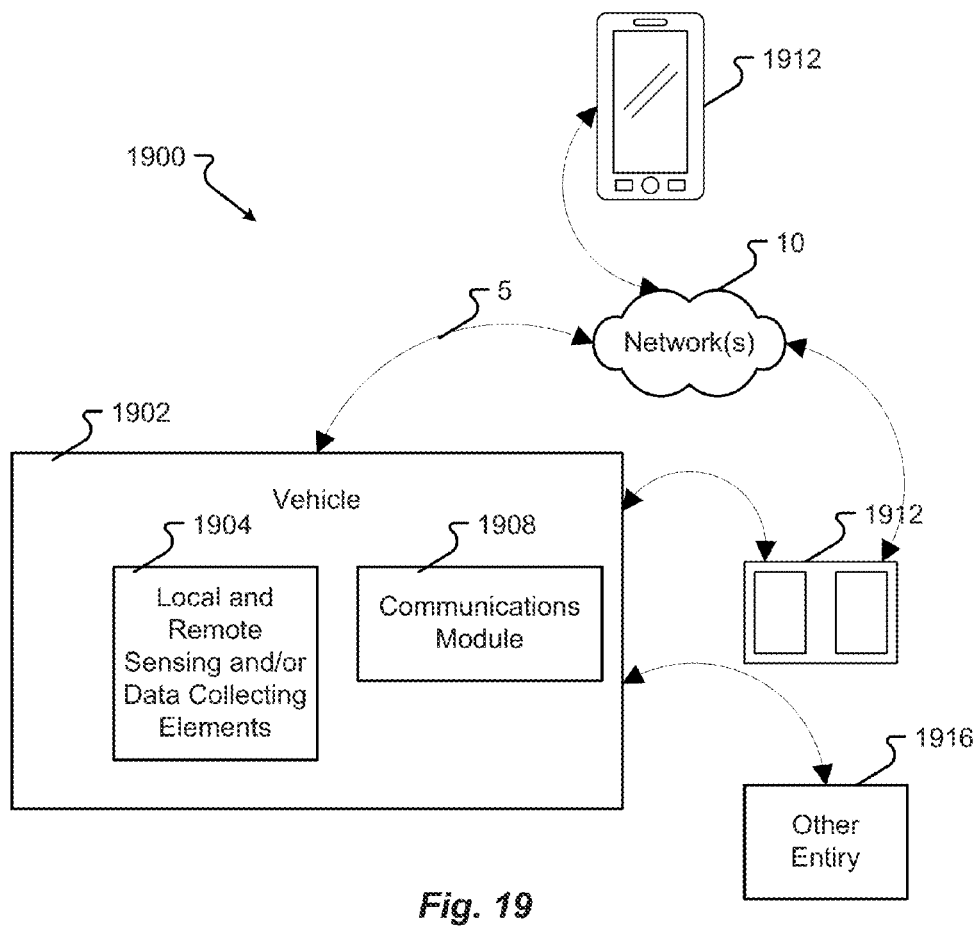
FIG. 19 shows a system that may be used to determine an accurate location of a vehicle in accordance with embodiments of the present disclosure.

FIG. 19 shows a system 1900 that may be used to determine an accurate location of a vehicle 1902 in accordance with embodiments of the present disclosure. Currently, a smart phone may be used to record information relating to a parked vehicle. However, this information is typically input by a user and resides with a phone. It has not been disclosed heretofore that a vehicle provides information relating to its specific position using data in addition to that provided by a GPS unit.

It is an aspect of one embodiment of the present disclosure that a vehicle 1902 may use multiple sensors 1904 to determine its current location and relay that position via communications module 1908 to a smart phone 1912 and/or other device 1916. Specifically, in addition to providing GPS or other location information (via cell towers, and/or WiFi access points, etc.) the vehicle may use temperature sensors, altitude sensors, barometric pressure sensors, and the like, to determine whether the vehicle is located in or near an underground structure, under a tree, or other landmark. An exemplary use of such a system may have application when parking a car at an airport or shopping area. If the vehicle is parked underground in the summer, the surrounding temperature may be cooler than ambient temperatures. This comparison may be made by comparing data obtained from vehicle sensors with data obtained regarding the local ambient temperature.

Figure 20:
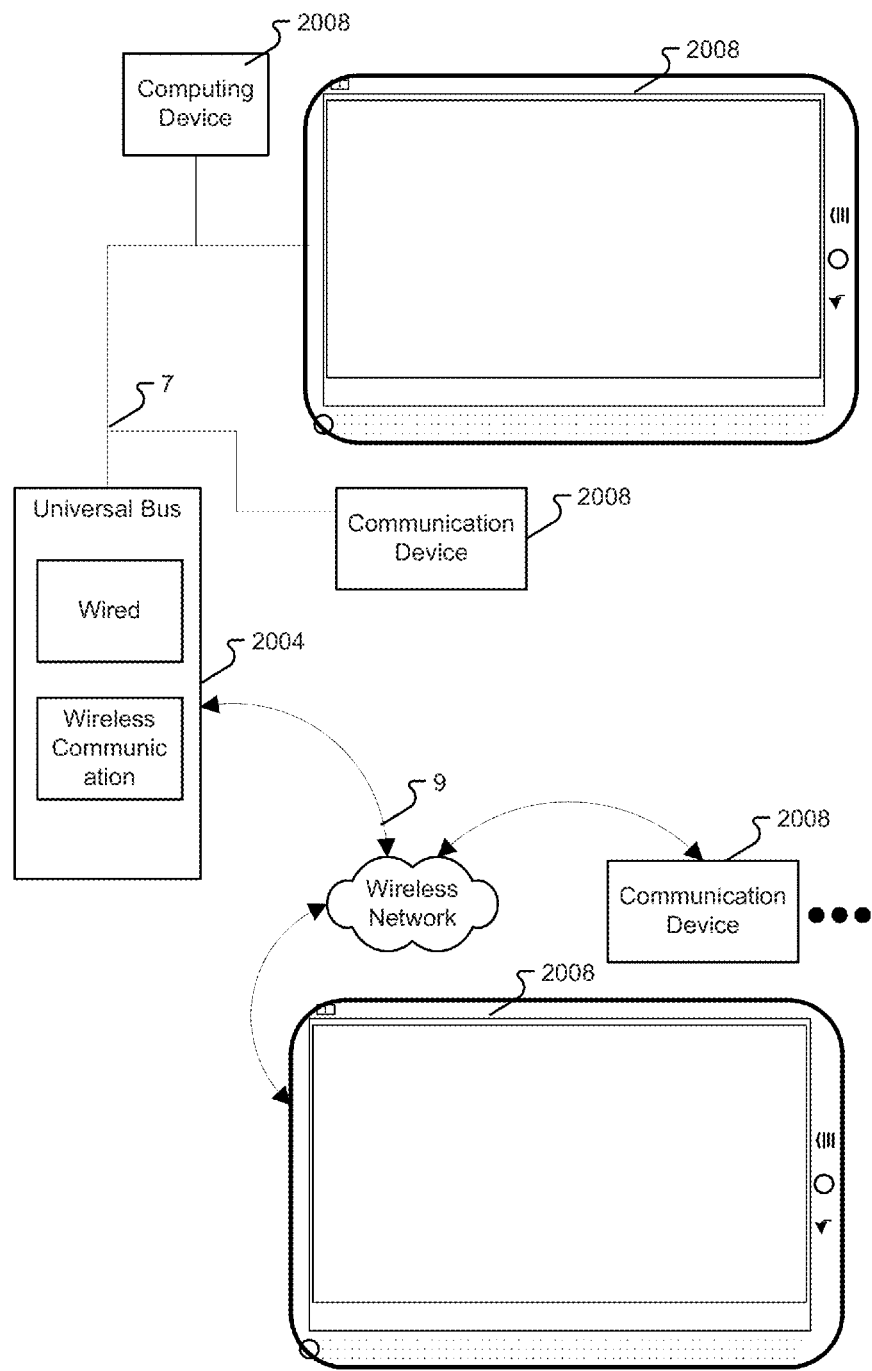
FIG. 20 shows a universal bus for a vehicle communication system in accordance with embodiments of the present disclosure.

Hardware:

Referring now to FIG. 20 a universal bus 2004 is described in context of a vehicle communication system in accordance with embodiments of the present disclosure. The universal bus 2004 may have wired 7 and wireless 9 aspects that enable communication with multiple devices 2008. Currently, a single user may pair a (smart) phone or other device with a vehicle via Bluetooth® or other wireless communication protocol. Unfortunately, in the case of a vehicle that is enabled to share information between individuals through the interface of a vehicle console, or other display, it would be advantageous to connect more than one device via Bluetooth® or other connection protocol.

In one embodiment the universal bus 2004 is directed to a protocol and procedure whereby a plurality of phones and/or devices 2008 such as communication or multimedia devices can connect to the console and vehicle system via Bluetooth® or other wired or wireless protocol(s). For example, if a user wishes to use the speakerphone capabilities of an automobile, the universal bus 2004 will allow one or more users to connect to the Bluetooth® (or other connection protocol) connection and provide for functionality to the user(s). In addition to sharing functions associated with the automobile, the users may exchange information along the same universal bus. The universal bus can also communicate with or using a CAN bus (controller area network) (or comparable CAN network protocol) which is a bus standard designed originally designed for vehicles to allow microcontrollers and devices to communicate with each other within a vehicle without a host computer.

In another embodiment, the universal bus may include hard-wired connections. These connections can be used in a similar manner to enable communications between multiple devices and a vehicle console and/or system. It is anticipated that the universal bus, in any embodiment, may allow for the sharing of data, information, media, and functionality of devices.

Figure 21:
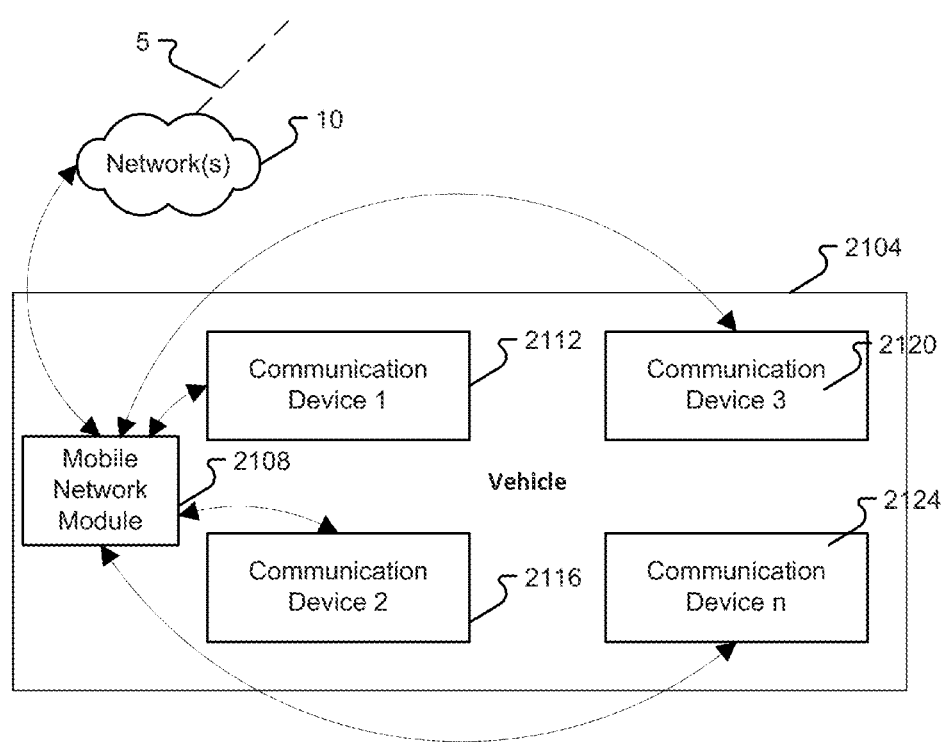
FIG. 21 depicts a mobile network of a vehicle in accordance with embodiments of the present disclosure.

FIG. 21 depicts a mobile network of a vehicle 2104 in accordance with embodiments of the present disclosure. Currently, some vehicles provide for the ability to create one or more mobile hot spots. These hot spots allow individual users to connect to the Internet with a device of their own. However, these hot spots rely on the Internet to connect users and as such do not provide a network for individuals to communicate in the event of no Internet connectivity.

In some embodiments the present disclosure is directed to an internal automobile network 2108 created for users associated with (such as riding in) a vehicle 2104. It is anticipated that the network is not necessarily required to connect to the Internet. However, once an individual associates a device 2112, 2116, 2120, 224 with the vehicle 2104, the vehicle may create a local area network for associated devices. It is anticipated that devices can be selectively associated and disassociated through the vehicle and/or its console. Moreover, association with a specific device may be provided on a temporary and/or permanent basis. If temporary, the device association may timeout after a predetermined time period has passed.

Figure 22:
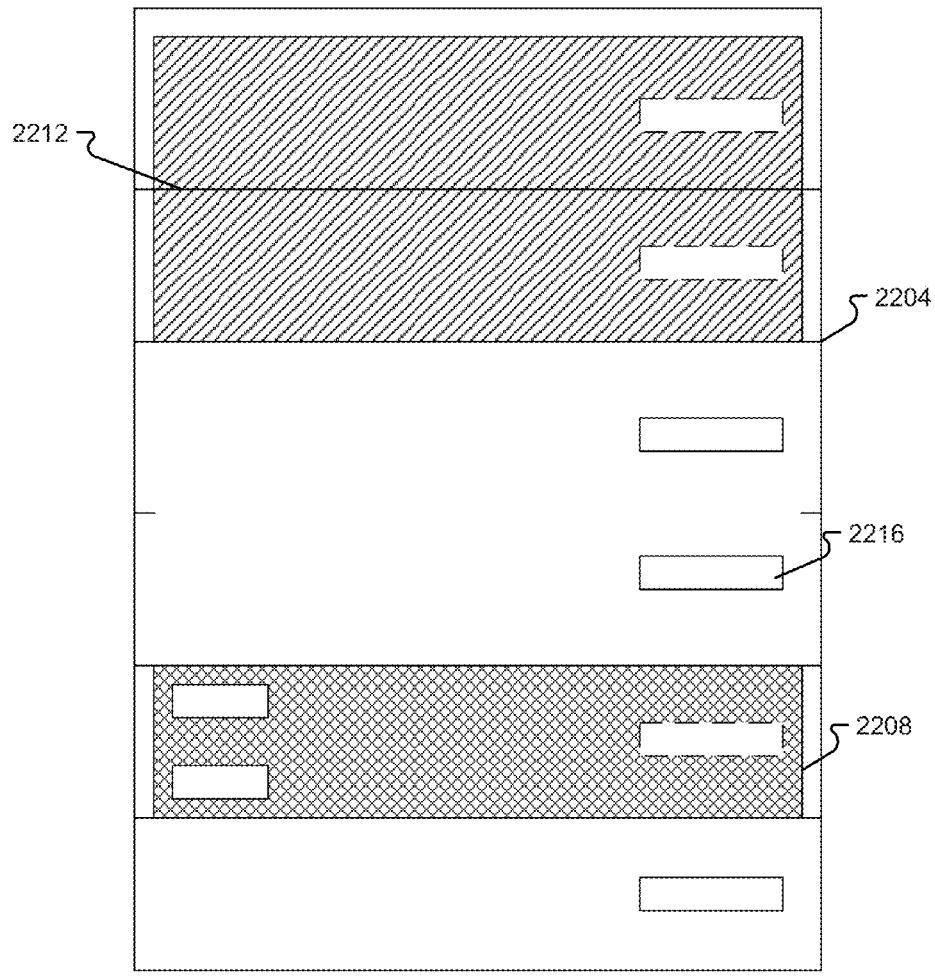
FIG. 22 depicts a universal console chassis in accordance with embodiments of the present disclosure.

FIG. 22 depicts a universal console chassis 2204 in accordance with embodiments of the present disclosure. In some embodiments, a console chassis 2204 is provided that is capable of receiving different inserts 2208, 2212 to provide functionality to the overall system. It is anticipated that the chassis 2204 may include a basic frame, rack slots, and common connection points 2216. The frame may reside behind the console display or elsewhere in a vehicle. The rack slots may be sized to accommodate one or more inserts. In another embodiment, an insert may take up one or more rack slots. The connection points may include at least one locking feature, and an insert release feature. Additionally, the connection point may also include a standardized electrical and/or mechanical connection interface.

For example, a vehicle may not be originally specified with a GPS and/or location-based services, but a GPS/Location Services unit may be added to the console. Inserting a unit may be similar to inserting a blade into a server rack. The universal console chassis may be designed to hold any number of units that can be easily removed and reconfigured by plugging into the one or more rack slots that is part of the framework of the universal console.

Figure 23:
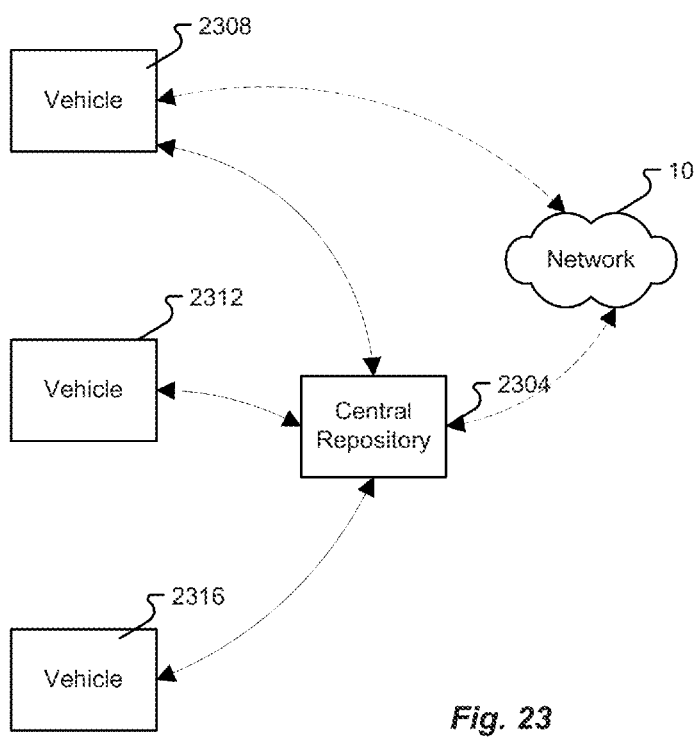
FIG. 23 depicts a central repository for vehicle information in accordance with embodiments of the present disclosure.

Location-Based Communications:

FIG. 23 depicts a central repository 2304 for vehicle information in accordance with embodiments of the present disclosure. Currently, car drivers have the option to sign up for a service like General Motors OnStar® to remotely unlock cars, and provide other features such as remote start, tracking vehicles, and/or locking cars, etc.

In some embodiments, the present disclosure is directed to a central repository 2304 that can be used in conjunction with an individual vehicle (2308, 2312, 2316). The central repository 2304 may be stored on-board the vehicle and/or remotely. In the event that the central repository 2304 is stored remotely, it may be supervised by a law enforcement agency, or secure administrative agency. It is anticipated that strong security procedures may be employed to avoid hacker attacks, especially if stored at a remote central repository like the Department of Motor Vehicles (DMV), or other security-approved location. In the event that a vehicle is stolen, the true owner of a vehicle may prove ownership to the central repository and locate, lock, shutdown, etc., the vehicle.

In another embodiment, a police device may communicate to another vehicle to slowly reduce that vehicle's speed, shutdown the engine, cut power, etc. The communication can be securely effected using unique codes or other cryptographic techniques. Moreover, the communication may be through a server associated with a central repository. It is anticipated that the module controlling these functions is securely guarded and designed to prevent hacking attempts.

Figure 24:
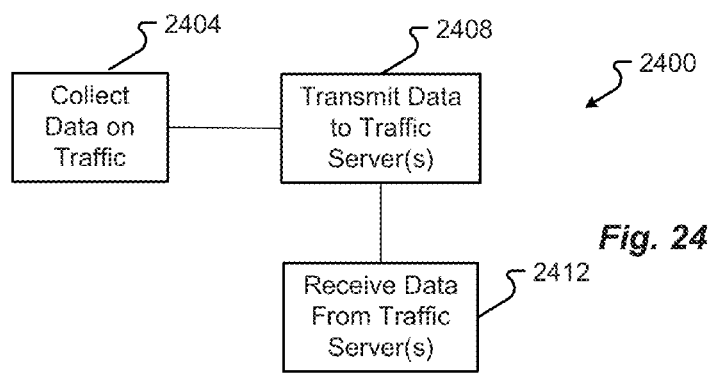
FIG. 24 depicts a real-time traffic system in accordance with embodiments of the present disclosure.

FIG. 24 depicts a real-time traffic system 2400 in accordance with embodiments of the present disclosure. Currently, vehicle operators, can receive general traffic information from a service like XM or Sirius radio. This service provides traffic information received and relayed from static monitors to an XM or Sirius device installed in an automobile.

It is an aspect of the present disclosure to provide a central database (such as XM or Sirius traffic) with traffic information from 22408 obtained from vehicles and associated devices 2404. This information may then be relayed to vehicles 2412 in real-time. Data obtained from the operation of any vehicle may be used in determining traffic conditions (signal breaking, speed, etc.). Specifically, the daisy-chain network and sensors previously described can provide information to be used in interpreting the real-time or near-real time traffic conditions. For example, several vehicles slowing to a stop could indicate an accident or emergency that could be relayed to the public. The real-time traffic system would then correlate the information and provide the collected and correlated traffic information to the public, such as by a broadcast or push or pull signaling mechanism.

Additionally, the availability of this data may be limited to dissemination to a select few. For example, those who contribute data relating to traffic may be those who can receive information relating to overall traffic conditions. Otherwise, the signal may be blocked to others, those who do not activate the feature, and/or participate in the information collection, etc.

Figure 25:
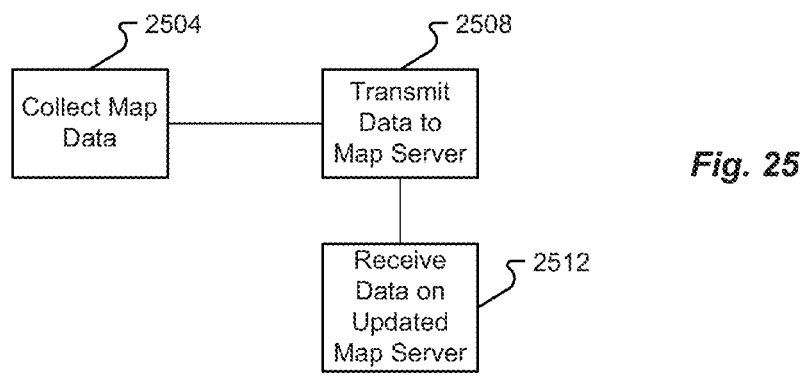
FIG. 25 depicts a system where map data is updated from vehicles and associated devices according to embodiments of the present disclosure.

FIG. 25 depicts a system where map data is updated 2512 from vehicles and associated devices 2504 according to embodiments of the present disclosure. Currently, map data and directions may be provided to a vehicle by GPS units, map disks, or a GPS service. However, the data can become old and incorrect as time passes.

In accordance with the present disclosure, a system where map data is updated based on information provided by other users and vehicles is provided. Specifically, the system may get updates on mapped areas by receiving information 2508 provided by a plurality of devices 2504. Additionally, the system may make corrections to map data providing accurate data over time, such as if there is construction or a detour.

In some embodiments, the automobile may track where you are currently located. If the GPS unit provides specific directions to a vehicle and an individual takes a route that does not follow the directions provided, the area may be flagged for further investigation. The area would be flagged because failure to adhere to provided directions may indicate inaccurate directions and/or changed conditions. The flagged areas may then be compared to other users' behavior and travel patterns. This data may also be collected relating to other settings, including parking lots, store front locations, etc.

Furthermore, the map updating function may suggest alternate routes in addition to or alternatively to standard map routes. These alternate routes may be generated by: 1) the GPS unit, 2) past driver data, 3) compilation of data from other users/drivers, and 4) combinations thereof. These routes may also be coded according to the route suggestion type and source. For example, your current location, or source, is X, and you want to get to destination, Y; different routes are provided using a combination of GPS location and other data coded in alternate colors/numbers/or other identifiers.

It is an aspect of one embodiment of the present disclosure, to also measure standard travel times for routes and store them against specific days and times. If a vehicle travels to a location (e.g., work) at a specific time every day, it can determine traffic patterns, stoppage at traffic lights and stop signs, and the like. This data can be aggregated with multiple users' devices and vehicles to get and project more realistic arrival times and routes. Standard GPS units and services with "real-time" traffic cannot perform this function well if at all. Using dates in the compilation of traffic data and predicted times is important because a specific date may provide a better prediction of traffic conditions. By cross-referencing a particular date against popular holiday and/or vacation months traffic conditions may be more accurately predicted. Further, the system may use the sensors associated with the vehicle to determine estimated traffic times based on current weather and/or road conditions. Alternatively, the weather conditions may obtained by connecting to a source(s) providing data from weather stations and sensors remote from the vehicle.

It is anticipated that a device associated with a vehicle may receive text alerts on the best time to leave, based on real-time traffic conditions and predictions. In one embodiment, the predicted traffic for at least one future time period may be provided to a device at a certain time, such as 30 minutes before someone leaves for work. For example, a user with a device associated with a vehicle may receive an alert the night and/or day before traveling to provide traffic predictions by the hour, minute, or any fraction thereof. Additionally, a user may desire to receive an alert listing predicted traffic times for a given future time period. In one application, a user may receive a prediction schedule for the week ahead before venturing into traffic.

Figure 26:
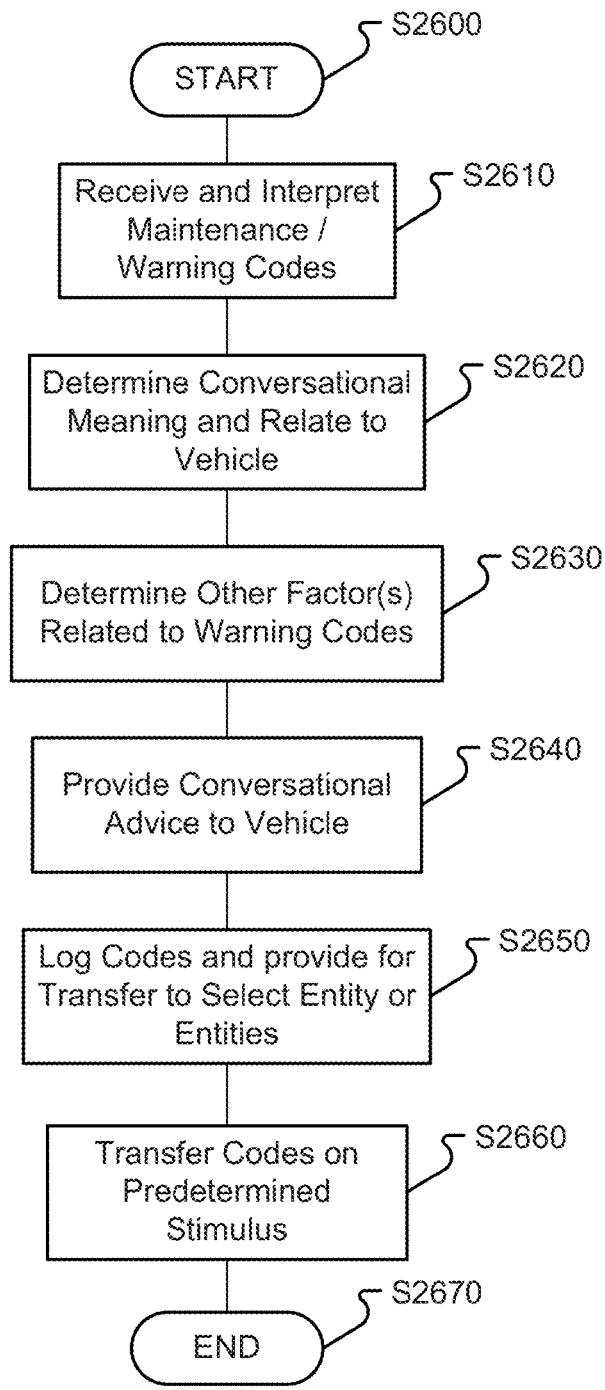
FIG. 26 depicts a vehicle ecosystem capable of providing accurate indications for purposes of service and maintenance in accordance with embodiments of the present disclosure.

FIG. 26 depicts a vehicle ecosystem capable of providing accurate indications for purposes of service and maintenance in accordance with embodiments of the present disclosure. Currently, vehicles may offer a warning light and/or series of lights to provide information to a user regarding vehicle condition. These lights may have a multitude of meanings that may require further inspection by a mechanic or other qualified individual. In order to interpret and decode the meanings behind a light combination, the user is routinely required to consult the owner's manual, the Internet, or to call the dealer. In some cases, these lights are only maintenance reminders and need not be immediately addressed. However, in other cases, the lights are urgent and require immediate attention.

It is an aspect of one embodiment of the present disclosure to provide an Internet enabled car that is capable of transmitting vehicle codes, error code readings, and to remotely diagnose and display these codes to a user and/or a mechanic. This diagnostic information may be performed on-board and/or remotely. It is anticipated that the information may be accessed according to chosen preferences. Additionally, it is anticipated that based on the type of warning/error code, the system may suggest a recommended course of action. For example, if the error code indicates a severe or catastrophic failure the system may suggest to pull-over, stop the car, and proceed to a safe area away from the automobile.

In some embodiments, the system may provide "conversational" warnings to a user. These warnings and associated codes may also be simultaneously transmitted to a selected garage and/or postponed for approval to transmit to the nearest garage (either wired or wirelessly). In addition, the system may estimate an approximate time to fix (based on past garage fix times, garage inventory, severity of problem, combinations, etc.) and make appropriate suggestions. For example, the system may provide the conversational warning "Please do not be alarmed, your engine is running slightly low on oil; there are four garages in the general area. You have time to get a cup of coffee while you wait; here are three coffee shops in the immediate location" and/or "It appears that the rear left suspension is malfunctioning and the upper strut will need to be replaced. It is noticed that you are greater than 80 miles from home, would you like to book a reservation at a local hotel? There are five hotels in the area rated three stars or above."

In accordance with one exemplary embodiment, control begins in step S2600 and continues to step S2610. In step S2610, maintenance/warning codes are received and interpreted. Next, in step S2620, the conversational meaning is determined and related to the vehicle. Next, in step S2630, one or more other factors related to the warning codes are determined. Control then continues to step S2640.

In step S2640, conversational advice is provided to the vehicle. Next, in step S2650, one or more codes are logged and optionally transferred to a select entity or entities. Then, in step S2660, the codes are transferred on a predetermined stimulus. Control then continues to step S2670 where the control sequence ends.

Figure 27:
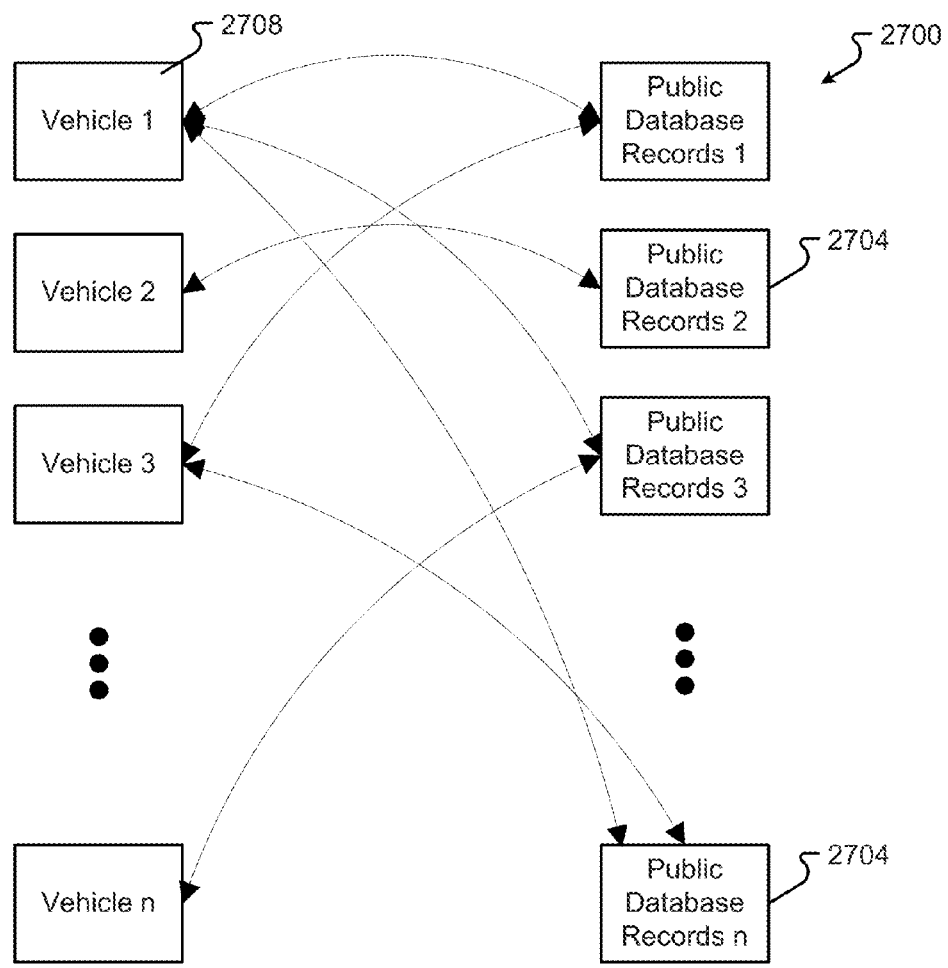
FIG. 27 depicts a vehicle ecosystem capable of exchanging information with public records databases for the purposes of general awareness in accordance with embodiments of the present disclosure.

FIG. 27 depicts a vehicle ecosystem 2700 capable of exchanging information with public records databases 2704 for the purposes of general awareness in accordance with embodiments of the present disclosure. Currently, sexual predators and other offenders must register with a "sexual predator database" or other database to alert the public of their home location. However, there is nothing that continually tracks a sexual predator or alerts others if a sexual predator is nearby in his/her car.

It is an aspect of one embodiment of the present disclosure that a system is capable of connecting to a sexual predator, and/or other, database and using patterns and/or real-time data to determine predator whereabouts. Using information relating to a home position of a sexual predator and comparing that position to a given automobile's repeated park position, the system may make a connection between a predator and a given vehicle 2708. In the event that a vehicle is parked near a predator's home location, recorded in the sexual predator database, the vehicle may associate itself with belonging to the sexual predator. Others may then be warned of the sexual predator's location depending on the location of the associated vehicle.

Another embodiment anticipates using an additional check to verify that the predator's home is truly associated with the appropriate vehicle. For example, if the sexual predator lives in an apartment building with multiple parking spaces, extra data points may be used to not falsely associate cars with sexual predators. In this instance, the system may record whether the automobile has parked near a known sexual predator's work location as an extra factor to add to the accuracy of identifying the true sexual predator. Additionally, the vehicle ecosystem may make an assumed association and attempt to verify the information before making the information public by sending a verification request to a sexual predator registry and ask if the sexual predator is actually associated with the vehicle. Although described as relating to sexual predators, it can be appreciated by one skilled in the art that the application may also apply to other known criminals, violent offenders, and other individuals who may be found in public record databases.

Additional Embodiments

In accordance with additional exemplary embodiments of the present disclosure a driving reputation system is further disclosed. As a vehicle collects information from associated sensors and devices, data may be stored and related to a specific driver. This related data may correspond to a driving reputation. For instance, a vehicle operator may obtain a lower reputation if that vehicle operator is known to drive erratically, make sudden stops, avoid using signals, and/or constantly speed through school zones, and the like.

It is anticipated that reputation data may be compiled by the vehicle and/or associated systems. Alternatively, or additionally, vehicle operators may report on least one driver's behavior by sending a signal to a central repository. This central repository may analyze the reported data and cause at least one driver's behavior to be reflected in a reputation "grade." In some embodiments, vehicle operators may report good, bad, and/or both types of behavior. For example, if a driver yields to another driver, waives thank you, and/or provides another driver space to enter into a lane, the other driver may report good behavior about the driver. In addition to communicating reputation to a repository, it is anticipated that one vehicle may communicate with another to report and/or exchange information regarding vehicle operation reputation.

Figure 28:
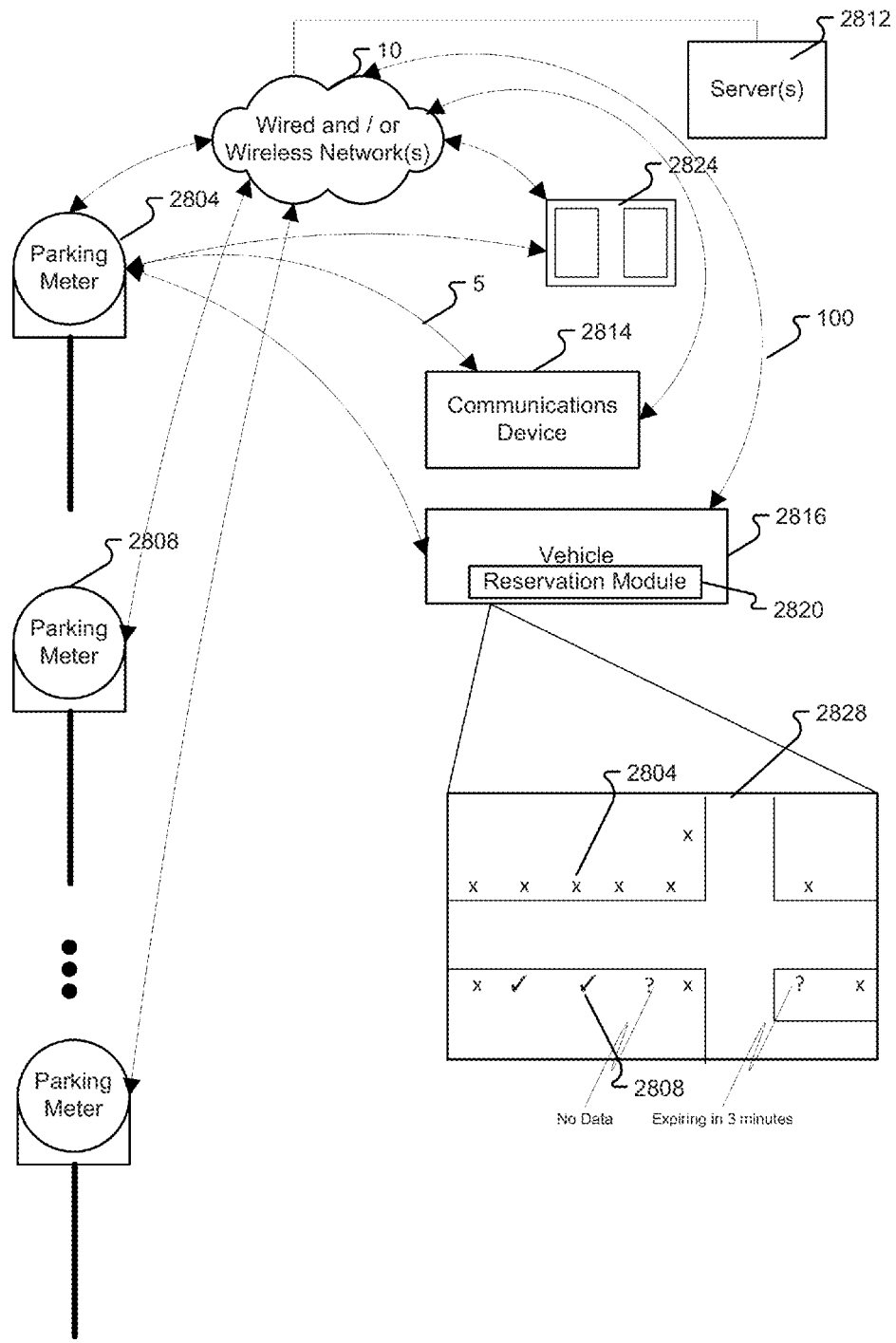
FIG. 28 illustrates an exemplary embodiment of a parking meter status system in accordance with embodiments of the present disclosure.

FIG. 28 illustrates, in greater detail, the parking space finder embodiment discussed herein. More specifically, FIG. 28 illustrates an exemplary operational environment that includes one or more parking meters, such as parking meters 2804, 2808, etc., a vehicle 2816 that optionally includes reservation module 2820, server 2812, communications device 2814, a tablet or PC-type computing device 2824, all interconnected via one or more links 5 and networks 10.

In accordance with one exemplary operational embodiment, vehicle 2816 forwards a request for parking spot availability to server 2812. The server 2812, can respond to the vehicle asking, for example, the driver, to provide an indication as to where they are seeking a parking spot. In accordance with one exemplary embodiment, this is performed by querying the driver via, for example, a communications channel that can either be associated with the vehicle 2816 or the communications device 2814. Alternatively, or in addition, the server 2812 can query, for example, a GPS device associated with the vehicle and determine from the GPS device what is the currently programmed destination the vehicle is travelling to. With this information, server 2812, as discussed hereinafter in greater detail, can determine available parking spots for the indicated destination. In accordance with an optional exemplary embodiment, the server 2812 can also query as to the preferred proximity to the destination the driver would like to be in. For example, server 2812 could query the driver as to whether they would like to be one block, two blocks, or some other distance from the destination. This setting could also be stored as a rule such that every time a user is looking for a particular parking spot, the system, and server 2812, knows that the user wants to be within a specified distance of the destination.

With this information, the server 2812 determines the geographic area to query and then queries status information associated with parking meters within that geographic area to determine availability. As discussed, this availability can be determined based on one or more of parking meter status, and one and more sensors associated with the parking meter to determine whether or not there is a vehicle parked in a parking space associated with the parking meter. Once the available parking spots are determined, the server 2812 can provide one or more of parking spot information to the driver in one or more of a text or audible format, can update the GPS associated with vehicle 2816 to, for example, provide the vehicle specific directions on how to arrive at the available parking spot or, in general, provide communication in any available format to the user of vehicle 2816 to assist them with locating the available parking spot.

As will be appreciated, since parking spot availability can change on a frequent basis, server 2812 can remain in communication with vehicle 2816, communication device 2814 or tablet/PC 2824, as well as the parking meter, and continuously update the available parking spot information on, for example, a regular or predetermined basis. In accordance with one optional exemplary embodiment, the updating of the available parking spot information only occurs if the parking spot that was previously identified as available changes to unavailable. The system could then automatically provide the user with another recommendation for an available parking spot in the same manner as discussed above.

As illustrated in FIG. 28, there is an optional display 2828 that graphically illustrates a map with not only the location of the parking meters, but also a status thereof. For example, parking meter 2804 is illustrated as being not available, with parking meter 2808 indicating that a parking spot is available as well as another parking meter for which no data is available ("?") and a fourth parking meter with a question mark here indicating that the meter is "expiring," with the assumption being that the meter may become available in the future, but it is not currently available. While display 2828 is illustratively shown as being associated with vehicle 2816, it should be appreciated that display 2828 could further be associated or on communications device 2814 or tablet/PC 2824. In accordance with one exemplary embodiment, the display 2828 is associated with an application running on communications device 2814, with the application being in communication with server 2812 to facilitate the update of the parking meter status in the display 2828.

In accordance with another optional exemplary embodiment, instead of a user entering the location information, display 2828 can be updated in real-time, for example, as a user drives around the block looking for an available parking space. Here, the system does not receive destination information, but instead determines meter status and parking spot availability within a predefined geographic area around vehicle 2816.

Figure 29:
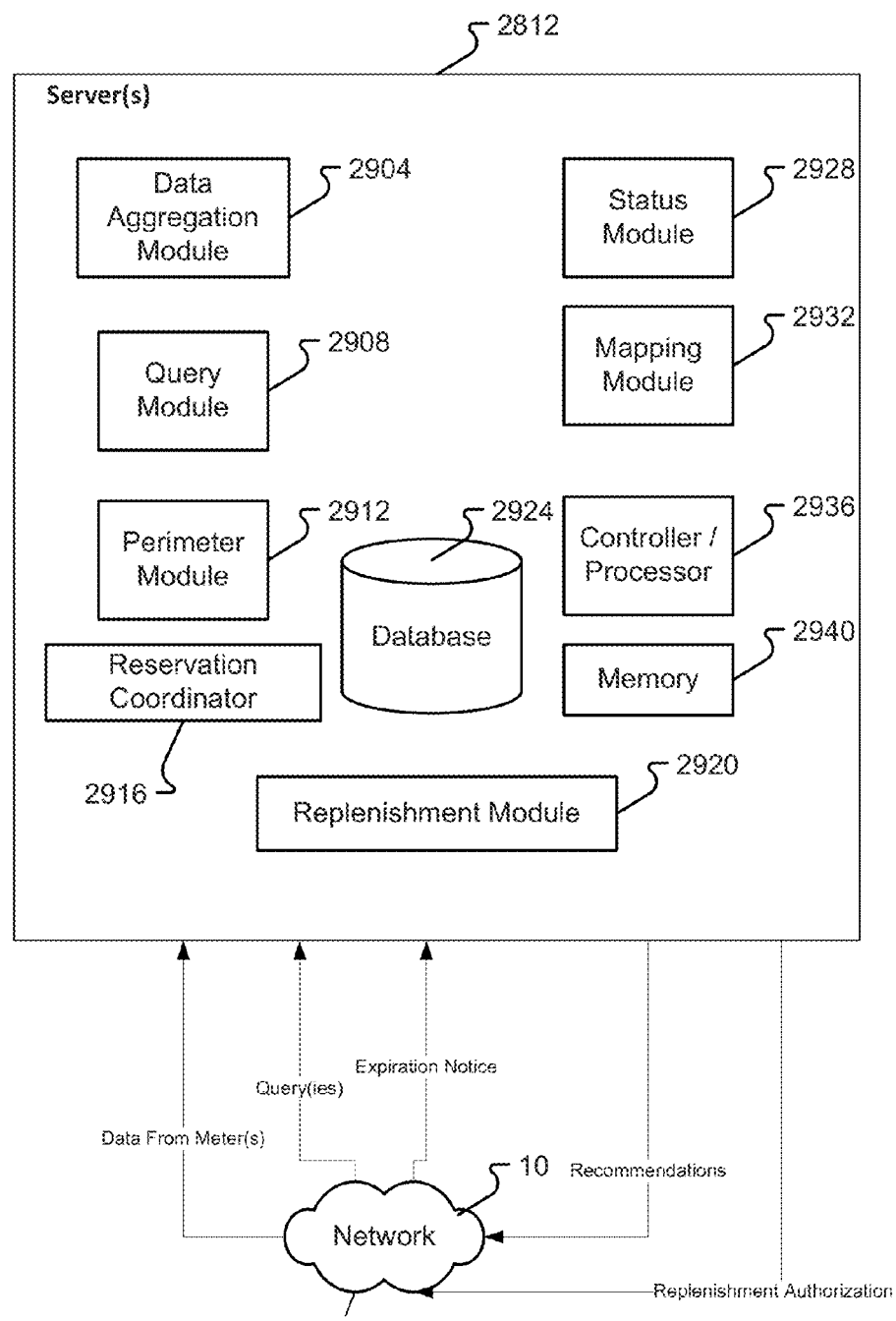
FIG. 29 illustrates in greater detail an embodiment of the parking meter status system in accordance with embodiments of the present disclosure.

FIG. 29 illustrates in greater detail server 2812. In particular, server 2812 includes a data aggregation module 2904, a query module 2908, a perimeter module 2912, a reservation coordinator 2916, a replenishment module 2920, a database 2924, a status module 2928, a mapping module 2932, controller/processor 2936 and memory 2940.

The server 2812 can be connected via one or more links to one or more networks 1 that allow for the exchange of data between the server and one or more of the devices illustrated in FIG. 28. In operation, data aggregation module 2904 receives data from one or more of the parking meters, such as parking meter 2804 and parking meter 2808. The information associated with the parking meter is then stored in database 2924. This information includes, for example, whether the parking meter is in use, or expired, an amount of time remaining on an "in use" meter, and optionally whether or not a vehicle or object is detected as being in the parking spot associated with the meter. Additional information that can also be included is whether the parking meter is out of service or, for example, whether the parking meter is not available due to, for example, a street closure, construction, or the like.

The query module 2908 receives one or more queries regarding parking spot availability within a geographic area from a user. The query module 2908, cooperating with database 2924, mapping module 2932 and perimeter module 2912, determines the geographic area in which to look, and then with the status module 2928, determines the current status of one or more of the meters in that area. The results to this query can then be assembled and returned to the querying device in any plurality of formats, as discussed, such as a text or audio message, as information overlaid on a map and/or as coordinates, such as GPS coordinates, that can then be used by the user to route themselves to the identified free space.

The status module 2928, cooperating with the data aggregation module 2904, stores information associated with the status of the parking meter in database 2924. As discussed, this detection of meter status can include one or more of the current state of the meter, such as expired, in use, time remaining, or the like, and can further include information such as whether or not there is an object or a vehicle in the spot associated with the meter and/or whether the meter is out of service. Various parking meters can be further equipped with technology that allows the parking meter to forward updated status information to the data aggregation module 2904 in the event of a change of the status of the meter. For example, if there is time remaining on the meter, but the meter detects that a vehicle or object has left the associated space, this information could be forwarded to the data aggregation module 2904, and the status of that meter updated in cooperation with the status module 2928 and database 2924.

In accordance with another exemplary embodiment, the reservation coordinator 2916 cooperates with the reservation module 820 to allow for a user to reserve a parking space for future use. For example, the user can query the system for an available parking spot on the 100 block of Main Street. If a parking spot is available, or becomes available, the reservation coordinator 2916 will initiate a communication to one or more of the vehicles 2816, communications device 2814 and/or tablet/PC 2824, indicating that there is a spot available, and query the user as to whether or not they would like to reserve this spot for future use. If the user elects to reserve this spot for future use, the user could either automatically or semi-automatically notify server 2812 that a vehicle with a particular identifier, such as a license plate number, would like to reserve that spot for two hours and then optionally have an identifier, such as a license plate number, associated with that parking spot from a certain start time to an end time. The reservation coordinator 2916 can optionally forward this identifying information, such as license plate information, to the reserved parking meter which the reserved parking meter can optionally display on a display device associated therewith indicating the reservation. Once the reservation is confirmed, as with the other embodiments, the location of the reserved parking spot can be forwarded to a user associated with the vehicle to enable their parking thereat.

As will be appreciated, payment need not necessarily take place before occupancy of the free space, but rather payment could also occur upon arrival of the user of the reserved parking space or when the reservation is made. If, however, the user does not arrive at the reserved parking space within a predetermined amount of time, the meter could revert its status to free or whatever status is appropriate based on the current conditions of that parking meter and the associated parking space. In the embodiment where the user opts to pay upon arrival, the meter could optionally display the license plate number of the vehicle and ask the person to insert sufficient funds to pay for that parking spot for a certain amount of time.

In accordance with another exemplary embodiment, the status module 2928 provides status information to a user via, for example, a communications device such as communications device 2814. Communications device 2814 can be any type of communications device, including, but not limited to, a telephone, a smart phone, tablet/PC, text messaging system, a GPS device, or in general any device capable of receiving information regarding the status of a parking meter. In accordance with this exemplary embodiment, the status module 2928, cooperating with the data aggregation module 2904, monitors the status of a parking meter that the user has parked at. Upon parking, the user associates one or more communication devices with the parking meter with these communication devices capable of receiving status information such as minutes remaining on the meter and/or an expired alert. This association can be performed in a number of ways including automatically or semi-automatically, or manually as appropriate.

In accordance with the first exemplary embodiment, the user can open an application, enter the parking meter identifier, and optionally their license plate, and the application, knowing an associated phone number or other identifier of the communication device, have this information forwarded to the status module 2928 that will allow the server 2812 to update the status of the parking meter on the communications device 2814.

In accordance with another exemplary embodiment, a user can insert a credit card into the parking meter, the system able to determine a communications device associated with the credit card number, such as a telephone number or email address that is associated with the credit card account number, and use this telephone number for updating the user about the status of spot in which they are parked.

In accordance with yet another exemplary embodiment, the user, upon approaching a parking meter, or being within a predetermined distance from the parking meter, can have an application ("App") automatically initiated or downloaded to their communications device that allows the system to determine to which device status information should be sent to.

In accordance with an optional exemplary embodiment, payment information can also be associated with the parking meter that not only allows for initial payment, but in cooperation with the replenishment module 2920, allows for the meter to be replenished should further funds be required to purchase more parking time.

More specifically, the user associates a communications device with a parking meter. Optionally, the user can also associate a payment type with the meter for replenishment as discussed hereinafter. In accordance with the first exemplary embodiment, the meter monitors the time remaining, and upon this time being less than a threshold, generates a low-time remaining signal that, with cooperation of the status module 2928 and information in database 2924, such as the phone number associated with the parking meter, forwards a notice to the communication device indicating a certain amount of time is remaining before expiration of the meter. An option can be provided to the user at this point to allow for additional time to be purchased for parking using, for example, a stored associated payment type as discussed.

In accordance with another exemplary embodiment, the amount of time purchased on the meter can be forwarded to the communication device, with the communication device starting a timer that allows the user to monitor how much time remains thereon. As with the other exemplary embodiment, upon the meter approaching the expired status, the parking meter can optionally be replenished using, for example, a stored form of payment or a new payment type, such as a credit card, entered by the user.

As with the low-time remaining notification, status module 2928 can also forward meter expired notifications to the associated communications device to alert the user that the time on the meter has expired. As with the low-time remaining notification, the receipt of the expired notification can also trigger a query as to whether or not the user would like to purchase more time which, if selected, can be confirmed with the cooperation of one or more of the status module 2928 and replenishment module 2920 as well as the parking meter. As with many types of online transactions, the communications device can optionally receive confirmation, via a receipt, that additional time has been purchased, the amount of time purchased, the amount charged to the payment type, such as the credit card, and any other relevant information associated with the transaction. The receipt could also be e-mailed to an e-mail address or other destination and/or stored on the communications device to, for example, allow the user to track expenses.

As will be appreciated, the user may leave the parking spot prior to the meter expiring. The departure from the parking spot can be manually effected by the user disassociating, via a command, the communications device from the parking meter. In accordance with another exemplary embodiment, if the user were to remove their vehicle from the parking spot, the parking meter could automatically disassociate itself from a previously associated communications device. The meter could then update its status to available.

In accordance with another exemplary embodiment, the parking meter can automatically detect the vehicle is no longer present in the spot, or that a disassociation command has been received, and automatically switch to an "expired" status which would indicate that the parking spot is available to the status module 2928. This could facilitate revenue generation for a municipality since time would not remain on the meter after a vehicle has departed, requiring a new user parking in the parking spot to pay for a full allocation of time.

Figure 30:
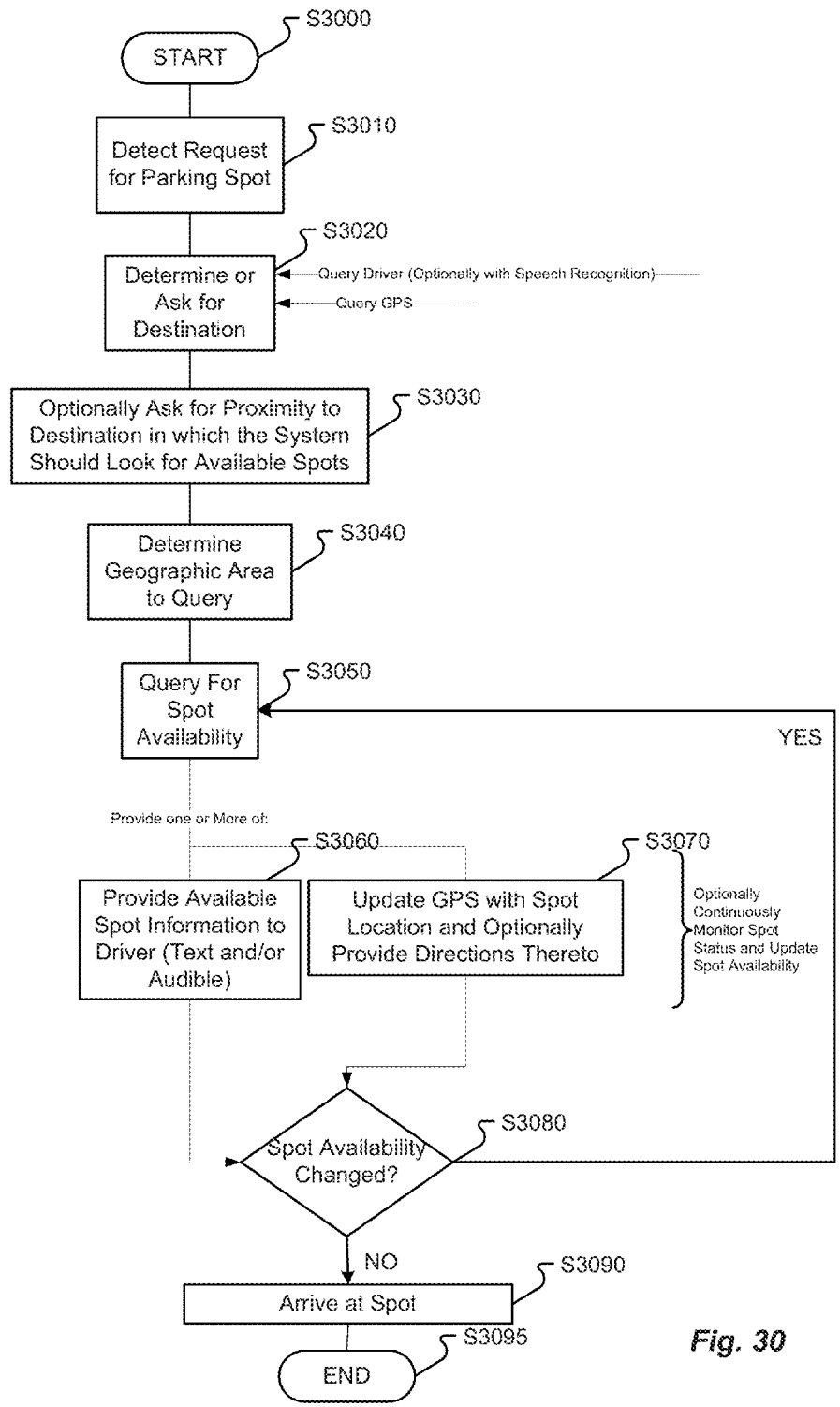
FIG. 30 illustrates an exemplary method of providing parking spot availability in accordance with embodiments of the present disclosure.

FIG. 30 illustrates an exemplary method for alerting a user as to an available parking space. In particular, control begins on step S3000 and continues to step S3010. In step S3010, a request for a parking spot is detected. Next, in step S3020, the location in which the parking spot is desired is acquired, for example, automatically from a GPS unit, or a user can be asked to provide general location information. Then, in step S3030, the user can optionally be asked as to how close to the requested destination the parking spot needs to be. Control then continues to step S3040.

In step S3040, based on the proximity and location information, a geographic area is determined within which parking meter status will be queried to determine availability. This availability determination is made in step S3050 with the results thereof provided in one or more of steps S3060 and S3070. As will be appreciated, a parking spot may not be available at the requested location within the desired proximity thereto. The system could notify the user of this, and ask them to adjust one or more of the proximity and location in an attempt to find available spaces with the system continuing as discussed herein to notify the user of any available spaces that are found.

In step S3060, parking spot information is provided to the user in one or more of a text format or audible format, such as via a text message on a communications device, via an in-vehicle audio system, in cooperation with a GPS unit, graphically, or the like. Alternatively, or in addition, in step S3070 the location of the available parking space can be sent to the user using coordinate data with this coordinate data capable of being integrated into and on-vehicle GPS system or communication device GPS or mapping system, such as to facilitate the user finding their way to the available parking space.

As will be appreciated, since parking spot availability can change, the system can optionally continuously monitor and update the status of the parking spot availability in the same manner, with this updated parking spot status information capable of being sent to one or more of the user and devices as discussed. Should parking spot availability change, the system can re-determine and update parking spot availability based on one or more of a detected change in status, a predetermined time interval or based on a user request (see step S3080).

In step S3090, a user can arrive at the spot with control continuing to step S3095 where the control sequence ends.

Figure 31:
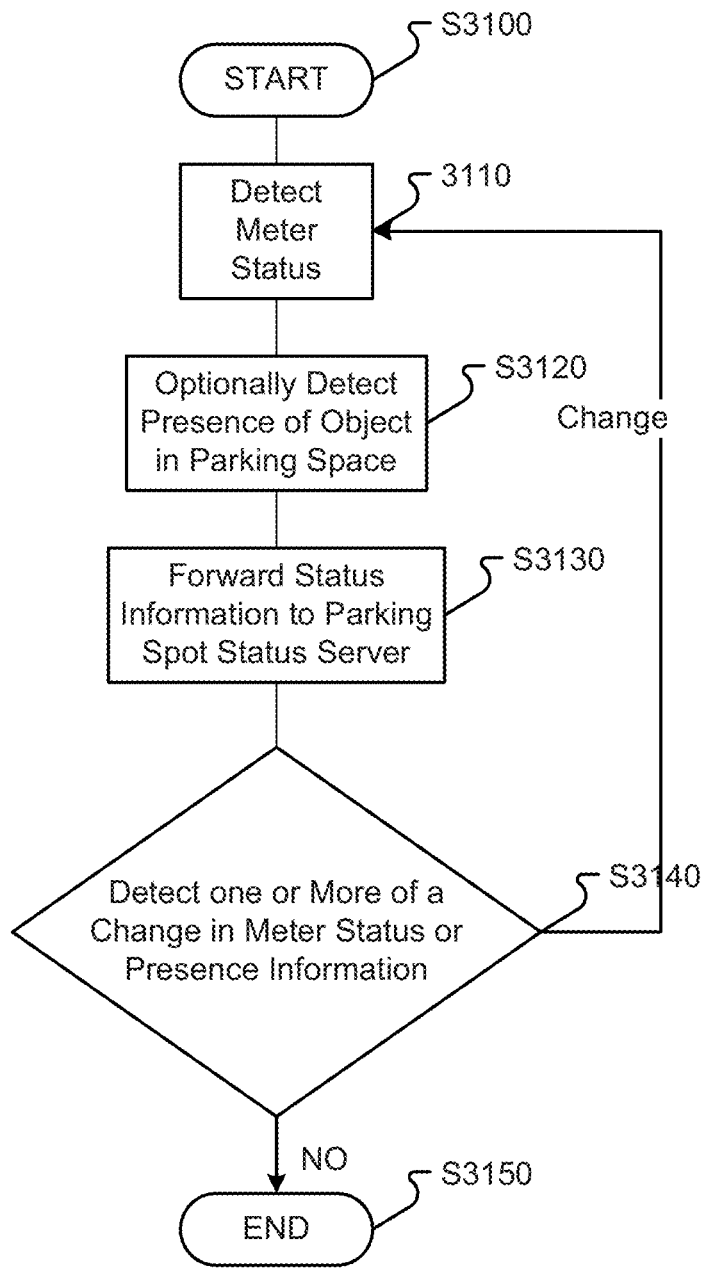
FIG. 31 illustrates an exemplary method of providing updated parking spot status in accordance with embodiments of the present disclosure.

FIG. 31 illustrates an exemplary method for a parking meter to provide status relative thereto. In particular, control begins in step S3100 and continues to step S3110. In step S3110, a meter's status is detected, e.g., in use, time remaining, expired, out of order, or in general any status associated with the parking meter. Next, in step S3120, an object can optionally be detected in the parking space associated with the meter. Then, in step S3130, this status information is forwarded to, for example, a parking spot status server, a parking meter status server, a communications device, or in general to any destination to assist with determining parking spot availability. Control then continues to step S3140.

In step S3140, the determination is made as to whether there has been a change in either the meter status or whether an object has entered or left the associated parking space. If there has been a change, control jumps back to step S3110 with control otherwise continuing to step S3150 whether the control sequence ends.

Figure 32:
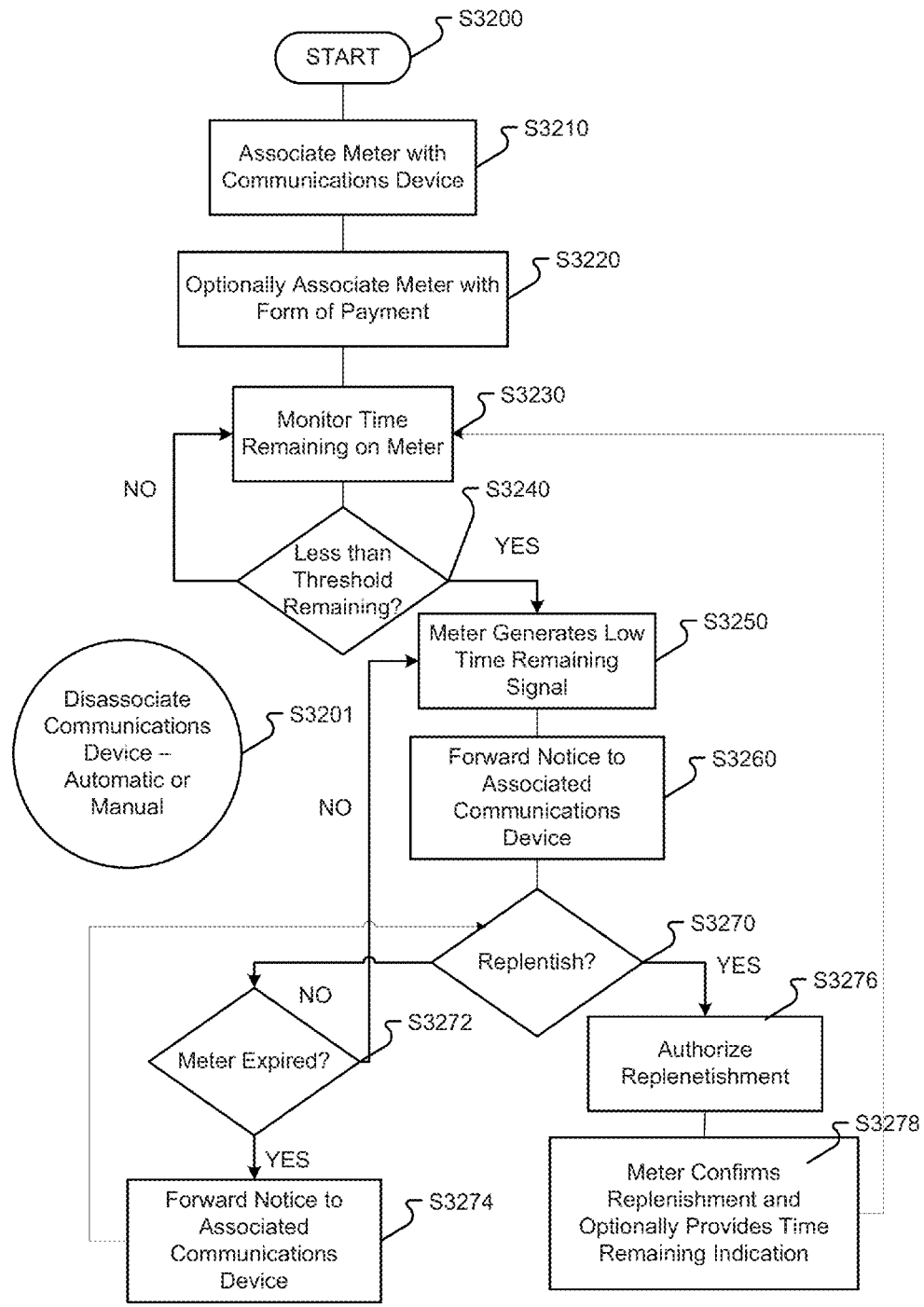
FIG. 32 illustrates an exemplary method for providing parking meter status and replenishment in accordance with embodiments of the present disclosure.

FIG. 32 outlines an exemplary method for replenishing a parking meter in accordance with an exemplary embodiment. In particular, control begins in step S3200 and continues to step S3210. In step S3210, a communications device is associated with a parking meter. Next, in step S3220, a form of payment, such as a credit card, account number, or the like, can optionally be associated with the meter. Then, in step S3230, the meter begins monitoring time remaining before expiration. Control then continues to step S3240.

In step S3240, a determination is made as to whether there is less than a threshold time remaining. If there is less than a threshold time, such as 5 minutes, control continues to step S3250 with control otherwise jumping back to step S3230.

In step S3250, the meter generates a low-time remaining signal that is forwarded to the associated communications device, which can optionally include information such as amount of time remaining Next, in step S3260, this signal is forwarded via any one or more known protocols to the associated communications device, such as via a telephone call, text message, e-mail, instant message, or in general in any manner that allows for the user to be provided with information as to the time remaining on the meter. Control then continues to step S3270.

In step S3270, a determination is made as to whether additional time should be purchased. If additional time should be purchased, control continues to step S3276 with control otherwise continuing to step S3272.

In step S3272, a determination is made as to whether the meter is expired. If the meter has expired, a notice indicative thereof can be forwarded to the associated communications device. If the meter is not expired, control can optionally jump back to step S3250.

If the user would like to replenish or otherwise purchase time on the meter, control continues to step S3276. In step S3276, a purchased transaction is initiated with one or more of an associated credit card, an associated account, or a new form of payment entered that allows for more time to be purchased. Then, in step S3278, the meter can confirm replenishment and optionally provide an indication of the time remaining thereon with control jumping back to step S3230. This time remaining indication can then optionally be forwarded to the device that initiated the replenishment action.

As will be appreciated, the user could leave the parking space at any time. Therefore, at any point within the methodology described in FIG. 32, control can jump out to step S3201 where the communications device is disassociated from the meter. As discussed, this can be performed in an automatic, semi-automatic or manual manner, and in general can be performed using any technique that will indicate to the parking meter that the user is no longer using the parking space.

Figure 33:
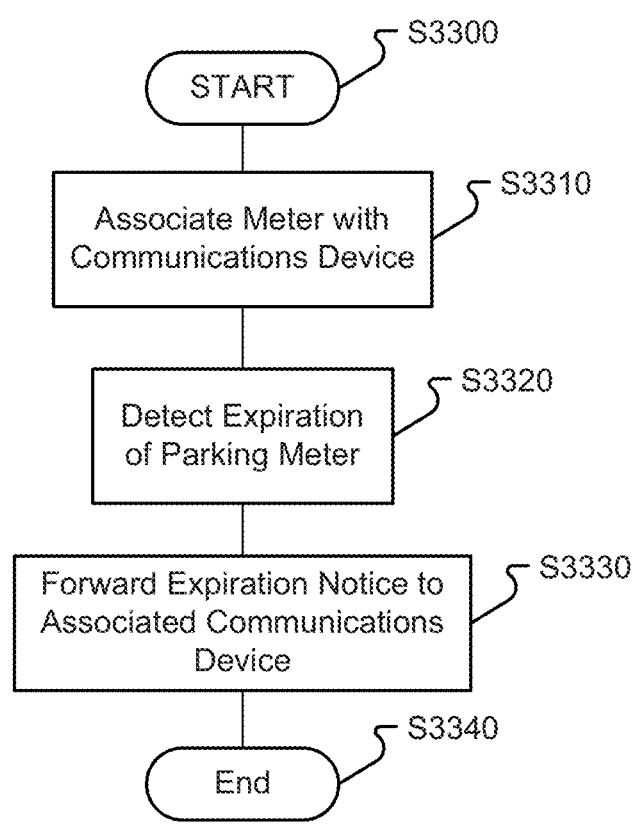
FIG. 33 illustrates an exemplary method of communicating expiration information in accordance with embodiments of the present disclosure.

FIG. 33 outlines an exemplary method for forwarding parking meter expiration notices to a destination. In particular, control begins at step S3300 and continues to step S3310. In step S3310, a device, such as a communications device is associated with the parking meter. It should be appreciated however that a communications device need not necessarily be associated with the meter, but rather a communications destination could be associated with a meter, such as an e-mail address, telephone number, IP address, or the like. Upon, in step S3320, the expiration of the parking meter being detected, in step S3330, a notice indicating that the parking meter has expired is sent to the associated communications destination or communications device. Control then continues to step S3340 where the control sequence ends.

Figure 34:
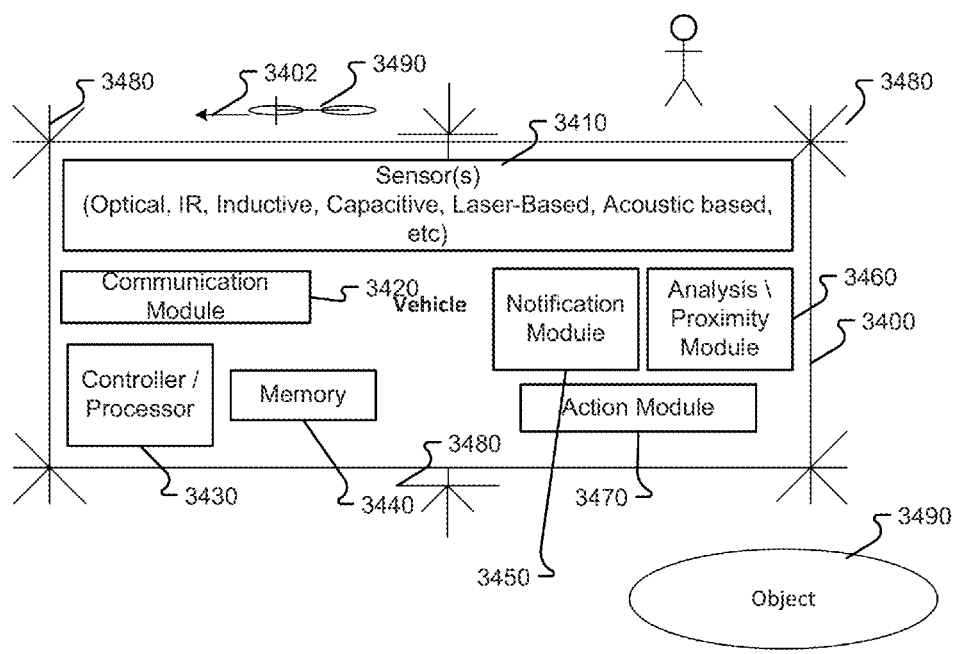
FIG. 34 illustrates an exemplary vehicle sensor system in accordance with embodiments of the present disclosure.

FIG. 34 illustrates in greater detail a proximity warning system according to one exemplary embodiment. As discussed, this proximity warning system can be used to alert the presence of adjacent vehicles, or objects, and further optionally allows the vehicle 3400 a method for communicating with vehicles or objects that are within a predetermined proximity of the vehicle. These objects can be, for example, another vehicle, a pedestrian, a cyclist, and/or other vehicle 3490 determined to be within a particular proximity to the sensing vehicle. More specifically, and as illustrated in FIG. 34, a vehicle 3400 is illustrated that includes one or more sensors 3410, communication module 3420, controller/processor 3430, memory 3440, a notification module 3450, an analysis/proximity module 3460, and an action module 3470. In addition, within the vehicle environment are one or more objects 3490, such as a bicycle, a pedestrian, another car, or the like.

The various sensors 3480 on the vehicle can be used to determine not only the presence of nearby objects, but also can be used to harvest information such as device location, travel vector, distance to detected device, device type, and the like. All of this information can be used by the vehicle, and in cooperation with the controller/processor 3430, memory 3440, and the analysis proximity module 3460, to make an assessment as to whether one or more of a notification needs to be sent to the driver regarding the detected object, or whether an action needs to be taken in conjunction with the action module 3470.

In operation, one or more of the sensors 3410 and communication module 3420 query a sensible area around the vehicle 3400 to determine the presence of one or more objects. This sensing can be based on one or more of pinging, optical detection, infrared detection, inductive detection, capacitive detection, laser-based detection, acoustic-based detection, presence information, GPS information, or in general any information that can be used to assist the vehicle 3400 in determining what is in a certain geographic proximity to that vehicle. One exemplary benefit of sensing nearby objects is to assist with avoiding collisions. For example, dynamically obtained information can be acquired by the analysis/proximity module 3460, in conjunction with one or more of the sensor inputs, and vehicle trajectory or projected movement information to determine whether or not a collision is potential or eminent. For example, the analysis/proximity module 3460 can monitor wheel direction, turn signal information, travel vectors or the like to determine the current trajectory or possible future trajectory of the vehicle 3400. Combined with inputs from the communication module 3420 and sensors 3410, the analysis/proximity module 3460 can then determine whether or not a collision is likely to occur. If a collision is likely to occur, and in conjunction with the notification module 3450, the driver of the vehicle can be notified. For example, the driver of the vehicle could be notified "don't change lanes, motorcycle in right-hand lane." In a more affirmative action type of scenario, the action module 3470 could automatically apply brakes, steer the vehicle, accelerate, or in general control any aspect of the vehicle 3400 to assist the driver with avoiding a collision. An exemplary benefit of this is that objects present in a driver's blind spot can be avoided as well as drivers given greater appreciation of everything within their surroundings.

In accordance with one exemplary embodiment, the communication module 3420 queries, for example via a ping to a communications device, the area to determine the presence of any other communication devices. If there are communication devices present, communication module 3420 can query those devices and acquire their device location information, travel vector information, and speed information. With this information the analysis/proximity module 3460 can determine whether or not a collision is likely, as well as determine the approximate distance of the device from the vehicle 3400. Similarly, device type information can try be accessed, based on, for example, presence information. This device type information could correspond to what the detected object is doing and thus provide information as to what the object is, e.g., walking=person, riding=bicyclist, driving=car, etc.

While not shown in FIG. 34, the vehicle 3400 can also be equipped with a display which can be populated with information regarding the various detected objects. Using the exemplary operational environment depicted in 34, the display could be populated with information indicating that there is a bicycle at the 2 o'clock position, a pedestrian at the 4 o'clock position, and an object at the 7 o'clock position relative to the direction of travel of the vehicle. The indicators of these various objects can be optionally color-coded based on the distance they are from the vehicle 3400 as well as highlighted or otherwise identified to indicate that a collision is possible. The approximate size of the objects can also be calculated from information from the one or more sensors. The display could further be populated with information such as the distance the object is from the vehicle as well as icons representing the type of identified object shown on the display or otherwise communicated to the driver. Here, an icon illustrating a bicycle could be shown in the 2 o'clock position, an icon illustrating the pedestrian shown in the 5 o'clock position, and a "blob" illustrating an object shown in the 7 o'clock position. Directional vectors 3402 could further be provided with these icons to assist the driver in determining the current trajectory thereof.

Appreciating that there may be privacy concerns associated with the communication module 3420 pinging nearby communication devices, when a communications device such as one associated with the person, receives this ping, the ping could be a specialized ping indicating that it is only being used for determining location information, direction information, velocity information, and type of object information. In this manner, the response to the ping could be limited such that personal or sensitive information is not compromised. In a similar manner, presence information could be extracted from one or more of the detected communication devices with this presence information usable by the analysis/proximity module 3460 to assist with determining appropriate notifications and/or actions. For example, this presence information could indicate that the user associated with the communications device is driving to a particular destination, walking to get groceries, is out for bicycle ride, or in general can be any information usable by vehicle 3400 to assist with determining whether a collision is present and/or location of the nearby object.

In accordance with another exemplary aspect of the object sensing system, the communication module 3420 can provide to one or more of the surrounding objects an indication as to the intended direction of travel of the vehicle 3400. For example, the communication module 3420 could be in communication with an onboard GPS associated with the vehicle 3400. The GPS is instructing the driver to make a right turn in 100 yards, with this information optionally being communicable by the communication module 3420 to the bicycle at the 2 o'clock position relative to the vehicle to give that bicycle a "heads up" the vehicle will be shortly turning to the right. As will be appreciated, all of this information regarding trajectory, speed, future trajectory, and the like can be shared amongst any one or more of the objects, vehicles, communication devices, or the like within the sensible area of the vehicle 3400.

Figure 35:
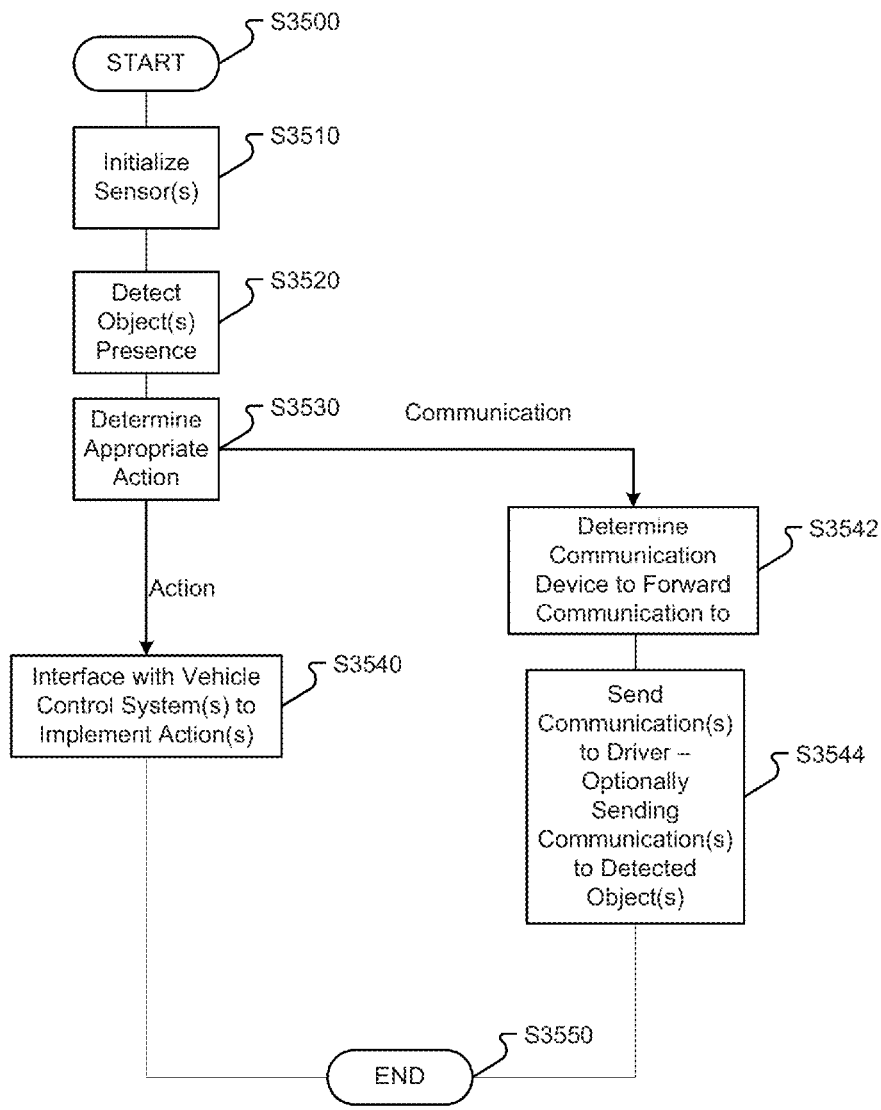
FIG. 35 illustrates an exemplary method for providing vehicle object sensing in accordance with embodiments of the present disclosure.

FIG. 35 illustrates an exemplary method of operation of object sensing. In particular, control begins in step S3500 and continues to step S3510. In step S3510, one or more sensors and/or communications modules are initialized. Next, in step S3520, the presence of one or more objects is detected relative to the current location of the vehicle. As discussed, this presence information can be shared in conjunction with anticipated trajectory information between any one or more of the sensed objects/communication devices. Then, in step S3530, an appropriate action, if any, can be determined. If the appropriate action is a communication, control jumps to step S3542. Otherwise, if the appropriate action is an action, such as controlling a vehicle, control jumps to step S3540.

In step S3542, a communication, such as an alert, warning, informational message, or the like can be forwarded to any one or more of the communication devices within the sensible area of the vehicle. As discussed in step S3542 and step S3544, the communication can be provided to the driver (or other entities) in one or more of a textual format, audible format and visual format, and in a similar manner provided to any one or more of the sensed devices proximate to the vehicle. Where to send the communication(s) can by dynamically chosen based, for example, on importance, likelihood of impact or collision, type of communication, or in general any relevant factor. Control then continues to step S3550 where the control sequence ends.

In step S3540, if, for example, evasive action is determined to be required to, for example, to avoid a collision, the system can interface with one or more vehicle controls such as the brake system, steering system, lighting system, or in general any vehicle system that allows the vehicle 3400 to avoid an interaction with one or more sensed objects. Once the danger has passed, control can return to the driver. Control then continues to step S3550 where the control sequence ends. For safety reasons, a driver override could also accompany the system.

Figure 36:
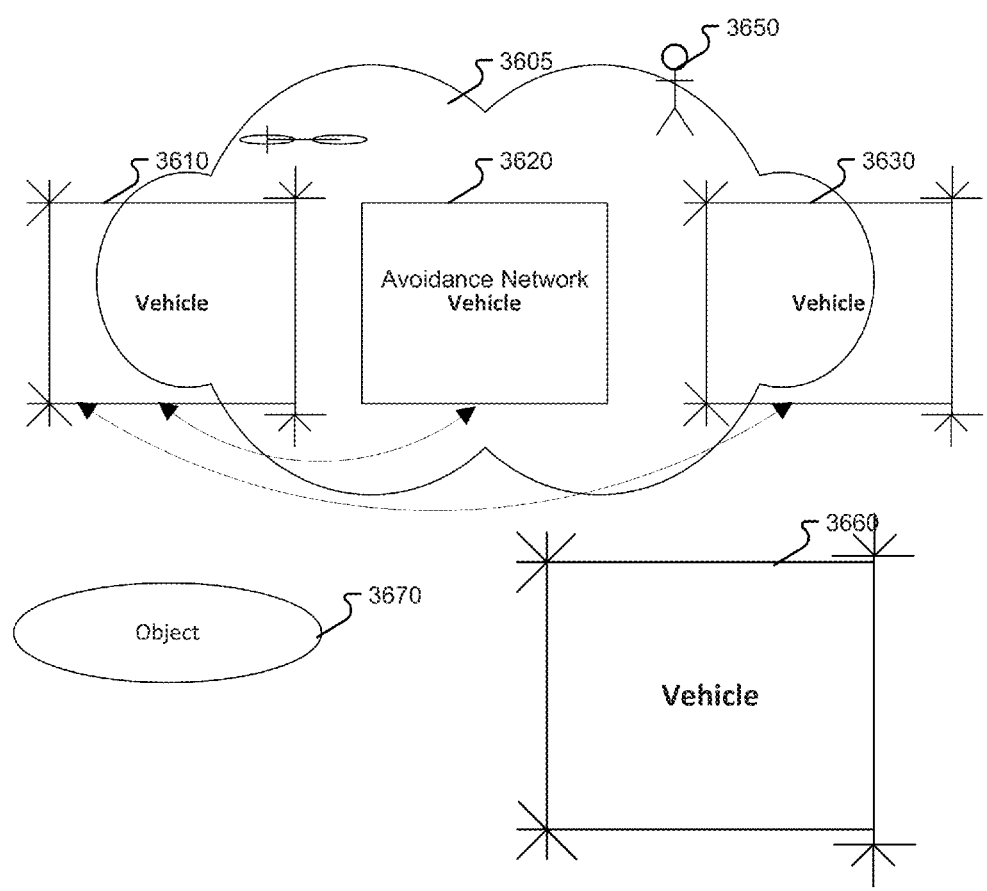
FIG. 36 illustrates an exemplary intra-vehicle avoidance network in accordance with embodiments of the present disclosure.

FIG. 36 illustrates another exemplary embodiment that can be used, for example, in conjunction with the communication techniques disclosed herein, to facilitate forwarding messages to plurality of destinations, such as a plurality of vehicles, in a daisy-chain type of manner. More particularly, FIG. 36 shows an exemplary operational environment that includes a plurality of vehicles (3610, 3620, 3630) within an avoidance network 3605, as well as other objects such as object 3670 and vehicle 3660. In this exemplary embodiment, vehicles 3610, 3620, and 3630 are networked together in a wireless ad-hoc manner that allows for the various exchanging of information and communications there between. The decentralized nature of wireless ad-hoc networks makes them particularly suitable for the subject application where, because the various communications are between vehicles, a central node architecture can't be relied upon. The wireless ad-hoc network is made up of multiple "nodes" (one per each vehicle) connected by "links." These links are influenced by the node's resources (e.g., transmitter power, computing power and memory) and by behavioral properties (e.g. reliability), as well as by link properties (e.g. length-of-link and signal loss, interference and noise). Since links can be connected or disconnected at any time (since vehicles will be entering and leaving the network), a functioning network must be able to cope with this effect by dynamic restructuring, preferably in a way that is timely, efficient, reliable, robust and scalable. The network should allow any two nodes to communicate, by relaying the information via other nodes. A "path" is a series of links that connects two nodes. Various known routing methods use one or two paths between any two nodes.

Once the network is established, various objects/vehicles within the network can exchange information such as presence information, direction information, messaging information, emergency information, and the like. In accordance with one exemplary operational embodiment, assume vehicle 3610 has slammed on the brakes. An instant notification could be provided upstream to vehicle 3620 and vehicle 3630 indicating that the vehicle in the lead has slammed on their brakes and to apply their brakes. This can be particularly useful where, for example, vehicle 3630 is unable to see the brake lights of vehicle 3610 and may have no idea that vehicle 3610 is coming to an abrupt stop.

In operation, one or more sensors could optionally be initialized to assist with the detection of objects proximate to a vehicle, such as vehicle 3610. As discussed in accordance with the exemplary embodiment in FIG. 34, each vehicle can include various components with each of the respective communication modules capable of managing one or more portions of the ad-hoc network and the various communications exchanged therein. It should be appreciated, however, that the initialization and running of the various sensors is not required in order for the vehicles (or objects) to communicate there between. At least one other network communications device does however need to be detected as well as the necessary communications protocols negotiated and agreed upon that would be required to exchange information there between.

Appreciating privacy concerns, there may be rules in place that limit or otherwise restrict the connect-ability of the various network devices as well as limit or restrict the various types of information that the network device is able to share. If, for example, network devices associated with vehicles 3620 and 3630 are detected, a query then can be sent from vehicle 3610 to the other vehicle(s) inviting them to establish communications there between as the vehicles, based on one or more presence information, GPS information, proximity detection information, or the like, were determined to be in the avoidance network 3605.

Communications established between the various objects/vehicles can be monitored with this information communicable to the other vehicles/objects if a threshold is met and/or depending on the type of communication. As discussed, these thresholds can relate to any aspect of the vehicle/object including one or more of braking force, accelerating a force, travel direction, anticipated travel direction, dangerous conditions, or in general relate to any information that could be useful in avoiding a collision, or may be of interest to any one or more of the devices/vehicles within the avoidance network 3605.

In accordance with one exemplary aspect, the information exchanged or forwarded to other vehicles can be appended with a header that includes how may "hops" the information is to travel. For example, for an extreme situation, and optionally based on traffic conditions, perhaps the information should be communicated to the nearest 50 cars. In another situation, perhaps the information only need to be transmitted to the next nearest vehicle—or one hop. Alternatively, or in addition, the header could indicate the importance of the message, this importance being correlatable to how many entities within the avoidance network should receive the information.

In accordance with another embodiment, one or more of the devices in the avoidance network could send a broadcast message that could be received by all of the other devices in the network.

As in the embodiment discussed in relation to FIG. 34, this information is not necessarily limited to simply communication information that can be used by the other drivers, but could also include information that is useful by one or more of the other vehicles to automatically apply corrective action, such as braking or accelerating, signaling information, and/or in general any information capable of modifying vehicle operation. As will be appreciated, all of this information and/or instructions can be dynamically updated in real-time or near-real time with the avoidance network 3605 also being dynamically updateable to account for objects/vehicles that are coming into or leaving the network space.

Moreover, the avoidance network 3605 can be dynamically expandable to account for a situation in which more than a first set of vehicles/objects would need to be notified. For example, if a road is completely blocked by an accident, the avoidance network 3605 could initially include vehicles 3610-3630. However, it may be advantageous to have more than the three illustrated vehicles notified with this type of information when a situation such as this occurs. Therefore, vehicle 3630 would then initiate its own instance of an avoidance network that could allow for the communication of this information to other vehicles behind it. This type of creating of avoidance networks in an ad-hoc fashion could be used, until all vehicles, for example, that are anywhere within five miles of vehicle 3610 are notified.

As these networks are daisy-chained together, location and/or direction information associated with vehicle 3610 could be used as a basis for determining when all vehicles within five miles and on the side of the road have been notified. As will be appreciated, these communications and networks are not limited to vehicles, but can also be extended to other objects, such as object 3670 and individual 3650.

In another exemplary embodiment, this network could further assist with enabling first responder emergency vehicles to more quickly and efficiently arrive at their location. For example, if a fire truck is responding to an emergency at an address, the fire truck could initiate the ad-hoc network and dynamically update vehicles along the projected path of the fire truck. In this manner, the fire truck could begin notifying vehicles that may be out of ear-shot that an emergency vehicle is approaching and pull to the side of the road. This type of dynamic notification can be coupled with GPS and/or presence information such that all vehicles that are present along the projected path of the fire truck can be given notification of the approaching emergency vehicle. For example, a notification can be sent to all contactable vehicles (e.g., all vehicles that are capable of being included in the ad-hoc network). A filter in each vehicle's communication device determines the current location of the vehicle and compares it against received information about the fire truck's path. If the vehicle in the ad-hoc network is in the fire truck's path, the vehicle receives information about the presence of the fire truck and optionally provides the driver with avoidance instructions. If however the vehicle is determined not to be in the fire truck's path, e.g., through a comparison of current GPS coordinates to fire truck path, the communication could be filtered and not provided to the driver as not relevant.

Figure 37:
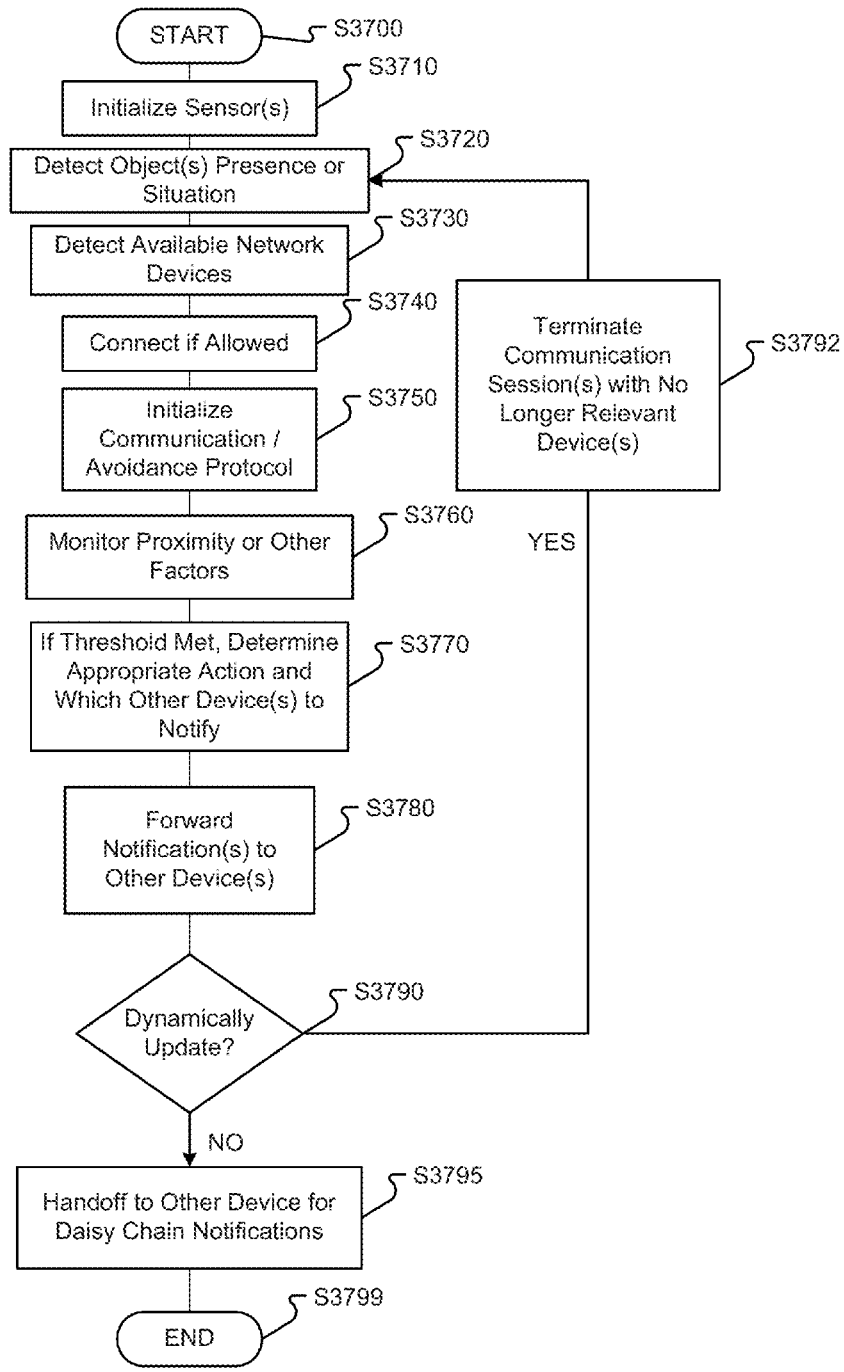
FIG. 37 illustrates an exemplary method for providing information or notifications between one or more vehicles in accordance with embodiments of the present disclosure.

FIG. 37 illustrates an exemplary method for initializing and managing an avoidance network in accordance with one exemplary embodiment. In particular, control begins in step S3700 and continues to step S3710. In step S3710, one or more sensors are optionally initialized with in step S3720 object presence detection performed. In addition, situation detection can also be detected such as, for example, if a fire truck is blocking the road to assist with an accident situation. Here, the fire truck could be broadcasting, via the ad hoc network, that they are treating an injury accident, but should have things wrapped up in 35 minutes.

Then, in step S3730, available network devices are detected. Connection to and communication with the detected network devices if allowed, occurs in step S3740. Then, in step S3750, an appropriate communication protocol is established that allows for, for example, exchanges of various types of information and/or instructions relative to one or more situations, vehicle status information, and the like. Control then continues to step S3760.

In step S3760, one or more of proximity, situation information, vehicle information, object information, emergency information, or other factors are monitored. Next, in step S3770, if a threshold is met, a determination is made as to what is the appropriate type of action to take and which other device(s) should be notified. Once this determination is made, in step 3780, one or more of a notification, the information, instructions, emergency information, or the like, are forwarded to one or more of the other devices in the avoidance network.

As will be appreciated, in step S3790, this information can be dynamically updated in real-time or near-real time with, in step S3792, communications with no longer relevant devices, objects or vehicles terminated before control continues back to step S3720. Otherwise, control continues to step S3795 where the handing-off of the management of these various communications to another device can occur, such as if the first device has left the area and is no longer affected by the situation or incident. Control then continues to step S3799 where the control sequence ends.

Figure 38:
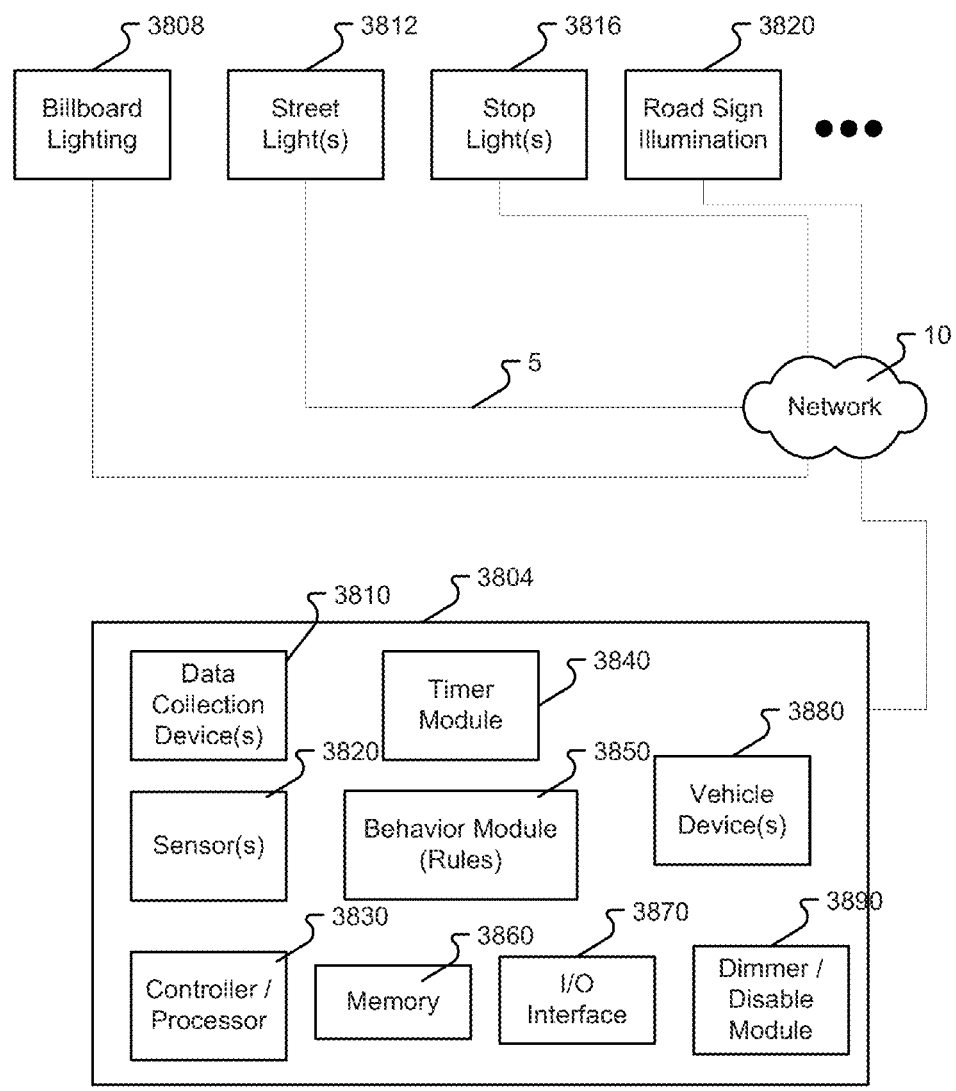
FIG. 38 illustrates an exemplary sensor system in accordance with embodiments of the present disclosure.

As discussed, FIG. 18 illustrates a sensing method where one or more elements or objects may be controlled based on one or more environmental factors, sensor inputs, data collection devices, or the like. FIG. 38 illustrates an exemplary system in a vehicle 3804 that allows and governs the control of various vehicle devices 3880 based on sensed input and collected data. More specifically, FIG. 38 includes a vehicle 3804, the vehicle including a data collection device 3810, one or more sensors 3820, controller/processor 3830, a timer module 3840, a behavior or rules module 3850, memory 3860, and I/O interface 3870, one or more vehicle devices 3880, such as lights, processors, electronics, sensors, transmission or communications systems, or in general any type of device associated with the vehicle, and a dimmer/disable module 3890. While all these various components are shown associated with vehicle 3804, it should be appreciated that these vehicle components could also be duplicated or replicated within one or more of the other elements/objects illustrated in FIG. 38, or shared there between. For example, one or more of the elements or objects/devices illustrated in vehicle 3804, could also be located or duplicated in billboard lighting 3808, street lights 3812, stop lights 3816, road sign illumination 3820, or in general associated with any device(s) which is desired to be controlled based on one or more environmental factors.

In general, and in operation, data is collected from one or more data collection devices 3810 and sensors 3820. In association with the behavior module 3850, one or more rules, and also in cooperation with controller 3830 and memory 3860, an assessment can be made as to whether one or more vehicle devices 3880, as well as one or more of the data collection devices 3810 and sensors 3820 should be put into a power conserving mode. As discussed, the vehicle 3804 can be equipped with a plurality of sensors as discussed in accordance with the various embodiments disclosed herein, with the frequency with which these sensors/data collection devices sample being dynamically updated based on one or more environmental conditions, based on the time of the day, depending on traffic or congestion, depending on GPS location, e.g. urban or rural, or in general based on any factor that can be used to make an assessment as to whether the frequency of samples can be decreased.

In addition, other vehicle devices 3880 optionally in cooperation with the dimmer/disable module 3890, can be turned on or off, dimmed, or placed into a power saving mode in a similar manner as the data collection devices and sensors. These basic concepts and principles can be extended to other objects such as the billboard lighting 3808, streetlights 3812, stop lights 3816, and road sign illumination 3820. For example, one or more of these devices can also have a data collection device or sensor and enter into a power saving mode when no vehicles, pedestrians, or the like are present. In conjunction with a timer module, these devices could also optionally be preprogrammed to turn on or off during certain times of the day, or to enter a certain power saving mode during certain times of the day, days of the week, or the like.

In accordance with one exemplary embodiment, data collection device 3810 on vehicle 3804 maintains current GPS information that can be forwarded via network 10 and links 5 (optionally using the ad hoc network described herein) to one or more upcoming objects, such as billboard lighting, streetlights, stoplights, and road sign illumination. Assuming there is no traffic in a particular area, these devices, at 2:00 in the morning, could be in a normally off or low power state, and as the vehicle 3804 approaches, as evidenced by the GPS data forwarded by the data collection device to one or more of these devices, they can be activated. For example, when a vehicle 3804 is within a quarter mile of one or more of the objects (billboard lighting, street lights, etc.), these devices could turn on, and based on current location information received from the data collection device 3810, be turned off or back into a power saving mode as the vehicle passes.

However, data collection device data collection frequency and sensor sensing frequency need not necessarily be reduced, but could in a similar manner be increased. For example, if there is greater traffic, higher congestion, based on proximity to one more other vehicles or objects, emergency situations, or in general any or more factors, behavior module 3850 can increase the sampling rate and/or sensitivity of any one or more of the devices associated with vehicle 3804. For example, if the behavior module 3850, cooperating with controller 3830, memory 3860, and I/O interface 3870 determine that a collision is imminent, sensors 3820 can begin sampling at X times a normal rate, and in a similar manner, data collection devices 3810 can begin connecting data at, for example, a maximum collection frequency.

As discussed in accordance with another exemplary embodiment herein, the data collection devices 3810 can be associated with an insurance company driver's behavior tracking. As the behavior module 3850 compiles information regarding driver behaviors, such as never driving between 3:00 and 5:00 a.m., driving more safely in the morning than in the evenings, etc., the behavior module 3850, in accordance with one or more of the associated rules, can modify the operation of the data collection device 3810 such that the data collection device collects more data during periods of time when there is a higher likelihood of incident, and lessens the data collection rate during "off-peak" times, such as between 3:00 and 5:00 in the morning.

As further discussed herein, vehicle 3804 may be communicating with one or more other entities via a communication module (not shown). As the vehicle may be transmitting and receiving larger quantities of data during on-peak times (as part of normal usage), the behavior module 3850 could schedule the uploading of data collected from the data collection devices 3810 and/or sensors 3820 at a period of time when the car is at rest, or during an off-peak time, such as between 3:00 and 5:00 a.m. In this manner, data communications during times when they are truly needed, such as in high traffic or pedestrian environments, could be maximized for the benefit of, for example, the driver.

In accordance with yet another exemplary embodiment, the data collection devices 3810 can be used to assist with updating maps. For example, as the vehicle 3804 travels around a specific geographic area, the data collection devices 3810 and/or sensors 3820 can collect information that can assist with providing additional detail to entities that maintain maps. This information can include, but is not limited to, road position, lane number, lane size, or in general any information relating to the road on which the vehicle 3804 is traveling, and can further be supplemented with information from sensors on lane dividers, signs, and/or any other marking or sensor that a vehicle is able to communicate with or otherwise detect. All this information could then optionally be uploaded, during an off-peak time, to a mapping services (not shown) that could use the data to update one or more of maps, traffic information, congestion information, driver information, travel information, detour or construction information, or the like. Using these techniques, maps could also be supplemented with real-time information that could be very granular based on the types of data and sensor inputs that a vehicle 3804 would be able to detect. As will be appreciated, since these types of features could be installed on a multitude of vehicles, the mapping service could assemble all of the data, average it, and provide very accurate information about particular road conditions, lane shifts, construction projects, detours, lane widths, and in general any information related to road conditions, travel conditions, traffic conditions, or the like.

In accordance with yet another exemplary embodiment, behavior module 3850, in cooperation with one or more rules, controller 3830 and memory 3860, may increase or decrease the sampling rate and/or frequency with which one or more of the data collection devices and sensors collect data based on real-time or near-real-time monitoring of the driver. For example, if a driver is behaving in an erratic manner, then in cooperation with the timer module 3840, one or more of the data collection devices and sensors could increase their sensitivity and/or sampling frequency for a period of time, such as five minutes, after which one or more of the data collection devices and sensors would return to a normal data collection and/or sampling rate assuming the driver has returned to normal behavior.

In accordance with yet another exemplary embodiment, the dimmer/disable module 3890 can communicate with one or more other devices, such as billboard lighting 3808, streetlights 3812, stop lights 3816, and road sign illumination 3820, and indicate driver preferences for the operation of one or more of these devices. For example, a certain driver may prefer to not have street lights illuminated, nor need road signs and would prefer not to see billboard lighting. However, another driver, perhaps one who has poor night vision, would perhaps like to have maximum street light illumination, maximum road sign illumination, but only 50% illumination for billboard lighting. The dimmer/disable module 3890 could coordinate, via one or more communications links and networks 10 (and/or via the ad hoc network), the appropriate illumination of one or more of these devices appreciating, that if other vehicles are in the area there may be a conflict in which case one or more of the billboard lighting 3808, street lights 3812, stop lights 3816 and road sign illumination 3820 could default to a default mode of operation and/or illumination.

Figure 39:
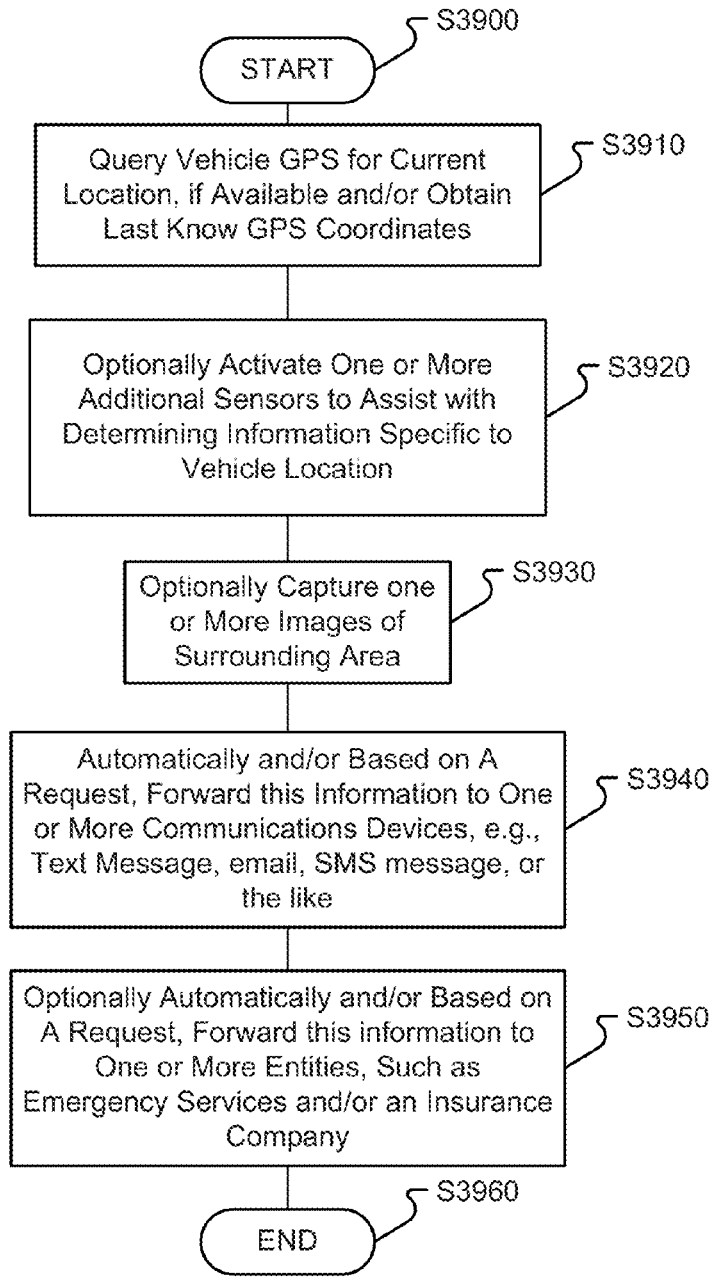
FIG. 39 illustrates an exemplary method for determining vehicle location in accordance with embodiments of the present disclosure.

FIGS. 19 and 39 illustrate exemplary embodiments directed toward assisting with determining vehicle location. As discussed, a vehicle may be equipped with, or may have, multiple sensors, such as GPS, backup cameras, communications hardware, such as wireless communications devices and/or cell phones, and the like. Any one or more of these devices is capable of providing information that can then be used to assist with determining vehicle's current location. As illustrated in FIG. 19, a vehicle is illustrated that includes one or more local and/or remote sensing and/or data collecting elements 1904, a communications module 1908, a communications device 1912, and one or more other entities 1916 connectable via one or more links 5 and networks 10.

In operation, either automatically, at user request, or via another entity's request, the vehicle can begin commencing data harvesting and aggregation from one or more of the sensing and data collecting elements 1904. For example, upon parking the vehicle 1904, the vehicle 1904 can automatically acquire GPS information, if available, capture a picture via an on board camera such as a back-up camera, or other camera associated with the vehicle, as well as attempt to obtain any other relevant information that can be used to assist with determining the vehicle location including cell tower information, WiFi information, environmental information, or the like. Some or all of this information can a then be assembled for forwarding to a destination, such as a user's smart phone, an insurance company, or another entity, such as emergency services.

In accordance with one exemplary embodiment, a user has associated preference with the vehicle 1900 indicating that when they park the vehicle, they would like to receive an image of the surroundings, GPS information, and a map that shows the vehicle's location thereon. Therefore, every time the user parks the vehicle 1900, the vehicle aggregates this information and bundles it together into an e-mail that is forwarded to the user's smart phone.

In accordance with another exemplary embodiment, vehicle 1900 could receive a query from another entity, such as an insurance company or emergency services, asking the vehicle to provide information regarding its current location. For example, if a vehicle is stolen, an insurance company and/or emergency services can forward a request to the vehicle, ask the vehicle to provide GPS information, if available, one or more pictures of the surrounding area, and/or the last known good coordinates, such as when GPS is not currently available. Again, this information could be bundled together and forwarded to the entity in any one or more known formats such as in an e-mail, a text message, an SMS message, a multimedia message, or the like. Furthermore, historical information can be provided with the message, such as pictures over the last 30 minutes, or some other time period, vehicle GPS information for that day, or in general any historical information available to the system that can then be assembled and forwarded to one or more destinations in any one or more formats.

In accordance with another embodiment, the one or more cameras perform optical character recognition, with recognized characters assemblable into a communication to the communications device. For example, as a vehicle is entering a parking garage at an airport, the system can perform optical character recognition to assist the driver with remembering they are parked at level 5, campfire zone, parking spot 526.

In accordance with another exemplary embodiment, the harvested and aggregated data is used to assemble a "breadcrumbs" trail that illustrates where a user has been. This trail is then forwardable to a destination as discussed.

FIG. 39 illustrates an exemplary method for assisting with identifying a vehicle location in accordance with an exemplary embodiment. In particular, control begins in step S3900 and continues to step S3910. In step S3910, a vehicle's GPS can be queried for current location information, if available. Last known and/or historical GPS coordinates could also be accessed as discussed above. Next, in step S3920, one or more additional sensors can also optionally be activated to assist with determining information specific to vehicle location. As discussed, any vehicle sensor can be utilized to assist with obtaining information that can be forwarded in a manner similar to acquired GPS information. Then, in step S3930, one or more images can be captured, and/or historical, saved images retrieved as discussed. Control then continues to step S3940.

In step S3940, one or more of the above described types of information and data can be assembled and forwarded, automatically or in response to a request, to one or more communications devices in any known format, such as a text message, e-mail, SMS message, a SIP message, or the like. Information such as a phone number or e-mail address of the communications device can be stored in the vehicle to facilitate the forwarding of the vehicle location information to a particular device(s). Optionally, in step S3950, and again automatically or based on one or more requests, this information can be forwarded to one or more other entities, such as emergency services, an insurance company, another party, or in general to any destination. For example, the request can include information as to which destination the information should be forwarded to, and in which one or more formats. Control then continues to step S3960 where the control sequence ends.

Figure 40:
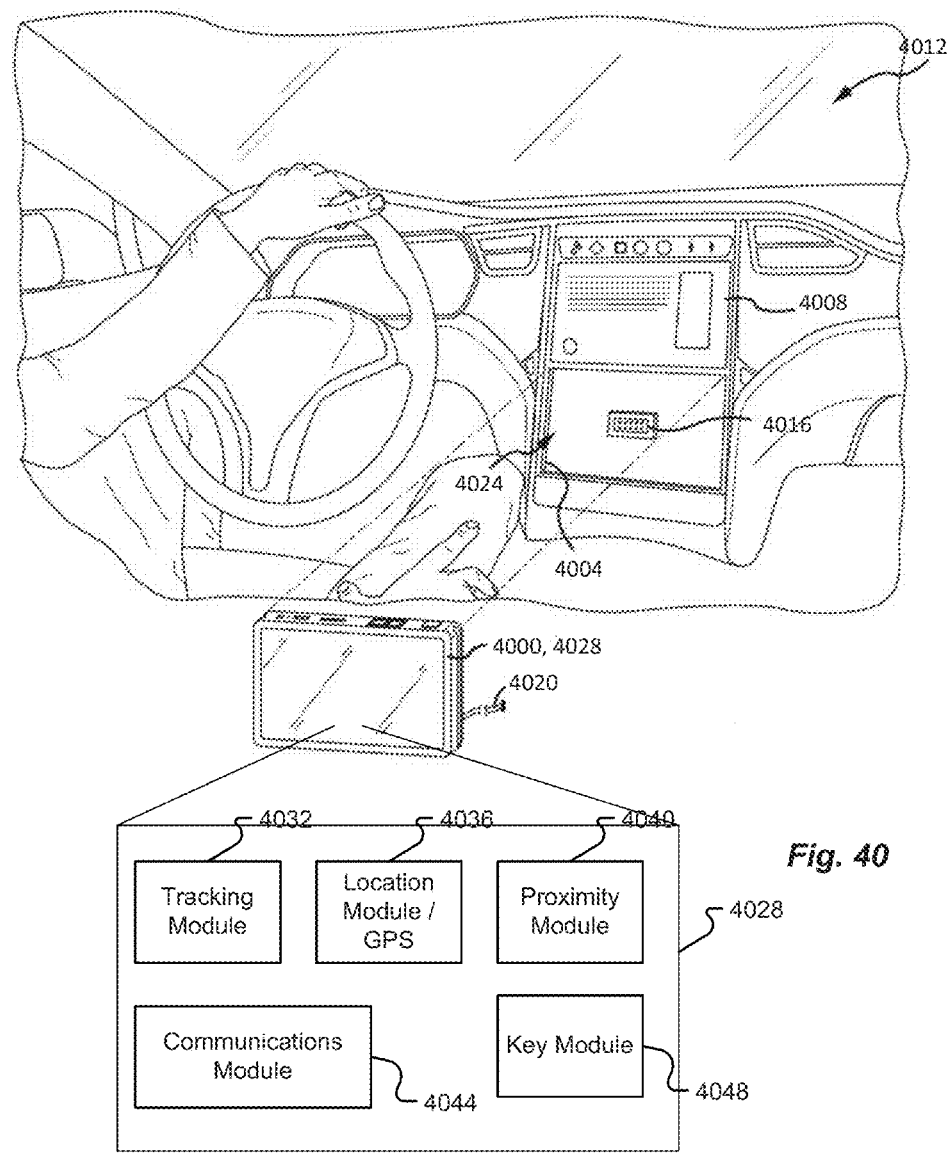
FIG. 40 illustrates an exemplary embodiment of a detachable stand-alone computing device in accordance with embodiments of the present disclosure.

FIG. 40 illustrates an exemplary embodiment that allows information exchange between a device and a vehicle. More specifically, discussed in related in copending application Ser. No. 13/420,236, filed Mar. 14, 2012, entitled "Configurable Vehicle Console" which is incorporated herein by reference in its entirety, is a configurable vehicle console that is removably attached from a mounting location of a vehicle. More specifically, FIG. 40 illustrates that the configurable vehicle console may comprise at least one device 4000 that is capable of being attached to a vehicle in a vehicle-mounted position 4024. Furthermore, the device 4000 may engage with the vehicle via one or more engagement features, vehicle mounts 4004, a vehicle dock 4016, and combinations thereof. In accordance with some exemplary embodiments, the configurable vehicle console may comprise the device 4000 and at least one additional console display 4008. Moreover, the device 4000 may be tethered to the vehicle-mount position via an optional tether 4020. As can be appreciated, the tether 4020 may carry electrical and/or optical signals for the purposes of power and communication. The tether 4020 may be connected between the device 4000 and the vehicle interior 4012 and even connect to the dock 4016. In some embodiments, the tether 4020 may be used to limit movement of the device 4000, especially acting such that the device 4000 may not be removed from the vehicle interior 4012. Further, the tether 4020 may be constructed from a material, or combination of materials that allow the device 4000 to be repeatedly attached and detached from the vehicle-mounted position 4024. In an alternative embodiment, the tether 4020 may be constructed such that no signal, power, or otherwise, is passed form the device 4000 to the vehicle.

As discussed in the related application, it is anticipated that the device 4000 may communicate with, and/or be operated independently of, the additional console display 4008. Communication between the device 4000 and the additional console display 4008 may be achieved through physical and/or wireless methods. At least one aspect of the present disclosure is that the device 4000 once removed from the vehicle-mounted position 4024 may be operated as a stand-alone computed device 4028, such as a tablet computer. This stand-alone computing device 4028 may also display and behave as a tablet computer configured as, but in no way limited to, e-mail clients, web browsers, texting applications, games, media players, office suites, and in general any known or later developed application(s). In some embodiments, applications that have been designated as "essential" may either remain on the display of the stand-alone computing device 4028 or upon removal be transferred to the additional console display 4008. This transfer of the essential applications may be initiated by a manually selected option. Alternatively, the transfer of the essential applications may be initiated automatically when the device 4000 is removed from the vehicle-mounted position 4024. One or more of a number of censors, the mount 4004, the dock 4016, and other features of the device 4000, or combinations thereof, may be used to determine the removal of the device 4000 from the vehicle-mounted position 4024.

As device 4000 is removable from the vehicle and optionally configured to be a stand-alone computing device 4028, it is expected that there is the possibility that the stand-alone computing device 4028 could become disassociated from or otherwise removed from the vehicle interior 4012.

If the stand-alone computing device 4028 is disassociated from the vehicle, an exemplary embodiment is directed toward finding the device. However, in that these devices are transferable among vehicles, can be user centric, or vehicle centric, locating the appropriate device poses some challenges. In accordance with a first exemplary embodiment, the stand-alone computing device 4028 further includes a tracking module 4032, a location module/GPS 4036, a proximity module 4040, and communications module 4044.

As the stand-alone computing device 4028 can be vehicle centric or user centric, in accordance with one exemplary embodiment, the stand-alone computing device 4028 can include a plurality of keys that are useable, in place of, or in addition to, traditional keys or key fobs that will allow for the operation of a vehicle. The stand-alone computing device 4028 could also be entity centric, such that the stand-alone computing 4028 is useable with a plurality or a fleet of cars, such as in a rental-car environment. In these types of scenarios, one or more vehicle keys could be stored on the device and usable to activate the vehicle, or a portion thereof such as in a "cripple" mode where only a portion of the vehicle's functionality is enabled, e.g., the radio and lights. As such, certain triggers can be present that govern vehicle operation based on whether or not the device is associated with a vehicle. This functionality can be managed from the stand-alone computing device 4028 and/or in combination with a key module 4048 as well as optionally with any necessary encryption or security modules as needed.

As the stand-alone computing device 4028 is useful to have in a vehicle, but not required, upon the vehicle detecting that it is going to be used, the vehicle can determine whether or not there is a stand-alone computing device docked or otherwise associated therewith. If the stand-alone computing device is not associated with the vehicle, the vehicle can provide one or more of an audible or visual reminder to the driver indicating that the stand-alone computing device is not present. If the driver has the device with them, perhaps the device was simply not recognized and it can be docked or otherwise associated with or attached to the vehicle at which point control can continue as normal. However, if the driver realizes they do not have the stand-alone computing device with them, a determination can then be made as whether or not they would like the vehicle to assist them with finding the device.

As discussed, the devices can either be driver centric, or vehicle centric. If the device is driver centric, the vehicle, in cooperation with the tracking module 4032, can acquire a device identifier from, for example, the driver, and then with the cooperation of one or more of the location module/GPS 4036, proximity module 4040, and communications module 4044, initiate a locator routine to try and determine the current location of the device. This can be based on one or more of the GPS information, cell tower triangulation information, Wi-Fi hotspot information, last known location information, or in general any data or information that could be used to assist the user with determining the location of the device. In a similar manner, if the device is vehicle centric, this feature may even become more important because perhaps the driver has never had in their possession the stand-alone computing device. Referring back to the example above where the vehicle may be associated with a stand-alone computing device in a rental car environment, perhaps there could be a special bank or storage area for these stand-alone computing devices from which renters are expected to retrieve their stand-alone computing devices from before departing with the vehicle. The vehicle could then remind the driver that they need to retrieve their stand-alone computing device and provide instructions on how to retrieve it and its location either audibly, visually, and optionally in conjunction with one or more of the additional console display, on-board car speakers, and/or in cooperation with a user's smart phone.

In accordance with another exemplary embodiment, the stand-alone computing device can include additional security features in conjunction with the key module 4048. For example, if a user parks their vehicle, detaches the stand-alone computing device and places it in a bag while they are shopping, based on a trigger, such as hitting a "lock" button, leaving the proximity of the vehicle, or in general based on any trigger, the vehicle can enter an alarm-standby mode to protect vehicle. If vehicle motion is detected, such as if the vehicle is stolen or being towed, a communication can be initiated in conjunction with the communications module 4044 to notify the stand-alone computing device 4028 that the vehicle is being moved and provide the user the option of disabling the vehicle. If there user opts to disable the vehicle, the command can be sent to the vehicle requesting the disabling of one or more systems, with confirmation thereof being optionally returned to the user to let them know the action was completed successfully. Moreover, current location information can be returned to the user on the stand-alone computing device so that the user is provided the current location of the vehicle, which can optionally be populated on a map.

Figure 41:
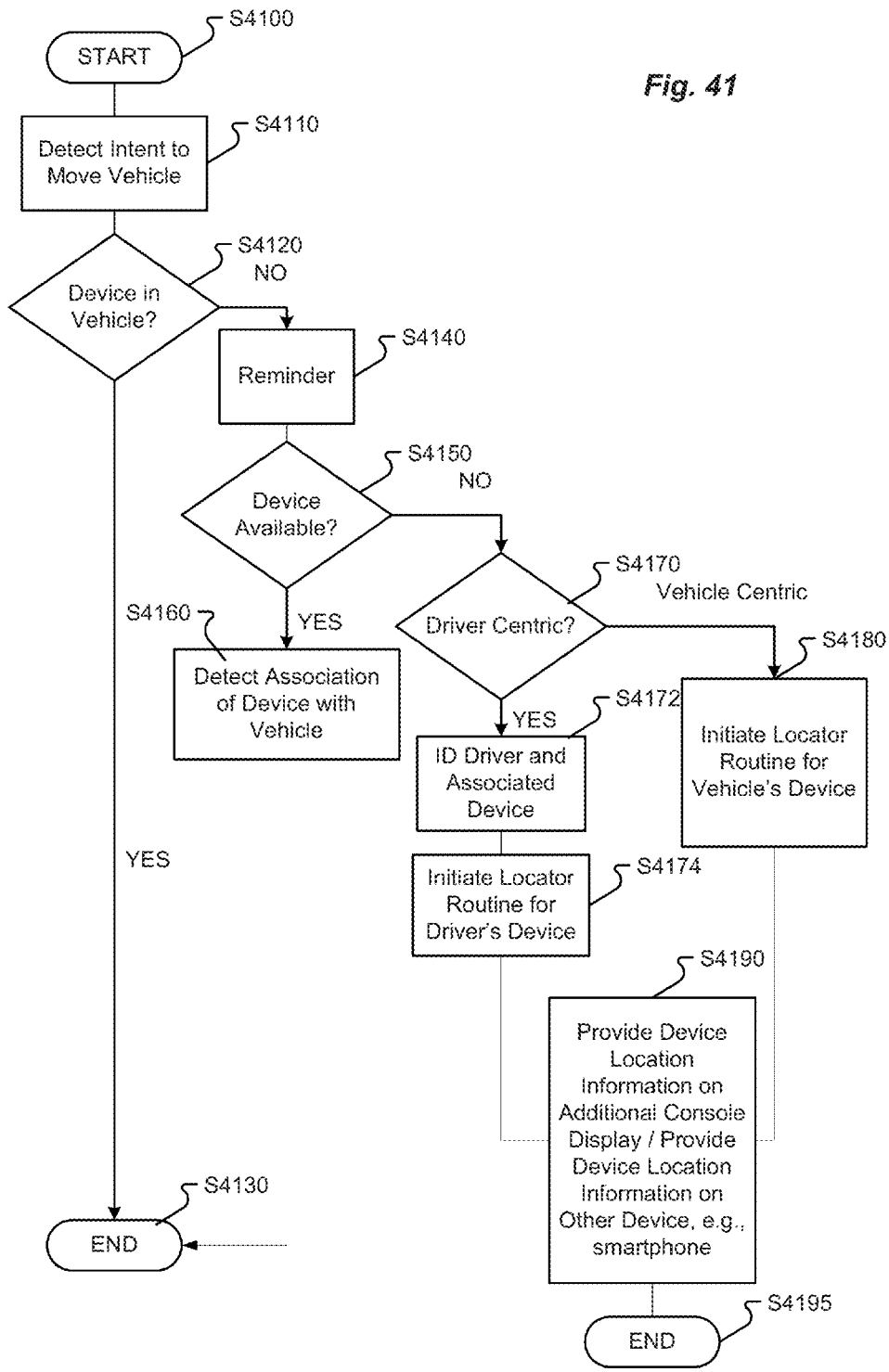
FIG. 41 illustrates an exemplary method of locating the stand-alone computing device in accordance with embodiments of the present disclosure.

FIG. 41 outlines an exemplary method for determining stand-alone computing device location according to an exemplary embodiment. In particular, control begins in step S4100 and continues to step S4110. In step S4110, intent to move the vehicle is detected. For example, the intent to move the vehicle can include one or more of unlocking the vehicle, opening the door, sitting in the driver's seat, placing a key in the ignition, or the like. Next, in step S4120, a determination is made as whether the stand-alone computing device is in the vehicle, i.e., docked or otherwise associated with the vehicle.

If the device is in the vehicle, control jumps to steps S4130 with control otherwise continuing to step S4140.

In step S4140, the driver is reminded that the stand-alone computing device has not been detected. This reminder can be one or more of audible or visual. Next, in step S4150 a determination is made as to whether the device is available, for example, in the vehicle but not docked. If the device is in the vehicle but not docked, control can continue to step S4160 where the device is detected and associated with the vehicle with control continuing to step S4130 where the control sequence ends.

If the device is not available, control continues to step S4170 where a determination is made as to whether the device is driver centric. If the device is driver centric, control continues to step S4172 with control otherwise jumping to step S4180.

In step S4172, one or more of the driver is identified as well as their associated device, where the driver is queried to identify their stand-alone computing device. With this information, a locator routine is initiated in step S4174 in an attempt to determine where the driver's stand-alone computing device is. For example, a communication can be sent out, such as a ping, that asks the device for current location information, history of past location information, or in general any information which could be useful to the driver to help them remember or locate where the stand-alone computing device is. Then, in step S4190, this information is provided to the driver on one or more of the additional console display, audibly, and/or on their smart phone or communications device.

If however the stand-alone computing device is vehicle centric, the locator routine is initiated and, since the vehicle has a stored identification of the stand-alone computing device that is associated with it, the vehicle can proceed directly with initiating a query to determine the current location of the vehicle's stand-alone computing device. Control then continues to step S4190 where this information is then provided to the driver as discussed. Control then continues to step S4195 where the control sequence ends.

Figure 42:
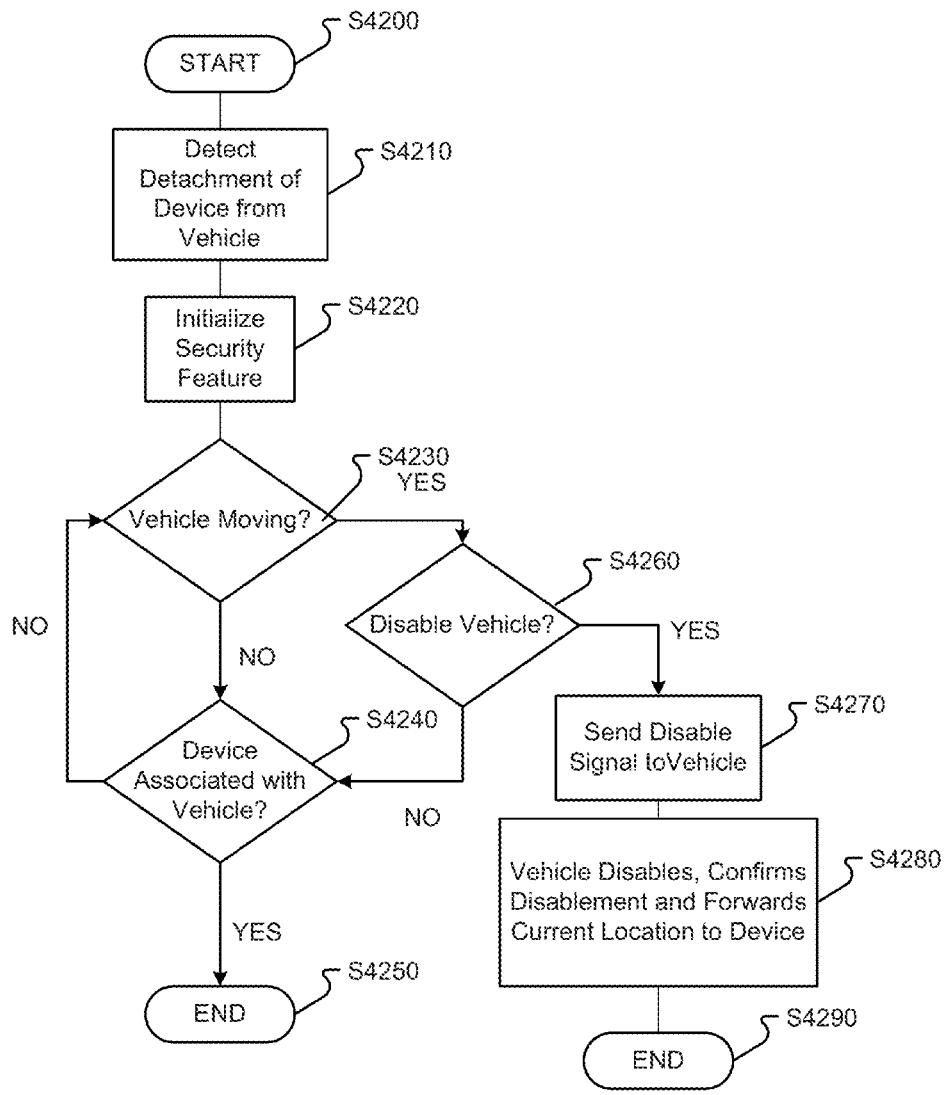
FIG. 42 illustrates an exemplary method for providing stand-alone computing device to vehicle security in accordance with embodiments of the present disclosure.

FIG. 42 outlines an exemplary method for utilizing the stand-alone computing device as a vehicle security tool. In particular, control begins in step S4200 and continues to step S4210. In step S4210, the detachment of the device from the vehicle is detected. Then, in step S4220, either automatically or manually, the security features of the device and the car are enabled. For example, in this security mode, all doors are automatically locked and the vehicle is placed in a "listen" mode waiting for instructions from the stand-alone computing device. Control then continues to step S4230.

In step S4230, a determination is made as to whether the vehicle is moving. If the vehicle is not moving, control continues to step S4240 with control otherwise jumping to step S4260.

In step S4240 a determination is made as to whether the device as has been re-associated with the vehicle. If the device has not been re-associated with the vehicle, control jumps back to step S4230 with control otherwise continuing to step S4250.

In step S4260, a determination is made as to whether the vehicle should be disabled. If the vehicle is to be disabled, control jumps to step S4270, with control otherwise continuing back to step S4240.

In step S4270, the user can be provided the option to send a disabled signal to the vehicle requesting the disabling of one or more systems thereon, including the complete disabling of all systems. In addition, further instructions can be sent such as the locking of doors, rolling up of windows, closing of the sun roof, and in general any instruction that controls any function of the vehicle could be included with the disabled message. Next, in step S4280, the vehicle can optionally confirm that the instructed operations have been completed and forward current location information back to the stand-alone computing device. Control then continues to step S4290 where the control sequence ends.

Figure 43:
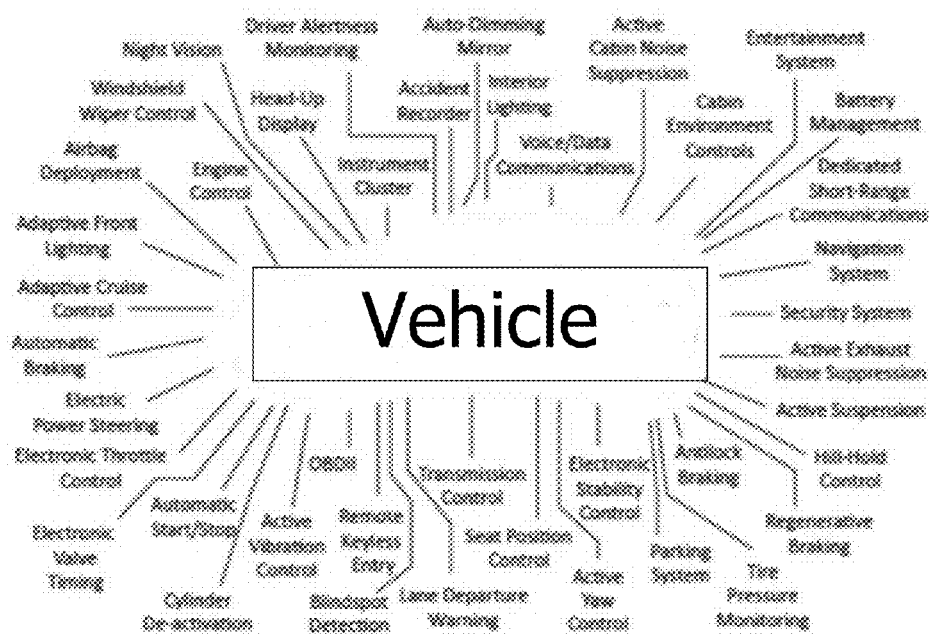
FIGS. 43 and 44 illustrate an exemplary internet connected vehicle in accordance with embodiments of the present disclosure.
Figure 44:
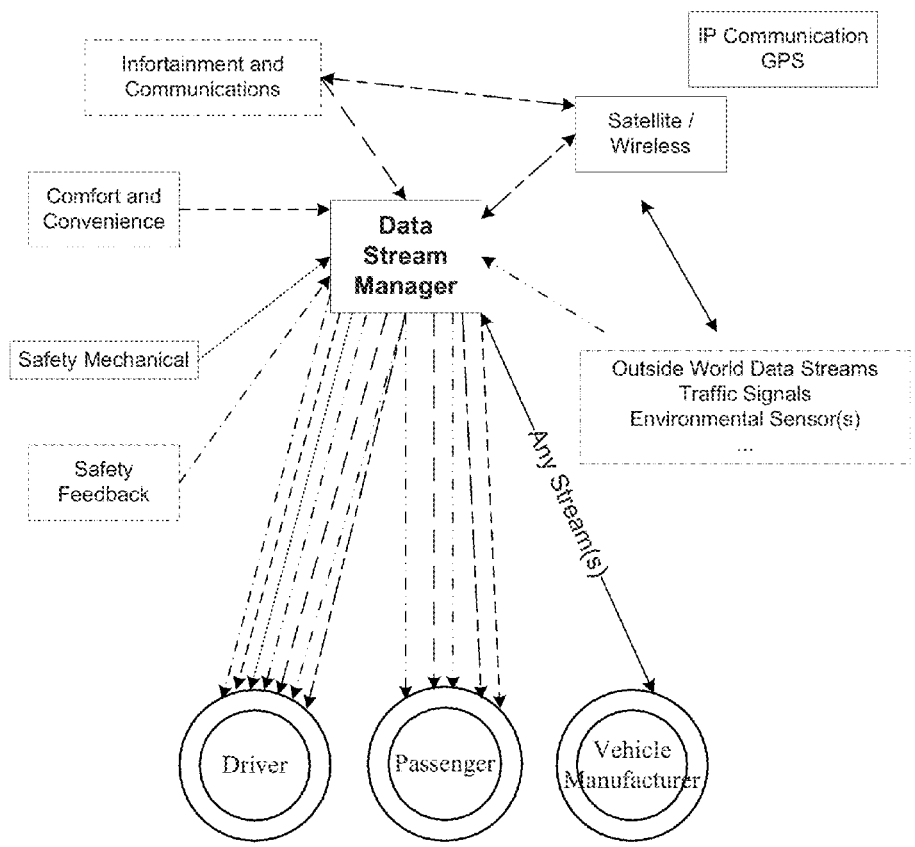

In accordance with another exemplary embodiment, FIGS. 43-44 illustrate an exemplary IP (Internet Protocol) connected car. One of the problems with current vehicles, as illustrated in FIG. 43 is all of the systems and data on modern vehicles.

One Exemplary Aspect:

Simplifies and coordinates all data streams

Enables efficient technology upgrading

Enables ease of new technology introduction

Provides industry accepted protocol

Improves network security

Has limitless potential with cloud based services.

Integrating Functionality

The exemplary aspect has one or more of the following features:

an IPv6 based subsystem, separates presentation functions from sensor/infotainment systems, supports multiple display systems, integrates existing sensor systems, integrates existing infotainment systems, controls migration to Ethernet-based sensor systems, makes "high availability" options available, provides a foundation for establishing effective cyber attack prevention, can be deployed in a physical "Box," (The Octopus)

can be EMI sealed, can be provided with a gasketed connector panel for "customization" by a car company, can be returned to depot maintenance.

The exemplary embodiment can also provide event data Recording, with survivability and call/text control functionality.

Some of the exemplary advantages associated with this technology include, that it follows the technology curve, IPv6 will allow connections to "any" device, "x" Gb/sec ethernet connectivity, software can use a "Class Driver," the solution separates "function" from underlying hardware, simplifies migration from existing sensor systems to "NexGen" sensor(s), provides multiple IP sources for connectivity, provides for a mobile "phone company" within the vehicle with independent suppliers of 3G/4G/LTE, can provide Lightsquared/Airbiquity "wholesale" networks, can receive and display car company "service" offerings, can receive and display "ISP" service offerings within the vehicle, can provide WiMax capabilities, supports multiple technology suppliers—and therefore provides greater flexibility, and provides efficient software and feature upgrading of vehicle.

Other exemplary advantages associated with this configuration are that it provides the ability to move results between displays. That is, a person using a touch screen in the back seat can search the internet for a restaurant. When one is found, they can "flick" the image to the front console where the driver can view it and elect to navigate there, assisted by the console GPS.

The brains of the console, or head unit, can be modular. Since autos designed now are rolled out four years from now and then have a six year life cycle, the technology is stale by the time it comes out. Thus, the brains are in the trunk, under the hood, or otherwise accessible and upgradeable. Essentially, the design can optionally be based around a low cost processor to handle basic functions. Then someone can insert a real, state of the art processor at production time. Further, other modules can include a module for cellular data, which is different depending upon the carrier, the current non-cellular data standard (3G, 4G, etc.), and the like. Users may upgrade as necessary as the car ages, so the technology remains current.

The exemplary systems and methods of this disclosure have been described in relation to an ecosystem for a vehicle. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links (such as link 5, optionally communicating over network 10) connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, re-ordering, additions, and omissions to this sequence can occur without materially affecting the operation of the disclosed embodiments, configuration, and aspects.

A number of variations and modifications of the disclosure can be used. It would be possible to provide for some features of the disclosure without providing others.

In some embodiments, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or one or more means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a non-transitory storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A system to associate a stand-alone computing device and a vehicle comprising:
    a vehicle comprising:
    a head unit;
    the stand-alone computing device selectively interconnected to the head unit;
    an additional console display;
    wherein one or more of the vehicle and the stand-alone computing device are adapted to determine if the stand-alone computing device is docked with the vehicle and then, if not docked, to determine if the stand-alone computing device is in the vehicle;
    a tracking module, executed by the stand-alone computing device, programmed to determine a stand-alone computing device identifier for the stand-alone computing device to be associated with the vehicle;
    if the stand-alone device is not in the vehicle, a location module, executed by the stand-alone device, programmed to:
    initiate a locator routine to determine a location of the stand-alone computing device outside of the vehicle;
    transmitting stand-alone computing device location information, from the stand-alone computing device to the vehicle, about the location of the stand-alone computing device; and
    one or more of the additional console display and a communications device that provides the stand-alone computing device location information to a user of the vehicle.

2. The system of claim 1, wherein the stand-alone computing device includes a key to authorize use of the vehicle.

3. The system of claim 1, wherein the stand-alone computing device identifier is associated with a vehicle or a driver.

4. The system of claim 1, further comprising a proximity module that determines whether the stand-alone computing device is near, but not associated with, the vehicle.

5. The system of claim 1, wherein the stand-alone computing device is capable of disabling one or more features of the vehicle.

6. The system of claim 1, wherein the stand-alone computing device is capable of disabling one or more features of the vehicle when not in the vehicle.

7. The system of claim 1, wherein a driver is reminded to associate the stand-alone computing device with the vehicle prior to movement.

8. The system of claim 1, wherein the stand-alone computing device is dockable and integrally functionable with the vehicle.

9. The system of claim 1, wherein one or more of GPS information, location information, picture information, last known location information and WiFi information are provided as the stand-alone computing device location information.

10. The system of claim 1, wherein the stand-alone computing device stores and tracks a location of the vehicle.

11. A method to associate a stand-alone computing device and a vehicle comprising:
    determining, by one or more of the vehicle and the stand-alone computing device, if the stand-alone computing device is docked with the vehicle;
    if the stand-alone device is not docked with the vehicle, determining, by one or more of the vehicle and the stand-alone computing device, if the stand-alone computing device is in the vehicle;
    if the stand-alone device is not docked with the vehicle or not in the vehicle:
    determining, by a tracking module executed by the stand-alone computing device, a stand-alone computing device identifier for the stand-alone computing device to be associated with the vehicle;
    initiating, by a location module executed by the stand-alone computing device, a locator routine to determine a location of the stand-alone computing device outside the vehicle;
    sending a communication, by the stand-alone computing device and to the vehicle, comprising the stand-alone computing device location information about the location outside of the vehicle of the stand-alone computing device; and
    providing the stand-alone computing device location information on one or more of an additional console display and a communications device.

12. The method of claim 11, wherein the stand-alone computing device includes a key to authorize use of the vehicle.

13. The method of claim 11, wherein the stand-alone computing device identifier is associated with a vehicle or a driver.

14. The method of claim 11, further comprising determining whether the stand-alone computing device is near, but not associated with, the vehicle.

15. The method of claim 11, wherein the stand-alone computing device is capable of disabling one or more features of the vehicle.

16. The method of claim 11, wherein the stand-alone computing device is capable of disabling, when not in the vehicle, one or more features of the vehicle.

17. The method of claim 11, wherein a driver is reminded to associate the stand-alone computing device with the vehicle prior to movement.

18. The method of claim 11, wherein the stand-alone computing device is dockable and integrally functionable with the vehicle.

19. The method of claim 11, wherein one or more of GPS information, location information, picture information, last known location information and WiFi information are provided as the stand-alone computing device location information.

20. The method of claim 11, wherein the stand-alone computing device stores and tracks a location of the vehicle.

\* \* \* \* \*